US006412882B1

(12) United States Patent
Isono et al.

(10) Patent No.: US 6,412,882 B1
(45) Date of Patent: Jul. 2, 2002

(54) VEHICLE BRAKING SYSTEM HAVING DEVICES FOR CONTROLLING FLUID FLOWS BETWEEN PRESSURIZING AND ASSISTING CHAMBERS OF MASTER CYLINDER AND PRESSURE SOURCE AND RESERVOIR

(75) Inventors: Hiroshi Isono; Yasuji Mizutani, both of Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/712,124

(22) Filed: Nov. 15, 2000

(30) Foreign Application Priority Data

Dec. 10, 1999 (JP) ............................. 11-352104
Jun. 9, 2000 (JP) ....................... 2000-174029

(51) Int. Cl.⁷ ............................... B60T 8/44
(52) U.S. Cl. ................. 303/114.1; 303/11; 303/113.3
(58) Field of Search .................. 303/10, 11, 114.1, 303/114.2, 114.3, 113.3

(56) References Cited

U.S. PATENT DOCUMENTS

| 4,416,491 A | * 11/1983 | Belart et al. .............. 303/114.1 |
| 4,708,404 A | * 11/1987 | Seibert et al. ............ 303/114.1 |
| 4,750,789 A | * 6/1988 | Belart et al. .............. 303/114.1 |
| 4,832,418 A | * 5/1989 | Mattusch ................. 303/114.1 |
| 4,838,619 A | * 6/1989 | Ocvirk ..................... 303/114.1 |
| 5,249,853 A | * 10/1993 | Reinartz et al. ......... 303/114.1 |
| 5,401,083 A | * 3/1995 | Altmann et al. ......... 303/113.2 |
| 5,403,076 A | * 4/1995 | Altmann et al. ......... 303/114.1 |
| 5,531,509 A | * 7/1996 | Kellner et al. ........... 303/114.1 |
| 6,059,380 A | * 5/2000 | Pueschel et al. ......... 303/113.2 |
| 6,196,641 B1 | * 3/2001 | Oka et al. ................ 303/114.1 |
| 6,290,307 B1 | * 9/2001 | Poertzgen et al. ....... 303/115.4 |

FOREIGN PATENT DOCUMENTS

JP           8-67242         3/1996

* cited by examiner

*Primary Examiner*—Jack Lavinder
*Assistant Examiner*—Devon Kramer
(74) *Attorney, Agent, or Firm*—Oliff & Berridge, PLC

(57) ABSTRACT

A vehicle braking system including a master cylinder having a pressurizing piston fluid-tightly and slidably received in a cylinder housing and cooperating with the cylinder housing to define a pressurizing chamber and an assisting chamber on opposite sides of the piston, a brake operating member for applying a pressurizing force to the piston, a wheel brake cylinder connected to the master cylinder for activating a brake for braking a wheel, a hydraulic pressure source for pressuring a working fluid, a reservoir, a first flow control device for controlling flows of the fluid between the assisting chamber, and the hydraulic pressure source and reservoir, and a second flow control device or controlling flows of the fluid between the pressurizing chamber, and the hydraulic pressure source and reservoir.

28 Claims, 19 Drawing Sheets

VEHICLE BRAKING SYSTEM HAVING DEVICES FOR CONTROLLING FLUID FLOWS BETWEEN PRESSURIZING AND ASSISTING CHAMBERS OF MASTER CYLINDER AND PRESSURE SOURCE AND RESERVOIR

This application is based on Japanese Patent Application Nos. 11-352104 filed Dec. 10, 1999 and 2000-174029 filed Jun. 9, 2000, the contents of which are incorporated hereinto by reference.

BACKGROUND OF THE INVENTION

1. Field of the Invention

The present invention relates in general to a braking system for an automotive vehicle, and more particularly to improvements of a vehicle braking system.

2. Discussion of Related Art

The assignee of the present application filed Japanese Patent Application No. 11-184816 (which has not been published at the time the present invention was made), which discloses a braking system for an automotive vehicle, wherein an assisting force other than an operating force acting on a brake operating member is applied to a pressurizing piston of a master cylinder, so that the operating force of the brake operating member is boosted by the assisting force. Described more specifically, the pressurizing piston is fluid-tightly and slidably received in a housing of the master cylinder, and cooperates with the housing to define a pressurizing chamber on the front side of the pressurizing piston, and an assisting chamber on the rear side of the pressurizing piston. A pressurized working fluid is supplied into the assisting chamber, to apply an assisting force to the pressurizing piston, whereby the operating force applied to on the brake operating member is boosted by the assisting force. In this vehicle braking system, the pressure of the fluid to be delivered from the master cylinder can be controlled in relation to the brake operating force, by controlling the pressure of the fluid supplied into the assisting chamber.

In the vehicle braking system described above, the operating stroke of the brake operating member is not controlled in relation to the operating force, and the operating stroke is determined by the operating state in a portion of the braking system between the master cylinder and a wheel brake cylinder. Accordingly, the operating stroke of the brake operating member which corresponds to a given operating force may fluctuate.

SUMMARY OF THE INVENTION

It is therefore an object of the present invention to provide a braking system for an automotive vehicle, which is capable of controlling the operating stroke of the brake operating member in relation to the operating force.

The above object may be achieved according to any one of the following modes of the present invention, each of which is numbered like the appended claims and depends from the other mode or modes, where appropriate, to indicate and clarify possible combinations of elements or technical features. It is to be understood that the present invention is not limited to the technical features or any combinations thereof which will be described for illustrative purpose only. It is to be further understood that a plurality of elements or features included in any one of the following modes of the invention are not necessarily provided all together, and that the invention may be embodied without some of the elements or features described with respect to the same mode.

(1) A braking system for a vehicle having a wheel, comprising:
 a master cylinder including a cylinder housing, and a pressurizing piston which is fluid-tightly and slidably received in the cylinder housing and which cooperates with the cylinder housing to define a pressurizing chamber and an assisting chamber on respective front and rear sides of the pressurizing piston;
 a brake operating device including a brake operating member manually operable with a brake operating force to apply a pressurizing force based on the brake operating force to the pressurizing piston;
 a brake for braking the wheel;
 a wheel brake cylinder which is connected to the master cylinder, for activating the brake;
 a hydraulic pressure source operable to pressurize a working fluid;
 a reservoir;
 a first flow control device connected to the assisting chamber, the hydraulic pressure source and the reservoir, and operable to control flows of the fluid between the assisting chamber, and the hydraulic pressure source and the reservoir; and
 a second flow control device connected to the pressurizing chamber, the hydraulic pressure source and the reservoir, and operable to control flows of the fluid between the pressurizing chamber, and the hydraulic pressure source and the reservoir.

The brake operating member may be a brake pedal operable by depression by foot of an operator of the vehicle, or a in brake lever operable by hand of the vehicle operator, for instance.

In the braking system constructed according to the above mode (1) of this invention, the fluid pressure in the pressurizing chamber (hereinafter referred to as "master cylinder pressure" where appropriate) and the operating stroke of the brake operating member (hereinafter referred to as "brake operating stroke" where appropriate) can be controlled to suitable values determined in relation to the operating force of the brake pedal (hereinafter referred to as "brake operating force" where appropriate). When the pressurized fluid is supplied from the hydraulic pressure source to the assisting chamber of the master cylinder, the brake operating force is boosted by the fluid pressure in the assisting chamber. When the pressurized fluid is discharged from the assisting chamber to the reservoir, the volume of the assisting chamber is reduced to thereby permit a retracting movement of the pressurizing piston. Therefore, the master cylinder pressure can be controlled to a suitable value determined by the specific brake operating force, by controlling the first flow control device to control the fluid flows to and from the assisting chamber. When the pressurized fluid is supplied from the hydraulic pressure source to the pressurizing chamber, the distance of an advancing movement of the pressurizing piston required to obtain a certain value of the fluid pressure in the pressurizing chamber can be made smaller than when the pressurized fluid is not supplied to the pressurizing chamber. On the other hand, the distance of the advancing movement of the pressurizing piston is increased as the pressurized fluid is discharged from the pressurizing chamber to the reservoir. Therefore, the brake operating stroke can be controlled to a suitable value determined by the brake operating force, by controlling the second flow control device to control the fluid flows to and from the pressurizing chamber. Thus, the three parameters, that is, the brake operating force, the brake operating stroke and the master cylinder pressure can be controlled in predetermined relationships with each other, by suitably controlling the first and second flow control devices to control the fluid flows to and from the assisting chamber and the fluid flows to and from the pressurizing chamber.

The present braking system is further advantageous in that the vehicle wheel can be braked with the fluid pressure in the pressurizing chamber, without an operation of the brake operating member, by controlling the second flow control device to control the fluid flows to and from the pressurizing chamber, namely, to control the fluid pressure in the pressurizing chamber. The master cylinder may be arranged such that when the pressurizing piston is placed at its fully retracted position, the pressurizing chamber is held in communication with the reservoir, generally, through a fluid passage whose cross sectional area is comparatively small. In this arrangement, the first flow control device is preferably activated to supply the assisting chamber with a relatively small amount of the pressurized fluid received from the hydraulic pressure source, in order to advance the pressurizing piston by a distance necessary to disconnect the pressurizing chamber from the reservoir, before the pressurized fluid is supplied from the hydraulic pressure source through the second flow control device.

Further, the wheel can be braked without an operation of the brake operating member and without an operation of the second flow control device. That is, the first flow control device is activated to supply the pressurized fluid to the assisting chamber for thereby advancing the pressurizing piston to pressurize the fluid in the pressurizing chamber. However, if the vehicle operator operates the brake operating member while the wheel is braked in the above-indicated condition, the brake operating member has been displaced from the original or non-operated position, where the brake operating member is operatively connected to the pressurizing piston such that the brake operating member is moved with the pressurizing piston. Accordingly, the vehicle operator is likely to recognize the displacement of the brake operating member from the non-operated position, and feel uneasy with this displacement. Where the brake operating member is connected to the pressurizing piston such that the brake operating member is not displaced by a movement of the pressurizing piston, the, advancing movement of the pressurizing piston by the fluid pressure in the assisting chamber causes a considerable amount of play of the brake operating member, which is also likely to be felt uneasy by the vehicle operator. In this respect, the operation of the second flow control device to supply the pressurized fluid to the pressurizing chamber is more desirable than the operation of the first flow control device to supply the pressurized fluid to the assisting chamber.

The brake application to the vehicle wheel by controlling the first or second flow control device without an operation of the brake pedal as described above may be utilized as an automatic braking control for automatically activating the wheel brake to brake the vehicle when a distance between the vehicle and a vehicle running in front of the vehicle in question has become smaller than a predetermined lower limit. Alternatively, the brake application indicated above may be utilized as a traction control or a vehicle running (turning) stability control for controlling the fluid pressure in the wheel brake cylinder. Further, the present braking system can be operated in various other manners. For instance, the master cylinder can be used as a stroke simulator which will be described, when the vehicle is braked by a regenerative braking apparatus adapted to generate a regenerative braking torque.

(2) A braking system according to the above mode (1), wherein at least one of the hydraulic pressure source and the reservoir consists of a first portion and a second portion which are connected to the first and second flow control devices, and the first and second flow control devices are operable independently of each other.

A single hydraulic pressure source may be used commonly for the first and second flow control devices. Similarly, a single reservoir may be used commonly for the first and second flow control devices. In this case, the braking system can be simplified in construction and is available at a reduced cost. However, the hydraulic pressure source may consist of a first portion and a second portion which are connected to the respective first and second flow control devices. Namely, separate first and second hydraulic pressure sources may be provided for the respective first and second flow control devices. Similarly, the reservoir may consist of a first portion and a second portion which are connected to the respective first and second flow control devices. Namely, separate first and second reservoirs may be provided for the respective first and second flow control devices. The first and second flow control devices may be arranged to supply respective predetermined amounts of the pressurized fluid from the hydraulic pressure source (common hydraulic pressure source or separate first and second hydraulic pressure sources) to the assisting chamber and the pressurizing chamber, respectively. For enabling the braking system to be operated in various modes of operations, however, the first and second flow control devices are preferably arranged to be operated independently of each other, to supply the respectively controlled amounts of the pressurized fluid from the hydraulic pressure source to the assisting and pressurizing chambers, respectively.

(3) A braking system according to the above mode (1) or (2), wherein at least one of the first and second flow control devices includes a linear control valve capable of continuously changing at least one of a rate of flow and a pressure of the fluid.

The first flow control device and/or the second flow control device may include a solenoid-operated shut-off valve or directional control valve capable of controlling the fluid flows to and from the assisting chamber or the pressurizing chamber. However, at least one of the first and second flow control devices preferably includes a linear control valve capable of controlling at least one of a fluid flow to the assisting or pressurizing chamber and a fluid flow from the assisting or pressurizing chamber, for improving the accuracy of control of the fluid flows.

(4) A braking system according to any one of the above modes (1)–(3), wherein at least one of the first and second flow control devices includes a supply-flow control valve device for controlling a flow of the fluid to a corresponding one of the assisting and pressurizing chambers, and a discharge-flow control valve device for controlling a flow of the fluid from the corresponding assisting or pressurizing chambers.

In the braking system according to the above mode (4) wherein at least one of the first and second flow control device includes both the supply-flow control valve and the discharge-flow control valve, the fluid flows to and from the assisting chamber and/or the pressurizing chamber can be controlled with a higher degree of accuracy.

(5) A braking system according to any one of the above modes (1)–(4), further comprising a main control device for controlling the first flow control device and the second flow control device, and wherein the main control device includes a brake characteristic control portion for controlling the first and second flow control devices, so as to maintain predetermined relationships among the brake operating force and an operating stroke of the brake operating member and an operating state of the wheel brake cylinder.

The "operating state" of the wheel brake cylinder may be obtained from or represented by, for example, a pressure of the fluid in the wheel brake cylinder, or a braking force generated by the wheel brake cylinder, more specifically, a force by which a friction member such as a brake pad or she is forced against a rotary member such as a disc rotor or a brake drum rotating with the wheel, by the wheel brake cylinder activated by the pressurized fluid. Alternatively, the operating state of the wheel brake cylinder may be obtained from or represented by a braking effect provided by the brake, for instance, by a braking torque applied to the wheel or a deceleration value of the vehicle braked by the brake.

The brake characteristic control portion of the main control device may be arranged to control the first and second flow control devices such that two of the operating force and stroke of the brake operating member and the operating state of the wheel brake cylinder are controlled in respective predetermined relationships with the other of the operating force and stroke of the brake operating member and the operating state of the wheel brake cylinder, for instance, such that the operating state of the wheel brake cylinder and the operating stroke of the brake operating member are controlled in respective predetermined relationships with the operating force of the brake operating member, or such that the operating state of the wheel brake cylinder is controlled in a predetermined relationship with the operating force of the brake operating member, and the operating stroke of the brake operating member is then controlled in a predetermined relationship with the operating state of the wheel brake cylinder.

By controlling the three parameters consisting of the operating force and stroke of the brake operating member and the operating state of the wheel brake cylinder in respective predetermined relationships with each other as described above, it is possible to prevent the brake from producing a braking force which is excessively large with respect to the specific operating force of the brake operating member, or prevent the operating stroke of the brake operating member which is excessively large with respect to the operating force. Accordingly, the present arrangement is effective to improve the operating feel of the brake operating member as sensed by the vehicle operator.

(6) A braking system according to any one of the above modes (1)–(5), further comprising:
  a regenerative braking apparatus including an energy converting device operable to convert a kinetic energy of the vehicle during running of the vehicle into another form of energy, and an energy storing device for storing thee above-indicated another form of energy; and
  a main control device for controlling the first and second flow control devices, the main control device including a cooperative braking control portion operable to control the first flow control device such that a pressure of the fluid in the assisting chamber is lower when the regenerative braking apparatus is in operation than when the regenerative braking apparatus is not in operation.

The braking system according to the above mode (6) includes the regenerative braking apparatus, and a hydraulic braking apparatus including as major elements the master cylinder, the brake, the wheel brake cylinder, the second hydraulic pressure source and the first and second flow control devices, which have been described. In this braking system, the wheel is braked by at least one of the hydraulic braking apparatus and the regenerative braking apparatus, that is, by an operation of the brake operated by activation of the wheel brake cylinder with the pressurized fluid, and/or an operation of the regenerative braking apparatus. When the regenerative braking apparatus is operated, the first flow control valve is preferably controlled to control the fluid pressure in the assisting chamber such that the operating force of the brake or the braking effect provided by the brake is lower than that while the regenerative braking apparatus is not in operation, by an amount corresponding to the regenerative braking force or effect. However, it is not essential to control the first flow control device such that the fluid pressure in the assisting chamber during operation of the regenerative braking apparatus is controlled to be lower than that while the regenerative braking apparatus is not in operation, by the amount corresponding to the regenerative braking effect. That is, the principle of the present invention simply requires that the fluid pressure in the assisting chamber be lower while the regenerative braking apparatus is in operation than while the regenerative braking apparatus is not in operation.

(7) A braking system according to the above mode (6), further comprising:
  a shutting-off valve having a closed state for disconnecting the pressurizing chamber and the wheel brake cylinder; and
  a main controller for controlling the first and second flow control devices, the main controller including a stroke simulation control portion operable, when the regenerative braking apparatus is capable of generating a regenerative braking effect corresponding to an operating amount of the brake operating member, for placing the shut-off valve in the closed state, and controlling the first and second flow control devices such that the brake operating force and an operating stroke of the brake operating member while the regenerative braking apparatus is in operation are controlled to have a same relationship with each other as while the regenerative braking apparatus is not in operation.

The operating amount of the brake operating member may be the operating force or stroke of the brake operating member.

In the braking system according to the above mode (7), the operating force and stroke of the brake operating member while the regenerative braking apparatus is in operation can be controlled to have the same relationship with each other as while the generative braking apparatus is not in operation, even under the operating condition of the braking system in which the supply of the pressurized fluid from the pressurizing chamber to the wheel brake cylinder is prevented by the shutting-off valve placed in the closed state. That is, the first and second flow control devices are controlled to control the fluid flows to and from the assisting chamber and the pressurizing chamber while the pressurized fluid is discharged to the reservoir from the pressurizing chamber which is disconnected from the wheel brake cylinder by the shutting-off valve. Thus, the master cylinder is used as a stroke simulator capable of permitting the operating stroke of the brake operating member to change in a predetermined relationship with the operating force, even while the regenerative braking apparatus is in operation. The present braking system doe not require an exclusive stroke simulator, and can be simplified in construction.

(8) A braking system according to the above mode (7), wherein the main controller controls the first flow control device to control the fluid pressure in the assisting chamber to an atmospheric level and controls the second flow control device to permit the pressurized fluid to be discharged from the pressurizing chamber, when the operating amount of the brake operating member is increased while the regenerative braking apparatus is operated to generate the regenerative braking effect corresponding to the operating amount of the brake operating member.

When the vehicle is braked by only the regenerative braking apparatus, it is not required to supply a pressurized fluid to the pressurizing chamber of the master cylinder to activate the wheel brake cylinder for operating the brake. In this case, the first flow control device is controlled to control the fluid pressure in the assisting chamber to the atmospheric level, and the second flow control device is controlled control the fluid pressure in the pressurizing chamber such that the controlled fluid pressure corresponds to the operating amount of the brake operating member. This arrangement improves the operating feel of the brake operating member, since the operating force corresponds to the operating amount.

(9) A braking system according to the above mode (7) or (8), wherein the main controller controls the first flow control device to control the fluid pressure in the assisting chamber to an atmospheric level and controls the second flow control device to permit the pressurized fluid to be supplied to the pressurizing chamber, when the operating amount of the brake operating member is reduced while the regenerative braking apparatus is operated to generate the regenerative braking effect corresponding to the operating amount of the brake operating member.

Since the second flow control device permits the supply of the pressurized fluid to the pressurizing chamber, the operating amount of the brake operating member can be reduced, even while the pressurizing chamber is disconnected from the wheel brake cylinder by the shutting-off valve.

(10) A braking system according to any one of the above modes (1)–(9), wherein the cylinder housing has a cylinder bore having a small-diameter portion and a large-diameter portion having a larger diameter than the small-diameter portion, and the pressurizing piston includes a small-diameter portion engaging the small-diameter portion of the cylinder bore, and a large-diameter portion engaging the large-diameter portion of the cylinder bore, the small-diameter portion of the pressurizing piston cooperating with the cylinder housing to define the pressurizing chamber on a front side of the small-diameter portion of the pressurizing piston, while the large-diameter portion of the pressurizing piston cooperating with the cylinder housing to define the assisting chamber on a rear side of the large-diameter portion of the pressurizing piston, the small-diameter and large-diameter portions of the pressurizing piston defining a first shoulder surface, while the small-diameter and large-diameter portions of the cylinder bore defining a second shoulder surface, the cylinder housing and the pressurizing piston cooperating to define an annular chamber between the first and second shoulder surfaces, the braking system further comprising:

means for defining a connecting passage connecting the annular chamber and the pressurizing chamber; and
a check valve provided in the connecting passage, the check valve permitting a flow of the fluid in a first direction from the annular chamber toward the pressurizing chamber and inhibiting a flow of the fluid in a second direction opposite to the first direction.

In the braking system constructed according to the above mode (10) of the present invention, the pressurized fluid can flow from the annular chamber to the pressurizing chamber through the connecting passage when the brake operating member is operated. This arrangement makes it possible to increase the fluid pressure in the pressurizing chamber at a higher rate than when the fluid pressure in the pressurizing chamber is increased by an advancing movement of the pressurizing piston based on an operation of the brake operating member and by a flow of the pressurized fluid to the pressurizing chamber through the second flow control device. The present arrangement is effective to reduce a delayed increase in the fluid pressure in the pressurizing chamber of the master cylinder due to a delayed response of the second flow control device, and an accordingly delayed activation of the wheel brake cylinder, when the brake operating member is operated abruptly or at a relatively high speed, for instance.

(11) A braking system according to any one of the above modes (1)–(10), wherein the master cylinder includes a communication control device for effecting fluid communication between the pressurizing chamber and the reservoir when the pressurizing piston is placed at a fully retracted position, and inhibiting at least a flow of the fluid from the pressurizing chamber toward the reservoir when the pressurizing piston has been advanced by more than a predetermined distance, the braking system further comprising:

a main controller for controlling the first and second flow control devices, the main controller including an unintended braking control portion operable when the brake operating member is not in operation, to control the first flow control device to control the fluid pressure in the assisting chamber for advancing the pressurizing piston to be advanced by more than the predetermined distance, and control the second flow control device to increase the fluid pressure in the pressurizing chamber.

The communication control device may include portions of the cylinder housing and the pressurizing piston through which respective ports are formed such that these ports communicate with each other when the brake operating member is placed at the fully retracted position and are spaced apart from each other when the brake operating member has been advanced by more than the predetermined distance. Alternatively, the communication control device may be constituted by a shut-off valve which is mechanically opened and closed depending upon a position of the pressurizing piston.

When the brake operating member is operated, the pressurizing piston is advanced from its fully retracted position with the pressurizing force based on the operating force of the brake operating member, by more than the predetermined distance, so that the fluid in the pressurizing chamber is pressurized while the communication control device prevents a flow of the fluid from the pressurizing chamber to the reservoir. In the braking system according to the above mode (11), the first flow control device can be controlled to control the fluid pressure in the assisting chamber for advancing the pressurizing piston by more than the predetermined distance, even when the brake operating member is not in operation, so that the pressurized fluid is prevented from being discharged from the pressurizing chamber to the reservoir. Accordingly, the fluid in the pressurizing chamber can be pressurized if the second flow control device is so controlled while the brake operating member is not in operation. In this condition, too, the operating force and stroke of the brake operating member and the operating state of the wheel brake cylinder are controlled so as to satisfy the predetermined relationships with each other, by controlling the first and second flow control device. Namely, these flow control devices are controlled while the brake operating member is not in operation, to perform various braking controls as needed, for instance, a traction control, a vehicle running or turning stability control, and other automatic braking controls. In the present braking system, the pressurizing piston is advanced from its fully retracted position by more than the predetermined distance, for inhibiting the fluid flow from the pressurizing chamber to the reservoir. However, this advancing distance of the pressurizing piston is very small, so that the amount of displacement of the brake operating member caused by the advancing movement of the pressurizing piston is accordingly small, where the brake operating member is operatively connected to the pressurizing piston such that the brake operating member is displaced with a movement of the pressurizing piston. Where the brake operating member is operatively connected to the pressurizing piston such that the brake operating member is not displaced with the pressurizing piston, the amount of play of the brake operating member after the pressurizing piston has been advanced by more than the predetermined distance is also small since the predetermined distance of the advancing movement of the pressurizing piston is very small. Accordingly, the vehicle operator is unlikely or less likely to feel a displacement of the brake operating member or an excessive amount of play of the brake operating member, when the brake operating member is operated during any automatic braking control.

(12) A braking system according to the above mode (11), further comprising a wheel-brake-cylinder-pressure control device disposed between the pressurizing chamber, and the wheel brake cylinder and a reservoir device, the wheel-brake-cylinder-pressure control device being operable to control a pressure of the fluid in the wheel brake cylinder, and wherein the unintended braking control portion controls the second flow control device to increase a pressure of the fluid in the pressurizing chamber to a level high enough to permit the pressurized fluid in the pressurizing chamber to be used as a hydraulic pressure source for the wheel-brake-cylinder-pressure control device.

The fluid pressure in the wheel brake cylinder can be controlled by controlling the second flow control device to control the fluid pressure in the pressurizing chamber. In the braking system according to the above mode (12) wherein the wheel-brake-cylinder-pressure control device is provided, the fluid pressure in the wheel brake cylinder can be controlled to a value different from the value of the fluid pressure in the pressurizing chamber. Where the braking system includes wheel brake cylinders for braking a plurality of wheels, the fluid pressure in the different wheel brake cylinders can be controlled to respective different values. Therefore, the present arrangement permits improved accuracy of control of the fluid pressure in the wheel brake cylinder, in the traction control or any other automatic braking control, which is effected while the brake operating member is not in operation.

(13) A braking system according to any one of the above modes (1)–(12), wherein the first flow control device includes a pilot-operated pressure regulator operable to control the pressure of the pressurized fluid received from the hydraulic pressure source, to a value corresponding the pressure of the fluid in the pressurizing chamber received as a pilot pressure.

The pilot-operated pressure regulator provided in the braking system according to the above mode (13) is operated when the first flow control device fails to normally operate to control the flows of the fluid to and from the assisting chamber, due to a defect of the hydraulic pressure source, for example. The pressure regulator is arranged to control the pressure of the pressurized fluid received from the hydraulic pressure source, to a value corresponding to the fluid pressure in the pressurizing chamber, and apply the controlled fluid pressure to the assisting chamber, so that the operating force of the brake operating member is boosted by the fluid pressure in the assisting chamber.

(14) A braking system according to the above mode (13), wherein the first flow control device comprises:
an electrically operated hydraulic pressure control device disposed in parallel connection with the pilot-operated pressure regulator and electrically controlled to control the pressure of the fluid in the assisting chamber; and
a selecting device connected to the pilot-operated pressure regulator, the electrically operated hydraulic pressure control device and the assisting chamber, and operable to selectively apply to the assisting chamber the fluid pressure controlled by the pilot-operated pressure regulator or the electrically operated hydraulic pressure control device.

In the braking system according to the above mode (13), one of the fluid pressures controlled by the pilot-operated pressure regulator and the electrically operated hydraulic control device is selectively applied to the assisting chamber, so that the operating force of the brake operating member can be boosted by the fluid pressure in the assisting chamber even when the fluid pressure controlled by the electrically operated hydraulic pressure control device cannot be applied to the assisting chamber, for example, since the fluid pressure regulated by the pilot-operated pressure regulator is applied to the assisting chamber.

(15) A braking system according to the above mode (14), wherein the selecting device includes a change valve operable to apply to the assisting chamber a higher one of the fluid pressures controlled by the pilot-operated pressure regulator and the electrically operated hydraulic pressure control device.

(16) A braking system according to the above mode (14), wherein the selecting device includes a shutting-off device connected between the pilot-operated pressure regulator and the assisting chamber and operable to disconnect the pilot-operated pressure regulator and the assisting chamber from each other.

The shutting-off device may be a solenoid-operated shut-off valve.

(17) A braking system according to the above mode (13), wherein the pilot-operated pressure regulator has a high-pressure port connected to the hydraulic pressure source, a control-pressure port connected to the assisting chamber, a low-pressure port connected to the reservoir, and a pilot-pressure port connected to the pressurizing chamber, the pressure regulator being operable to effect fluid communication of the control-pressure port with the high-pressure port or the low-pressure port, for increasing or reducing the fluid pressure in the control-pressure port, depending upon the fluid pressure applied to the pilot-pressure port.

The pilot-operated pressure regulator is adapted to control the fluid pressure in the control-pressure port, to a value corresponding to the fluid pressure applied to the pilot-pressure port, and apply the thus controlled fluid pressure to the assisting chamber.

(18) A braking system according to the above mode (17), wherein the first flow control device includes a normally open solenoid-operated control valve connected between the low-pressure-port of the pressure regulator and the reservoir.

While the normally open solenoid-operated control valve is normally functioning, this control valve reduces the fluid pressure in the control-pressure port and therefore the fluid pressure in the assisting chamber, to a value corresponding to the operating force of the brake operating member, so that the fluid pressure in the assisting chamber is controlled so as to control the fluid pressure in the pressurizing chamber to a value which has a predetermined relationship with the operating force of the brake operating member. Further, by holding the normally open solenoid-operated control valve in the closed state while this control valve is normally functioning, the fluid pressure in the assisting chamber is prevented from being discharged to the reservoir through the control-pressure port and the low-pressure port. Accordingly, the fluid pressure received from the first flow control device rather than the fluid pressure received from the pressure regulator can be applied to the assisting chamber, so that the fluid pressure in the assisting chamber can be increased by the fluid pressure controlled by the first flow control device. Where the normally open solenoid-operated control valve cannot be closed and held open due to some defect or abnormality associated with this control valve, the fluid pressure in the assisting chamber (fluid pressure in the control-pressure port) is mechanically reduced according to the fluid pressure applied to the pilot-pressure port (according to the fluid pressure in the pressurizing chamber). The above-indicated defect or abnormality may be a failure to apply an electric current to the coil of the solenoid-operated control valve, a defect of the control valve per se, such as a failure of the control valve to normally function even with an electric current being applied to its coil, or a defect of a control device provided to control the solenoid-operated control valve.

(19) A braking system according to the above mode (18), wherein the normally open solenoid-operated control valve is a linear control valve capable of continuously controlling at least one of a flow rate and a pressure of the fluid.

(20) A braking system according to the above mode (19), further comprising a valve control device for controlling the linear control valve such that the fluid pressure in the low-pressure port is higher than the fluid pressure in the pilot-pressure port.

By controlling the fluid pressure in the low-pressure port to a value higher than the fluid pressure in the pilot-pressure port, the fluid pressure in the control-pressure port can also be controlled to a value higher than the fluid pressure in the pilot-pressure port. That is, the fluid pressure in the control-pressure port is not controlled to a value corresponding the fluid pressure in the pilot-pressure port, but is controlled by the linear control valve. Thus, the fluid pressure in the assisting chamber is controlled by the linear control valve, as if the pilot-operated pressure regulator were not provided.

(21) A braking system according to any one of the above modes (17)–(20), wherein the first flow control device includes a normally closed solenoid-operated control valve connected between the hydraulic pressure source and the assisting chamber, in parallel connection with the pilot-operated pressure regulator.

(22) A braking system according to the above mode (21), wherein the normally closed solenoid-operated control valve is a linear control valve capable of continuously controlling at least one of a flow rate and a pressure of the fluid.

(23) A braking system according to the above mode (21) or (22), further comprising a valve control device operable while the normally closed solenoid-operated control valve is normally functioning, for holding the normally closed solenoid-operated control valve in a closed state, irrespective of the fluid pressures in the pilot-pressure port and the control-pressure port.

While the normally closed solenoid-operated control valve is normally functioning, the fluid pressure of the hydraulic pressure source as controlled by this solenoid-operated control valve is applied to the assisting chamber, so that the fluid pressures in the control-pressure chamber and the pilot-pressure chamber are increased. By holding the normally open solenoid-operated control valve in the closed state, irrespective of the fluid pressures in those control-pressure and pilot-pressure chambers, however, the control-pressure port is disconnected from the reservoir and the hydraulic pressure source, so that the fluid pressure in the assisting chamber is increased by the normally closed solenoid-operated control valve, as if the pilot-operated pressure regulator were not provided. The valve control device may be adapted to control the normally closed solenoid-operated control valve such that the fluid pressure in the control-pressure port is higher than the fluid pressure in the pilot-pressure port. In this case, the control-pressure port is stably prevented from communicating with the hydraulic pressure source through the high-pressure port, so that the pressure regulator is held in a state in which it does not function, as if it were not provided. When it becomes necessary to reduce the fluid pressure in the assisting chamber, the fluid pressure in the assisting chamber is reduced by the normally open solenoid-operated control valve indicated above. In this case, the pressure regulator is preferably held in the state in which it does not function, except permitting the fluid to flow therethrough, as if it were not provided, as in the braking system according to the above mode (20).

Where the normally closed solenoid-operated control valve cannot be opened and is held closed due to a defect or abnormality associated with the control valve, the fluid pressure in the control-pressure port is mechanically increased according to the fluid pressure applied to the pilot-pressure port. In this event, the normally open solenoid-operated control valve indicated above is held in its fully open state, so s to permit the pilot-operated pressure regulator to perform its normal operation. Where the normally closed and normally open solenoid-operated control valves are both inoperable to perform their functions due to a defect of the electric system of the braking system, for example, these two control valves are both necessarily placed in the fully open state.

(24) A braking system according to any one of the above modes (17)–(23), wherein the pilot-operated pressure regulator comprises:
  a control piston which receives the fluid pressure applied to the pilot-pressure port in an advancing direction thereof:
    a first valve portion operable depending upon a movement of the control piston in the advancing direction or a retracting direction opposite to the advancing direction, for selectively permitting and inhibiting fluid communication between the control-pressure port and the high-pressure port; and a second valve portion operable according to the movement of the control piston in the advancing direction or retracting direction, for selectively permitting and inhibiting fluid communication -between the control-pressure port and the low-pressure port.

(25) A braking system according to any one of the above modes (1)–(24), wherein the first flow control device comprises:

an electrically operated hydraulic pressure control device disposed between the hydraulic pressure source and the reservoir, and the assisting chamber, and electrically controlled to control the fluid pressure in the assisting chamber;

a by-pass passage which by-passes the electrically operated hydraulic pressure control device; and a check valve device disposed in the by-pass passage, the check valve device permitting a flow of the fluid in a first direction from the reservoir toward the assisting chamber and inhibiting a flow of the fluid in a second direction opposite to the first direction.

In the braking system according to the above mode (25), the fluid can be supplied from the reservoir to the assisting chamber through the by-pass passage and the check valve device, permitting the pressurizing piston to be advanced, even where the first flow control device is defective and is not capable of supplying the assisting chamber with the pressurized fluid. Thus, the brake operating member can be operated even while the first flow control device is defective. When the brake operating member is operated abruptly or at a considerably high speed, the first flow control device may suffer from a delayed supply of the pressurized fluid to the assisting chamber. In this case, the fluid is supplied from the reservoir to the assisting chamber through the by-pass passage and the check valve device, thereby permitting the brake operating member to be operated while preventing the assisting chamber from be evacuated.

(26) A braking system according to any one of the above modes (1)–(25), wherein the second flow control device comprises:

an electrically operated hydraulic pressure control device disposed between the hydraulic pressure source and the reservoir, and the pressurizing chamber, and electrically controlled to control the fluid pressure in the pressurizing chamber; and shutting-off device disposed between the electrically operated hydraulic pressure control device and the pressurizing chamber, for inhibiting fluid communication between the electrically operated hydraulic pressure control device and the pressurizing chamber.

The shutting-off device indicated above may be a solenoid-operated shut-off valve.

In the braking system according to the above mode (26), the fluid communication between the electrically operated hydraulic pressure control device and the pressurizing chamber can be inhibited or prevented by the shutting-off device, to inhibit or prevent fluid communication of the pressurizing chamber with the reservoir and the hydraulic pressure source through the electrically operated hydraulic pressure control device, even when the electrically operated hydraulic pressure control device of the second flow control device is not normally operable to perform its pressure control function, causing the pressurized fluid to be continuously supplied from the hydraulic pressure source to the pressurizing chamber irrespective of an operation of the brake operating member, or causing the pressurized fluid to be continuously discharged from the pressurizing chamber to the reservoir. Accordingly, the fluid in the pressurizing chamber can be pressurized to active the wheel brake cylinder by an operation of the brake operating member, even where the electrically operated hydraulic pressure control device is not normally operable.

(27) A braking system for a vehicle having a wheel, comprising:

a master cylinder including a cylinder housing, and a pressurizing piston which is fluid-tightly and slidably received in the cylinder housing and which cooperates with the cylinder housing to define a pressurizing chamber in front of the pressurizing piston, a working fluid in the pressurizing chamber being pressurized by an advancing movement of the pressurizing piston;

a brake for braking the wheel;

a wheel brake cylinder connected to the pressurizing chamber of the master cylinder, and operable with the pressurized fluid supplied from the pressurizing chamber, for activating the brake;

a brake operating device including a brake operating member manually operable with a brake operating force to apply a first pressurizing force based on the brake operating force to the pressurizing piston;

an electrically operated hydraulic pressure source operable to pressurize the working fluid and control a pressure of the pressurized fluid;

an assisting device operable to apply a second pressurizing force based on the pressurized fluid supplied from the electrically operated hydraulic pressure source; and a pressurized-fluid supplying device for supplying the fluid pressurized by the electrically operated hydraulic pressure source to at least one of the pressurizing chamber and the wheel brake cylinder.

In the vehicle braking system according to the above mode (27), the fluid pressurized by the electrically operated hydraulic pressure source is supplied to the assisting device and to at least one of the pressurizing chamber and the wheel brake cylinder. The required operating stroke of the brake operating member is required by an amount corresponding to the pressure of the pressurized fluid supplied to the pressurizing or the wheel brake cylinder. Further, the operating stroke of the brake operating member can be controlled as desired, by controlling the amount of the pressurized fluid to be supplied to at least one of the pressurizing chamber and the wheel brake cylinder.

The pressurizing chamber may be connected through a main fluid passage to the wheel brake cylinder. A suitable pressure-increasing device or other pressure control device may be provided in the main fluid passage so that the fluid pressure in the wheel brake cylinder is controlled by the pressure control device according to the pressure of the pressurized fluid supplied from the pressurizing chamber.

The pressurized-fluid supply device may be adapted to supply the pressurized fluid from the electrically operated hydraulic pressure source to the pressurizing chamber or to the main fluid passage which connects the pressurizing chamber and the wheel brake cylinder. In the later case, the main fluid passage may be provided with a shutting-off device having a closed state and an open state for inhibiting and permitting fluid communication between the pressurizing chamber and the wheel brake cylinder. In this case, the pressurized fluid can be supplied from the pressurizing chamber to the wheel brake cylinder through the shutting-off device placed in the open state.

The assisting device may have the assisting chamber provided in the master cylinder used in the braking system according to the above mode (1). Alternatively, the assisting device may include a hydraulic cylinder separate from the master cylinder, and a force transmitting device for transmitting a force from the hydraulic cylinder to the pressurizing piston.

The electrically operated hydraulic pressure source may include the hydraulic pressure source and the first flow control device, which are provided in the braking system according to the above mode (1). The second flow control device provided in the braking system according to the above mode (1). may be considered to be an example of the pressurized-fluid supplying device in the present braking system according to the above mode (27). Alternatively, the second flow control device may be considered to be a part of the electrically operated hydraulic pressure-source, and a connecting passage connecting the second flow control device and at least one of the pressurizing chamber and the wheel brake cylinder may be considered to be the pressurized-fluid supplying device.

Thus, the vehicle braking system according to the above mode (27) may be considered to be one form of the vehicle braking system according to the above mode (1). It will be understood that the vehicle braking system according to the present mode (27 may incorporate any one of the features of the braking systems according to the above modes (2)–(24).

(28) A braking system according to the above mode (27), wherein the pressurized-fluid supplying device includes a device capable of controlling an amount of the pressurized fluid to be supplied from the electrically operated hydraulic pressure source to at least one of the pressurizing chamber and the wheel brake cylinder.

In the braking system according to the above mode (28) wherein the amount of supply of the pressurized fluid from the electrically operated hydraulic pressure source is controlled by the pressurized-fluid supplying device, the operating force of the brake operating member can be controlled in a predetermined relationship with the operating stroke of the brake operating member or the fluid pressure in the pressurizing chamber.

BRIEF DESCRIPTION OF THE INVENTION

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
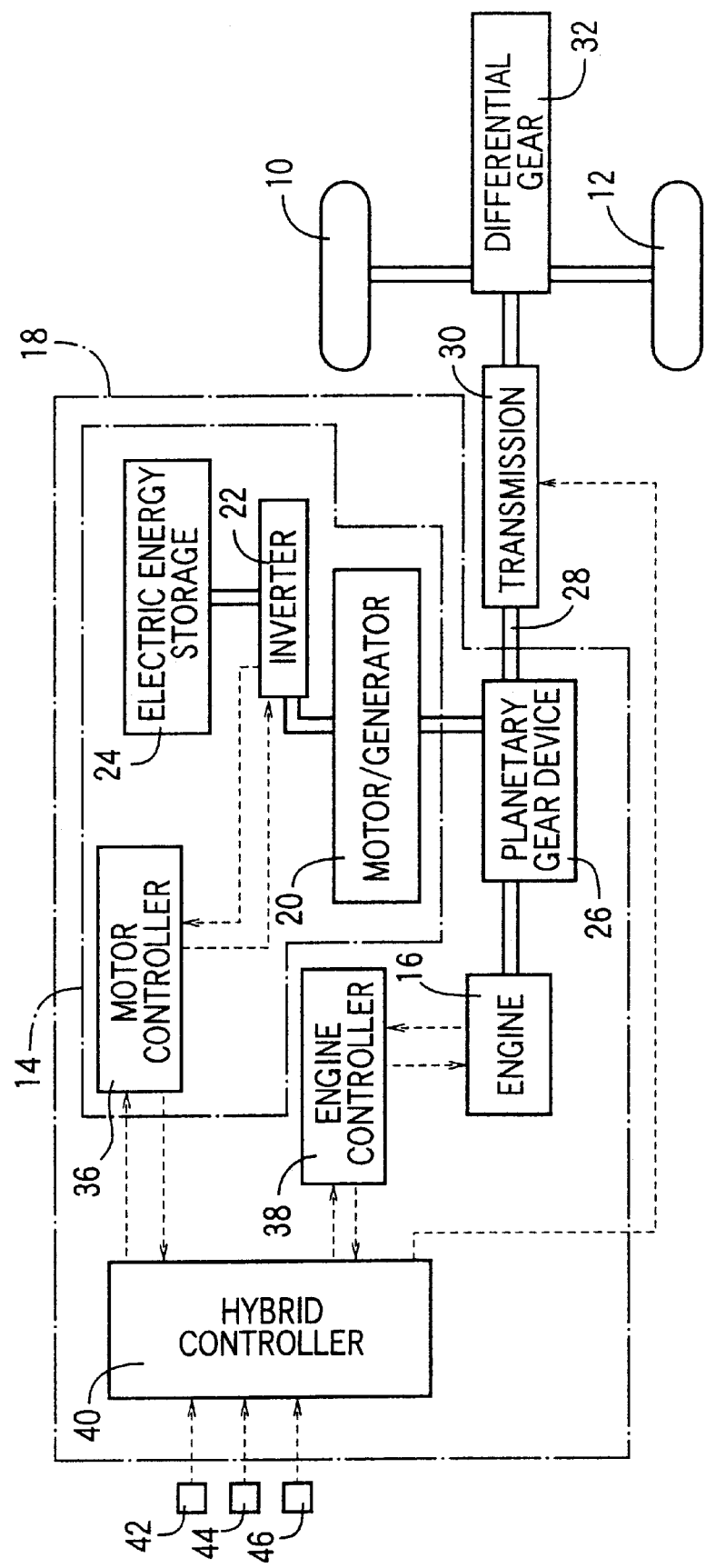
FIG. 1 is schematic view of a drive system of an automotive vehicle equipped with a braking system constructed according to one embodiment of this invention.
Figure 2:
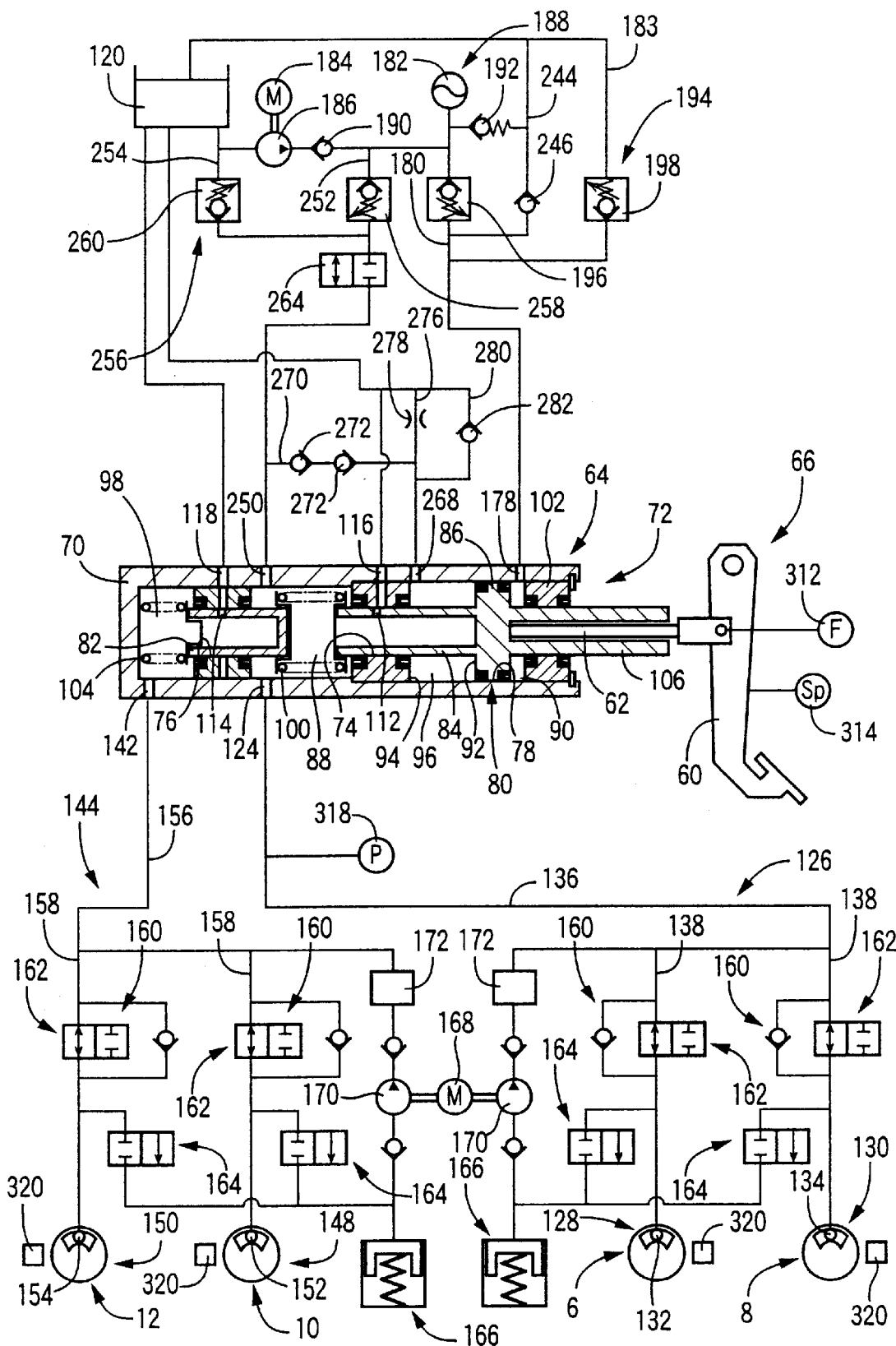
FIG. 2 is a view showing a hydraulic braking apparatus of the braking system of FIG. 1.

Referring to first to FIG. 1, there is schematically shown a drive system of an automotive vehicle equipped with a braking system constructed according to one embodiment of this invention. The automotive vehicle is a hybrid vehicle, wherein the braking system includes a regenerative braking apparatus and a hydraulic braking apparatus. As shown in FIG. 2, the vehicle has a front left wheel 6 and a front right wheel 8 as non-drive wheels, a rear left wheel 10 and a rear right wheel 12 as drive wheels. The rear wheels 10, 12 are driven by a vehicle drive device 18 which includes an electric drive device 14 and an internal combustion drive device in the form of an engine 16, as shown in FIG. 1. The electric drive device 14 includes a motor/generator 20 (which selectively functions as an electric generator and an electric motor), an inverter 22, and an electric energy storage 24. The vehicle drive device 18 further includes a planetary gear device 26 interposed between the motor/generator 20 and the engine 16. The planetary gear device 26 includes a sun gear connected to the motor/generator 20, a ring gear connected to an output shaft of the engine 16 through a clutch, and a carrier connected to an output shaft 28. Another clutch is provided between the carrier and sun gear of the planetary gear device 26. The output shaft of the planetary gear device 26 is connected to the rear wheels 10, 12 through a transmission 30 and a differential gear 32.

By controlling the engaging and releasing actions of the above-indicated clutches and the operating states of the engine 16 and motor/generator 20, the output shaft 28 selectively receives an output torque of the engine 16, an output torque of the motor/generator 20, or both of the output torques of the engine 16 and motor/generator 20. The planetary gear device 26 functions as a synthesizing/distributing mechanism for synthesizing the output torques of the motor/generator 20 and the engine 16 or distributing a torque to the motor/generator 20 and the engine 16.

The inverter 22 is provided between the motor/generator 20 and the electric energy storage 24. By controlling the inverter 22, the motor/generator 20 is selectively placed in one of three operating states: a vehicle driving state in which the motor/generator 20 is operated as the electric motor with an electric energy supplied from the electric energy storage 24, to drive the vehicle; a regenerative braking state or charging state which the motor/generator is operated as the electric generator with a kinetic energy of the vehicle, so as to charge the electric energy storage 24; and a non-load state in which the motor/generator 20 is operated under no load.

The inverter 22 is adapted to control the motor/generator 20, according to control commands received from is a motor controller 36 which is principally constituted by a computer. The engine 16 is controlled by an engine controller 38 also principally constituted by a computer. The engine 16 and the motor/generator 20 are controlled so as to produce a drive torque which is determined by an operating amount of an accelerator pedal provided on the vehicle, or an angle of opening of a throttle valve of the engine 16, which is determined by the operating amount of the accelerator pedal.

The transmission 30 includes a hydraulic circuit the operating state of which is mechanically changed according to a presently selected position of a shift lever provided on the vehicle, and further includes a plurality of clutches and brakes which are automatically controlled depending upon the vehicle conditions such as the running speed. The clutches and brakes are automatically controlled to change the speed ratio of the transmission 30 while the shift lever is placed in a DRIVE position "D" during running of the vehicle. In the present specific embodiment, the shift lever further has a PARKING position "P", a NEUTRAL position "N", a BRAKE position "B" and a REVERSE position "R". The hydraulic circuit of the transmission 30 is mechanically placed in one of three states corresponding to the DRIVE, NEUTRAL and REVERSE positions of the shift lever. When the motor/generator 20 of the electric drive device 14 is placed. in the regenerative braking or charging state, a regenerative braking torque generated by the motor/generator 20 is applied to the rear wheels 10, 12. In this case, the electric drive device 14 functions as a regenerative braking apparatus. Generally, the regenerative braking torque is generated when the accelerator pedal is released during running of the vehicle at a relatively high speed. When the accelerator pedal is operated, the motor/generator 20 functions as the electric motor for producing a vehicle drive torque corresponding to the operating amount of the accelerator pedal.

The motor controller 36 and the engine controller 38 are connected to the hybrid controller 40. The hybrid controller 40 is principally constituted by a computer which incorporates a processing unit (PU), a read-only memory (ROM), a random-access memory (RAM) and an input/output port (I/O). The engine controller 38 and the hybrid controller 40 cooperate with the electric drive device 18, the engine 16 and the planetary gear device 26 to constitute the vehicle drive device 18. To the I/O port of the computer of the hybrid controller 40, there are connected a shift position detector 42 for detecting the presently selected position of the shift lever, a throttle sensor 44 for detecting the angle of opening of the throttle valve of the engine 16 (which angle corresponds to the operating amount of the accelerator pedal), an energy amount sensor 46 for detecting the amount of electric energy stored in the electric energy storage 24, and other detectors and sensors. The hybrid controller 40 operates according to the output signals of those detectors and sensors, to apply control commands to the motor controller 36 and the engine controller 38, and control the transmission 30. The ROM of the computer of the hybrid controller 40 stores various control programs for controlling the electric drive device 14, the engine 16 and the transmission 30 according to the output signals of the detectors and sensors.

Described in detail, the hybrid controller 40 provides the motor controller 36 with desired torque data (desired output torque commands) representative of a desired drive torque of the motor/generator 20 functioning as the electric motor, and a desired regenerative braking torque of the motor/generator 20 functioning as the electric generator. On the other hand, the motor controller 36 provides the hybrid controller 40 with operating state data representative of the rotating speed, electric current and other operating states of the motor/generator 30. The motor controller 36 applies to the inverter 22 a control command corresponding to the desired drive torque or desired regenerative braking torque represented by the desired output torque command received from the hybrid controller 40, so that the motor/generator 20 is controlled such that its actual output torque (drive torque or regenerative braking torque) coincides with the desired torque. The hybrid controller 40 obtains the actual drive or regenerative braking torque of the motor/generator 20, on the basis of the operating state data received from the motor controller 36.

Similarly, the hybrid controller 40 provides the engine controller 38 with desired torque data representative of a desired output torque of the engine 16. The engine controller 38 provides the hybrid controller 40 with operating state data representative of the rotating speed of the output shaft of the engine 16 and other operating states of the engine 16. According to the desired output torque data received from the hybrid controller 40, the engine controller 38 controls the operating states of the engine 16, such as the amount and timing of fuel injection, ignition timing, opening and closing actions of the intake and exhaust valves, and throttle valve opening angle. The hybrid controller 40 obtains the actual drive torque of the engine 16, on the basis of the operating speed and other operating states represented by the operating state data received from the engine controller 38. When the hybrid controller 40 receives an output signal of the throttle sensor 44 and when the stored amount of electric energy of the electric energy storage 24 as represented by the output signal of the energy amount sensor 46 is smaller than a predetermined lower limit, the hybrid controller 40 applies to the engine controller 38 the engine output torque command representative of the desired vehicle drive torque represented by the output signal of the throttle sensor 44.

The vehicle braking system constructed according to the present embodiment has a brake operating member in the form of a brake pedal 60 as shown in FIG. 2. The brake pedal 60 is supported by the vehicle body such that the brake pedal 60 is pivotable about a horizontal axis. An operating rod 62 is pivotally connected at one of its opposite ends to the brake pedal 50, and operatively connected at the other end to a master cylinder 64, for transmitting an operating force acting on the brake pedal 60 to the master cylinder 64. In the present embodiment, the brake pedal 60 and the operating rod 62 cooperate to constitute a brake operating device 66 including the brake pedal 60 manually operable with a brake operating force to apply a pressurizing force based on the brake operating force to the pressurizing piston 80.

The master cylinder 64 has a housing 70 which is closed at one of its opposite ends and open at the other end. The housing 70 has a cylinder bore 72 with a circular shape in transverse cross section. The cylinder bore 72 has a first small-diameter portion 74, a second small-diameter portion 76 and a large-diameter portion 78, and accommodates a first pressurizing piston 80 and a second pressurizing piston 82 which are disposed in series with each other. The first small-diameter portion 74 and the large-diameter portion 78 are located adjacent to each other, and the first pressurizing piston 80 includes a small-diameter portion 84 fluid-tightly and slidably engaging the first small-diameter portion 74, and a large-diameter portion 86 fluid-tightly and slidably engaging the large-diameter portion 78. The small-diameter portion 84 partially defines a first pressurizing chamber 88 on its front side, while the large-diameter portion 86 partially defines an assisting chamber 90 on its rear side. The first pressurizing piston 80 and the housing 70 cooperate to define an annular chamber 96 between a shoulder surface 94 formed between the small-diameter portion 84 and the large-diameter portion 86 of the piston 80, and a shoulder surface 96 formed between the small-diameter portion 74 and the large-diameter portion 78 of the housing 70. The second small-diameter portion 76 of the housing 70 is located in front of the first small-diameter portion 74, and the second pressurizing piston 82 fluid-tightly and slidably engages the second small-diameter portion 76, and partially defines a second pressurizing chamber 98 on its front side.

The first pressurizing piston 80 is normally held at its fully retracted position of FIG. 2 under a biasing action of an elastic member in the form of a compression coil spring 100 disposed between the first and second pressurizing pistons 80, 82. The open end of the cylinder housing 70 is fluid-tightly closed by a closure member 102 removably fixed thereto. The fully retracted position of the first pressurizing piston 80 is determined by abutting contact of abutting surfaces of the piston 80 and the closure member 102, which abutting surfaces are perpendicular to the longitudinal direction of the cylinder housing 70. The second pressurizing piston 82 is normally held at its fully retracted position of FIG. 2 under a biasing action of an elastic member in the form of a compression coil spring 104 disposed in the second pressurizing chamber 98. The compression coil springs 100, 104 function as return springs for returning the first and second pressurizing pistons 80, 82 to their fully retracted positions after they are advanced. The fully retracted position of the second pressurizing piston 82 is determined by the fully retracted position of the first pressurizing piston 80, and the in initial length and initial load of the compression coil spring 100 which are determined by a suitable member not shown.

The first pressurizing piston 80 includes a hollow cylindrical piston rod 106 extending from the rear end face of its large-diameter portion 86. The piston rod 106 fluid-tightly and slidably extends through a radially central portion of the closure member 102 such that one of the opposite ends of the piston rod 106 remote from the large-diameter portion 86 is located outside the cylinder housing 70. The end portion of the operating rod 62 remote from the brake pedal 60 slidably engages a blind hole formed through the piston rod 106 such that the operating rod 62 and the piston rod 106 (first pressurizing piston 80) are axially movable relative to each other. The operating rod 62 is normally held in contact with the bottom surface of the blind hole, at its end remote fro the brake pedal 60. When the brake pedal 60 is operated, the operating rod 62 and the piston rod 106 are advanced together, that is, the first pressurizing piston 80 is advanced by the operating force acting on the brake pedal 60, so that a working fluid in the first pressurizing chamber 88 is pressurized. The pressure of the pressurized fluid in the first pressurizing chamber 88 acts on the second pressurizing piston 82, so as to advance the piston 82, so that the fluid in the second pressurizing chamber 98 is pressurized. Thus, the fluid masses in the first and second pressurizing chambers 88, 98 are pressurized to the same pressure level upon operation of the brake pedal 60.

Each of the small-diameter portion 84 of the first pressurizing piston 80 and the second pressurizing piston 82 takes the form of a hollow cylinder which is closed and open at its opposite ends, respectively, and has a port 112, 114 formed through its cylindrical wall in the radial direction, On the other hand, the cylinder housing 70 has two reservoir ports 116, 118 corresponding to the ports 112, 114, respectively. When the first and second pressurizing pistons 80, 82 are placed in their fully retracted positions of FIG. 2, the first and second pressurizing chambers 88, 98 are held in communication with a reservoir 12 through the ports 112, 114 in the pistons 80, 82 and the reservoir ports 116, 118 in the cylinder housing 70. When the two pressurizing pistons 80, 82 are advanced by a predetermined distance, the reservoir ports 116, 118 are closed by the respective pistons 80, 82 to prevent flows of the fluid from the first and second pressurizing chambers 88, 98 to the reservoir 120, so that the fluid in the chambers 88, 98 can be pressurized.

The first pressurizing chamber 88 is connected to two wheel brake cylinders 132, 134 for activating respective front left and right brakes 128, 130 provided for braking the respective front and right wheels 6, 8 through a brake cylinder port 124 formed through the cylinder housing 70, and through a main fluid passage 126. The main fluid passage 126 consist of a common passage 136 communicating with the brake cylinder port 124, and two branch passages 138 which extend from the common passage 136 and which are connected to the respective wheel brake cylinders 132, 134 at their ends remote from the common passage 136.

The second pressurizing chamber 98 is connected to two wheel brake cylinders 152, 154 for activating respective rear left and right brakes 148, 150 provided for braking the respective rear left and right wheels 10, 12, through a brake cylinder port 142 formed through the cylinder housing 70, and through a main fluid passage 144. The main fluid passage 144 consists of a common passage 156 communicating with the brake cylinder port 142, and two branch passages 158 which extend from the common passage 156 and which are connected to the respective wheel brake cylinders 152, 154 at their ends remote from the common passage 156. The hydraulic braking apparatus is constituted by the brakes 128, 130, 148, 150, the master cylinder 64, the reservoir 120, and solenoid-operated devices, first and second flow control devices, a hydraulic pressure source, and other elements, which will be described. It will be understood that the present hydraulic braking apparatus has two brake-application sub-systems, namely, a front sub-system and a rear sub-system which correspond to the respective first and second pressurizing chambers 80, 88 of the master cylinder 64 and which are connected to the respective front and rear pairs of wheel brake cylinders 132, 134, 152, 154 for the respective pairs of front and rear wheels 6, 8, 10, 12.

The hydraulic braking apparatus provided in the present braking system is provided with four solenoid-operated valve devices 160 for the respective four wheel brake cylinders 132, 134, 152, 154, in order to perform an antilock braking pressure control operation. Each solenoid-operated device 160 includes a pressure-increasing valve 162 and a pressure-reducing valve 164. The pressure-increasing valve 162 is a normally open solenoid-operated shut-off valve which normally permits a flow of the pressurized fluid from the master cylinder 64 into the corresponding wheel brake cylinder 132, 134, 152, 154, for thereby increasing the fluid pressure in the corresponding wheel is brake cylinder 132, 134, 152, 154. The pressure-reducing valve 164 is a normally closed solenoid-operated shut-off valve which, when placed in its open position, permits the fluid to be discharged from the corresponding wheel brake cylinder 132, 134, 152, 154 into a reservoir 166, for thereby reducing the fluid pressure in the corresponding wheel brake cylinder. The reservoir 166 is provided for each of the two sub-systems. The fluid pressure in each wheel brake cylinder 132, 134, 152, 154 can be increased, reduced and held constant, as needed, by appropriately controlling the operating states of the solenoid-operated shut-off valves 162, 164. The fluid pressure which has been discharged from the wheel brake cylinder 132, 134, 152, 154 into the reservoir 166 is returned to the main fluid passages 126, 144, by a pumping operation of a hydraulic pump 170, which is provided for each of the two sub-systems. The two hydraulic pumps 170 are driven by a common pump drive motor 168. Each pump 170 is connected to a damper chamber 172, which is provided for reducing a pressure pulsation of the fluid pressurized by the pump 170.

The cylinder housing 70 also has an outflow-inflow port 178 formed through its cylindrical wall, for fluid communication of the assisting chamber 90 with an accumulator 182 through a fluid passage 180, and with the above-indicated reservoir 120 through a fluid passage 183, so that a pressurized fluid is supplied from the accumulator 182 into the assisting chamber 90 and so that the pressurized fluid is discharged from the assisting chamber 90 into the reservoir 120. The fluid in the accumulator 182 is held at a predetermined level by operation of a hydraulic pump 186 by a pump drive motor 184. The pump 186 is adapted to pressurize the fluid received from the reservoir 120, and deliver the pressurized fluid to the accumulator 182. For instance, the pump 186 is a gear pump, or a plunger pump. The accumulator 182, the pump drive motor 184 and the pump 186 cooperate to constitute the hydraulic pressure source 188 indicated above. A check valve 190 is connected to the delivery side of the pump 186, to permit a flow of the fluid in a direction from the pump 186 toward the accumulator 182 and inhibit a flow of the fluid in the reverse direction, for inhibiting a flow of the pressurized fluid from the accumulator 182 to the reservoir 120 through the pump 186. Reference sign 192 denotes a pressure relief valve is opened when the fluid pressure in a fluid passage between the pump 186 and the accumulator 182 exceeds an upper limit which is lightly higher than the maximum pressure of the pressurized fluid that can be stored in the accumulator 182. Thus, the pressure relief valve 192 permits the pressurized fluid to be returned to the reservoir 120 if the pressurized fluid delivered from the pump 186 exceeds the upper limit indicated above.

Figure 3:
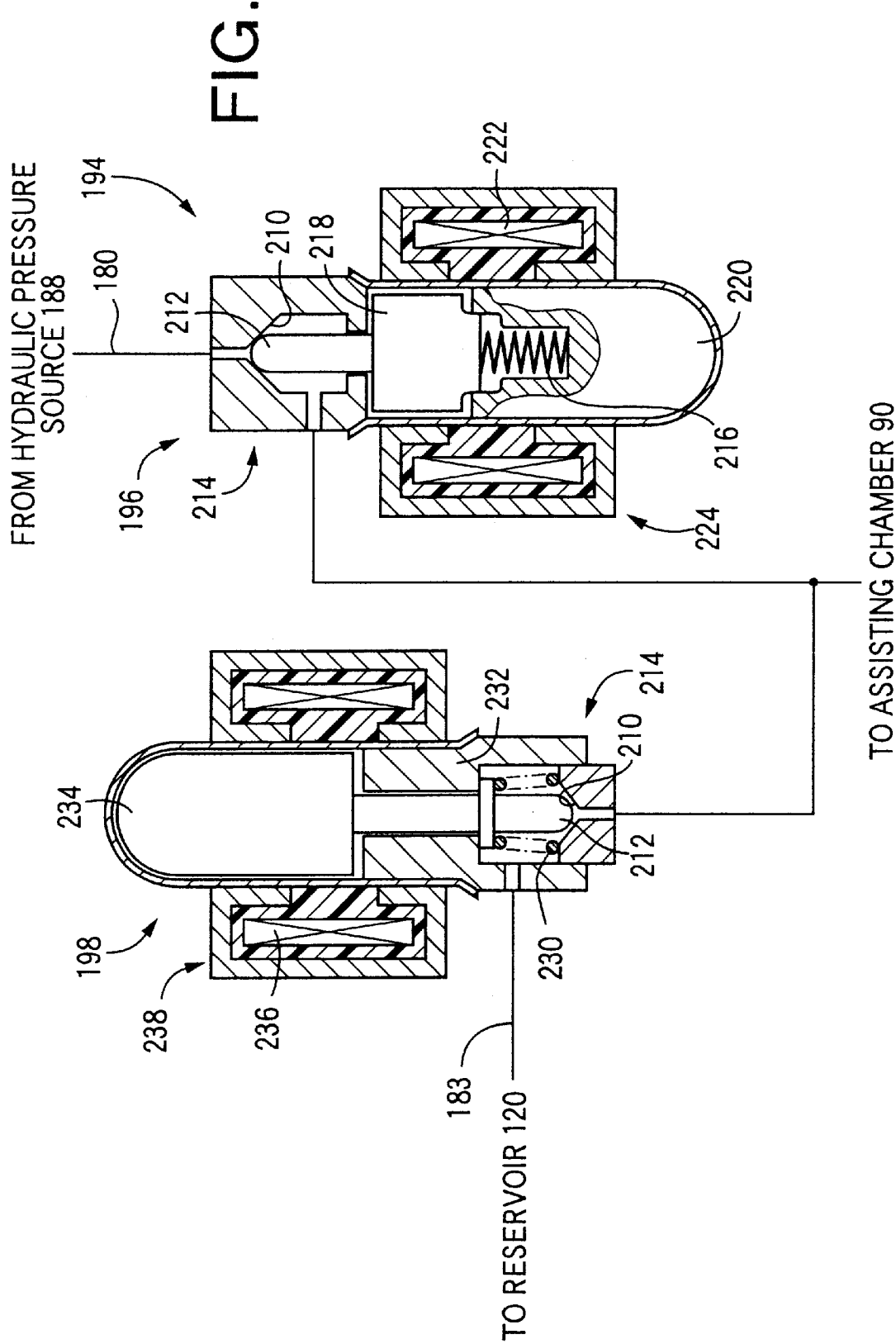
FIG. 3 is a front elevational view (partly in cross section) of a solenoid-operated pressure-increasing valve and a solenoid-operated pressure-reducing valve of a first flow control device provided in the braking system of FIG. 1.

The flows of the fluid between the assisting chamber and the hydraulic pressure source 188 and reservoir 120 are controlled by a first flow control device 194, which includes a solenoid-operated pressure-increasing valve 196 and a solenoid-operated pressure-reducing valve 198. The pressure-increasing valve 196 is a normally closed seat valve, while the pressure-reducing valve 198 is a normally open seat valve. These two valves 196, 198 are schematically shown in FIG. 3.

The solenoid-operated pressure-increasing valve 196 includes a seat valve 214 consisting of a valve seat 210 and a valve member 212 which is movable to be seated on and unseated from the valve seat 210. The valve member 212 is biased by a biasing device in the form of a spring 216 in a direction toward the valve seat 210. The valve member 212 is formed integrally with a movable core 218, which is opposed to a stationary core 220. The movable and stationary cores 218, 220 are biased by the spring 216 in opposite directions away from each other, so that the two cores 218, 220 are normally held spaced apart from each other. When a coil 222 is energized with an electric current applied thereto, an electromagnetic force produced as a result of the energization acts on the movable core 218 so as to move the movable core 218 toward the stationary core 220, so that the valve member 212 is moved away from the valve seat 210, that is, the seat valve 214 is opened. The movable core 218, stationary core 220 and coil 222 constitute a solenoid deice 224.

The solenoid-operated pressure-increasing valve 196 is connected to the hydraulic pressure source 188 and the assisting chamber 90 of the master cylinder 64 such that a fluid pressure difference across the seat valve 214 acts on the valve member 212 so as to move the valve member 212 in a direction away from the valve seat 210. When the coil 222 is energized, therefore, the valve member 212 is moved away from the valve seat 210 against a biasing action of the spring 216, by a sum of the electromagnetic drive force produced by the solenoid device 224 and a force based on the fluid pressure difference across the seat valve 214. As a result, the seat valve 214, that is, the pressure-increasing valve 196 is opened to permit the pressurized fluid to be supplied from the hydraulic pressure source 1188 to the assisting chamber 90, so that the fluid pressure in the assisting chamber 90 is raised. By controlling the amount of electric current to be applied to the coil 222, the fluid pressure in the assisting chamber 90 can be continuously increased.

The solenoid-operated pressure-reducing valve 198, which is a normally open seat valve, is more or less different in construction from the solenoid-operated pressure-increasing valve 196. The pressure-reducing valve 198 is identical with the pressure-increasing valve 196 in that the valve 198 includes a seat valve 214 consisting of a valve seat 210 and a valve member 212. However, the valve member 210 is biased by a spring 230 in a direction away from the valve seat 210. The seat valve 214 of the pressure-reducing valve 198 is connected to the reservoir 120 and the assisting chamber 90 of the master cylinder 64 such that a fluid pressure difference across the seat valve 214 acts on the valve member 212 so as to move the valve member 212 in a direction away from the valve seat 210. The valve member 212 extends through a through-hole formed through a central part of a stationary core 232, such that the rear end of the valve member 212 is located outside the rear end of the stationary core 232. The valve member 212 is formed integrally with a movable core 234 which is opposed to the stationary core 232. When a coil 232 is energized, an electromagnetic force produced as a result of this energization acts on the movable core 234 so as to move the movable core 234 toward the stationary core 232. The stationary core 232, movable core 234 and coil 236 cooperate to constitute a solenoid device 238. The valve member 212 is moved to be seated on the valve seat 210, by the electromagnetic drive force produced by the solenoid device 238 against a biasing action of the spring 230 and a force based on the fluid pressure difference across the seat valve 214. As a result, the seat valve 214, that is, the pressure-reducing valve 198 is closed to disconnect the assisting chamber 90 from the reservoir 120, for thereby inhibiting a flow of the pressurized fluid from the assisting chamber 90 to the reservoir 120.

When the amount of electric current applied to the coil 236 is reduced to reduce the electromagnetic drive force to be generated by the solenoid device 238, the valve member 212 is moved away from the valve seat 210, by a sum of the biasing force of the spring 230 and the force based on the fluid pressure difference across the seat valve 214, against the electromagnetic drive force. As a result, the pressure-reducing valve 198 is opened, to permit the fluid flow from the assisting chamber 90 into the reservoir 120, so that the fluid pressure in the assisting chamber 80 is reduced. The fluid pressure in the assisting chamber 90 can be continuously reduced by reducing the amount of electric current to be applied to the coil 236.

The assisting chamber 90 is connected to the reservoir 120 through a by-pass passage 244, which by-passes an electrically operated hydraulic pressure control device in the form of the solenoid-operated pressure-increasing and pressure-reducing valves 196, 198. In this by-pass passage 244, there is provided a check valve device in the form of a check valve 246 which permits a flow of the fluid in a direction from the reservoir 120 toward the assisting chamber 90 and inhibits a flow of the fluid in the reverse direction. The by-pass passage 244 and the check valve 246 cooperate with the pressure-increasing and pressure-reducing vales 196, 198 to constitute a first flow control device 194.

The cylinder housing 70 has an outflow-inflow port 250 connected through a fluid passage 252 to the above-indicated hydraulic pressure source 188, so that a pressurized fluid is supplied to the first pressurizing chamber 88 through the fluid passage 252 and the outflow-inflow port 250. To the fluid-passage 252 is connected a fluid passage 254, which in turn is connected to the reservoir 120, so that the pressurized fluid is discharged from the first pressurizing chamber 88 into the reservoir 120 through the outflow-inflow port 250 and the fluid passages 252, 254. Fluid flows between the first pressurizing chamber 88 and the hydraulic pressure source 188 and reservoir 120 are controlled by a second flow control device 256. The outflow-inflow port 250 is positioned between the first and second small-diameter portions 74, 76, so that the outflow-inflow port 250 is not closed by the first and second pressurizing pistons 80, 82. Thus, the outflow-inflow port 250 is held in communication with the first pressurizing chamber 88, so that the first pressurizing chamber 88 is always connected to the second flow control device 256. In the present embodiment, the hydraulic pressure source 188 and the reservoir 120 are provided commonly for the first and second flow control devices 194, 256, which are provided independently of each other. In other words, the hydraulic pressure source 188 is considered to serve as a first and a second hydraulic pressure source corresponding to the first and second flow control devices 194, 256, while the reservoir 120 is considered to serve as a first and a second reservoir corresponding to the two flow control devices 194, 256.

Figure 4:
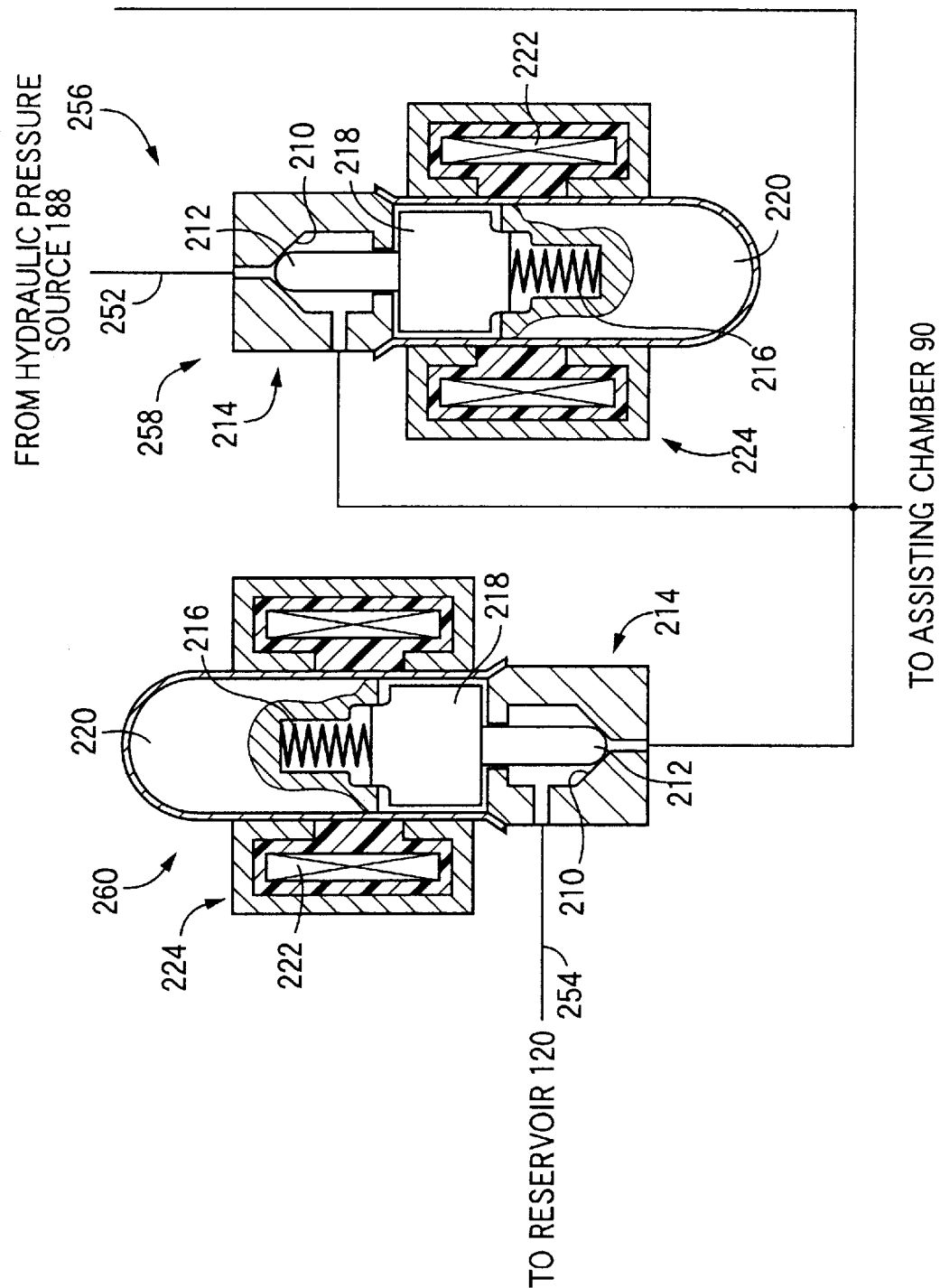
FIG. 4 is a front elevational view (partly in cross section) of a solenoid-operated pressure-increasing valve and a solenoid-operated pressure-reducing valve of a second flow control device provided in the braking system of FIG. 1.

The second flow control device 256 includes a solenoid-operated pressure-increasing valve 258 and a solenoid-operated pressure-reducing valve 260. As shown in FIG. 4, the pressure-increasing valve 258 is a normally closed seat valve which is identical in construction with the pressure-increasing valve 196 of the first flow control device 194. The same reference signs as used in FIG. 3 are used in FIG. 4 to identify the corresponding elements, and a further description of the construction of the valve 258 is dispensed with. The pressure-increasing valve 258 is arranged to increase the fluid pressure in the first pressurizing chamber 88 with an increase in the amount of electric current to be applied to the coil 222 of the valve 258.

The pressure-reducing valve 260 of the second flow control device 256 is a normally closed seat valve which is identical in construction with the pressure-increasing valve 258. The same reference signs as used in FIG. 3 are used in FIG. 4 to identify the corresponding elements, and a further description of the construction of the valve 260 is dispensed with. Unlike the pressure-reducing valve 198 of the first flow control device 194, the pressure-reducing valve 260 is normally closed, and its seat valve 214 is opened with an electromagnetic force acting on the vale member 212 upon application of an electric current to the coil 222. The pressure-reducing valve 260 is arranged to reduce the fluid pressure in the first pressurizing chamber 88 with an increase in the amount of electric current to be applied to the coil 222. Each of the pressure-increasing valve 196, pressure-reducing valve 198, pressure-increasing valve 258 and pressure-reducing valve 260 is a linear control valve capable of continuously changing the fluid pressure in the assisting chamber 90 or first pressurizing chamber 88.

A shutting-off device in the form of a normally closed solenoid-operated shut-off valve 264 is provided between the first pressurizing chamber 88 and the pressure-increasing and pressure-reducing valves 258, 260 of the second flow control device 256. The shut-off valves 264 selectively permits and inhibits flows of the fluid between the first pressurizing chamber 88 and the valves 258, 260, and flows of the fluid between the first pressurizing chamber 88 and the hydraulic pressure source 188 and reservoir 120 through those valves 258, 260. The pressure-increasing and pressure-reducing valves 258, 260 constitute an electrically operated hydraulic pressure control device, which cooperates with the solenoid-operated shut-off valve 264 to constitutes the second flow control device 256.

The cylinder housing 70 also has a connecting port 268 which communicates with the annular chamber 96 and which is connected to a connecting passage 270. The annular chamber 96 and the first pressurizing chamber 88 are connected to each other through the connecting port 268 and the connecting passage 270. Two check valves 272 are disposed in series with each other in the connecting passage 270. The check valves 272 constitute a check valve device, which permits a flow of the fluid in a direction from the annular chamber 96 toward the first pressurizing chamber 88, but inhibits a flow of the fluid in the reverse direction. The annular chamber 96 is also connected to the reservoir 120 through a fluid passage 276 which is provided with an orifice 278 serving as a throttling or flow restricting device. To the fluid-passage 276 is connected a by-pass passage 280 which by-passes the orifice 278. The by-pass passage 280 is provided with a check valve 282 which permits a fluid flow in a direction from the reservoir 120 toward the annular chamber 96 and inhibits a fluid flow in the reverse direction.

Figure 5:
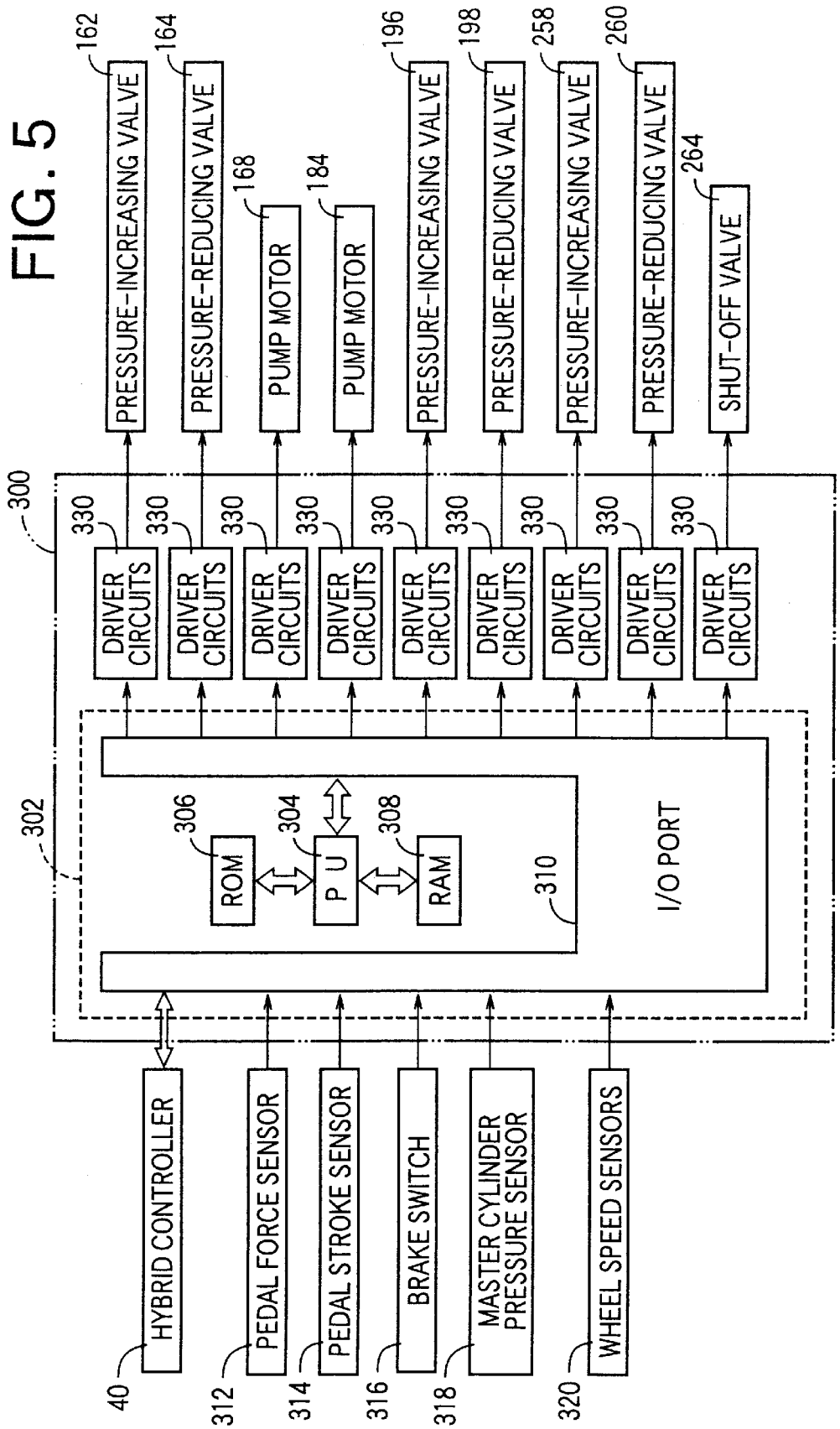
FIG. 5 is a block diagram schematically showing a brake control device provided in the braking system of FIG. 1.

The present braking system is provided with a brake controller 300 shown in FIG. 5. The brake controller 300 includes a computer 302 which incorporates a PU (processing unit) 304, a ROM (read-only memory) 308, and an I/O port (input/output port) 310. To the I/O port 310, there are connected a pedal force sensor 312, a pedal stroke sensor 314, a brake switch 316, a master cylinder pressure sensor 318, wheel speed sensors 320, and various other sensors (not shown) such as a yaw rate sensor. Further, the hybrid controller 40 is connected to the I/O port 310, for effecting data communication therebetween. To the I/O port 310, there are also connected driver circuits 330 for the pump drive motor 168 and other actuators such as the solenoid-operated valves indicated above. The driver circuits 330 and the computer 302 constitute the brake controller 300.

The pedal force sensor 312 and the pedal stroke sensor 314 are provided as sensors for detecting operating amounts of a brake operating member in the form of the brake pedal 60. In the present embodiments, the pedal force sensor 312 is adapted to detect an operating force acting on the brake pedal 70, while the pedal stroke sensor 31r is adapted to detect an operating stroke of the brake pedal 60. These sensors 312, 314 generate output signals indicative of the operating force and stroke of the brake pedal 60. The brake switch 316 generates an output signal indicating that the brake pedal 60 is in operation, and an output signal indicating that the brake pedal 60 is placed in its non-operated position. In the present embodiment, the brake switch 316 generates an ON signal when the brake pedal 60 is placed in an operated position, and an OFF signal when the brake pedal 60 is placed in its non-operated position. The master cylinder pressure sensor 318 is provided in the common passage 136 of the main fluid passage 126 which connects the first pressurizing chamber 88 and the wheel brake cylinders 132, 134. The master cylinder pressure sensor 318 generates an output signal indicative of the pressure of the fluid pressurized by the master cylinder 72. In the present embodiment, the pressure of the fluid pressurized by the master cylinder 72 during a normal operation of the braking system is equal to the fluid pressure in the wheel brake cylinders 132, 134, 152, 154. Thus, the operating state of the wheel brake cylinders can be detected by the output signal of the master cylinder pressure sensor 318. The wheel speed sensors 320 are provided for the front left and right wheels 6, 8 and the rear left and right wheels 10, 12, respectively. These wheel speed sensors 320 generate output signals indicative of the rotating speeds of these four wheels 6, 8, 10, 12.

The ROM 306 of the computer 302 of the brake controller 300 stores various control programs such as those for executing a main control routine, a normal braking pressure control routine, an anti-lock braking pressure control routine, a traction control routine, and a vehicle running stability control routine. The PU 304 operates to execute these control routines according to the corresponding control programs stored in the ROM 306, while utilizing a temporary data storage function of the RAM 308, so that the corresponding normal braking pressure control, anti-lock braking pressure control and other controls of the braking system are performed.

Then, an operation of the present braking system will be described.

In the present braking system, the wheel brakes 128, 130, 148, 150 are activated with pressurized fluid supplied to the respective wheel brake cylinders 132, 134, 152, 154, so that each of the wheels 6, 8, 10, 12 is braked with a hydraulic braking torque generated by the wheel brake cylinder 132, 134, 152, 154. Further, the rear wheels 10, 12 which are drive wheels are braked by a regenerative braking torque generated by the motor/generator 20. When the brake pedal 60 is operated, the fluid pressurized in the annular chamber 96 is delivered to the first pressurizing chamber 88 through the connecting passage 270. For easier understanding of the basic operation of the present braking system, the following description is based on an assumption that the regenerative braking operation is not effect and that the annular chamber 96 and the first pressurizing chamber 88 are not connected to each other.

When the brake pedal 60 is depressed, the operating rod 62 and the first pressurizing piston 80 are advanced, and the fluid in the first pressurizing chamber 88 is pressurized. At the same time, the second pressurizing piston 82 is advanced, and the fluid in the second pressurizing chamber 98 is pressurized. On the basis of the operating force and stroke of the brake pedal 60 detected by the pedal force sensor 312 and pedal stroke sensor 314, and the pressure of the master cylinder 64 detected by the master cylinder pressure sensor 318, the computer 302 controls the first and second flow control devices 194, 256 such that the detected operating force and stroke of the brake pedal 60 and the detected pressure of the master cylinder 64 have predetermined relationships with each other. In the present embodiment, the flow control devices 194, 256 are controlled such that the detected operating stroke of the brake pedal 60 has predetermined relationships with the detected pressure of the master cylinder 64 and the operating force of the brake pedal 60.

First, the control of the pressure of the fluid pressurized by the master cylinder 64 (hereinafter referred to as "master cylinder pressure") will be described. While the fluid in the first pressurizing chamber 88 is pressurized by an advancing movement of the first pressurizing piston 80, the master cylinder pressure is controlled by the second flow control device 256 such that the operating stroke of the brake pedal 60 (hereinafter referred to as "brake pedal stroke") and the master cylinder pressure have a predetermined relationship therebetween. When the second flow control valve device 256 is controlled to control the master cylinder pressure, the solenoid-operated shut-off valve 264 is opened. When the pressure-reducing valve 260 is closed while the pressure-increasing valve 258 is opened, in this condition, the pressurized fluid is supplied from the hydraulic pressure source 188 to the first pressurizing chamber 88, so that the fluid pressure in the first pressurizing chamber 88 is increased. When the pressure-increasing valve 258 is closed while the pressure-reducing valve 260 is opened, on the other hand, the fluid pressure in the first pressuring chamber 88 is reduced. Thus, the master cylinder pressure is increased when the pressurized fluid is supplied to the first pressurizing chamber 88, and is reduced when the pressurized fluid is discharged from the first pressurizing chamber 88, even if the operating stroke of the brake pedal 60 is kept constant. In other words, the master cylinder pressure corresponding to a given value of the operating stroke of the brake pedal 60 can be changed as needed, by controlling the flows of the pressurized fluid to and from the first pressurizing chamber 88.

Figure 6:
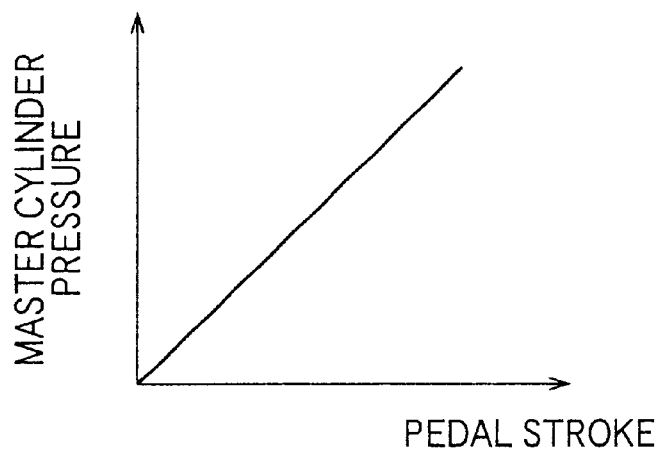
FIG. 6 is a graph indicating a relationship between a brake pedal stroke and a master cylinder pressure, which is obtained by the second flow control device.

In the present embodiment, the ROM 306 of the computer 302 stores an equation or a data map or table representative of a predetermined relationship between the brake pedal stroke and a desired value of the master cylinder pressure, as shown in the graph of FIG. 6. The supply of the pressurized fluid to the first pressurizing chamber 88 is controlled by the second flow control device 256 so that the actual master cylinder pressure coincides with the desired value which is determined on the basis of the detected brake pedal stroke and according to the predetermined relationship of FIG. 6.

The amounts of electric current to be applied to the coils 222 of the solenoid-operated pressure-increasing valve 258 and pressure-reducing valve 260 are controlled in both feed-forward and feedback manners. To this end, the computer 302 has a feed-forward control portion 340 and a feedback control portion 342 for the pressure-increasing valve 258, as illustrated in the functional block diagram of FIG. 9. Similarly, the computer 302 has a feed-forward control portion and a feedback control portion for the pressure-reducing valve 260.

Figure 9:
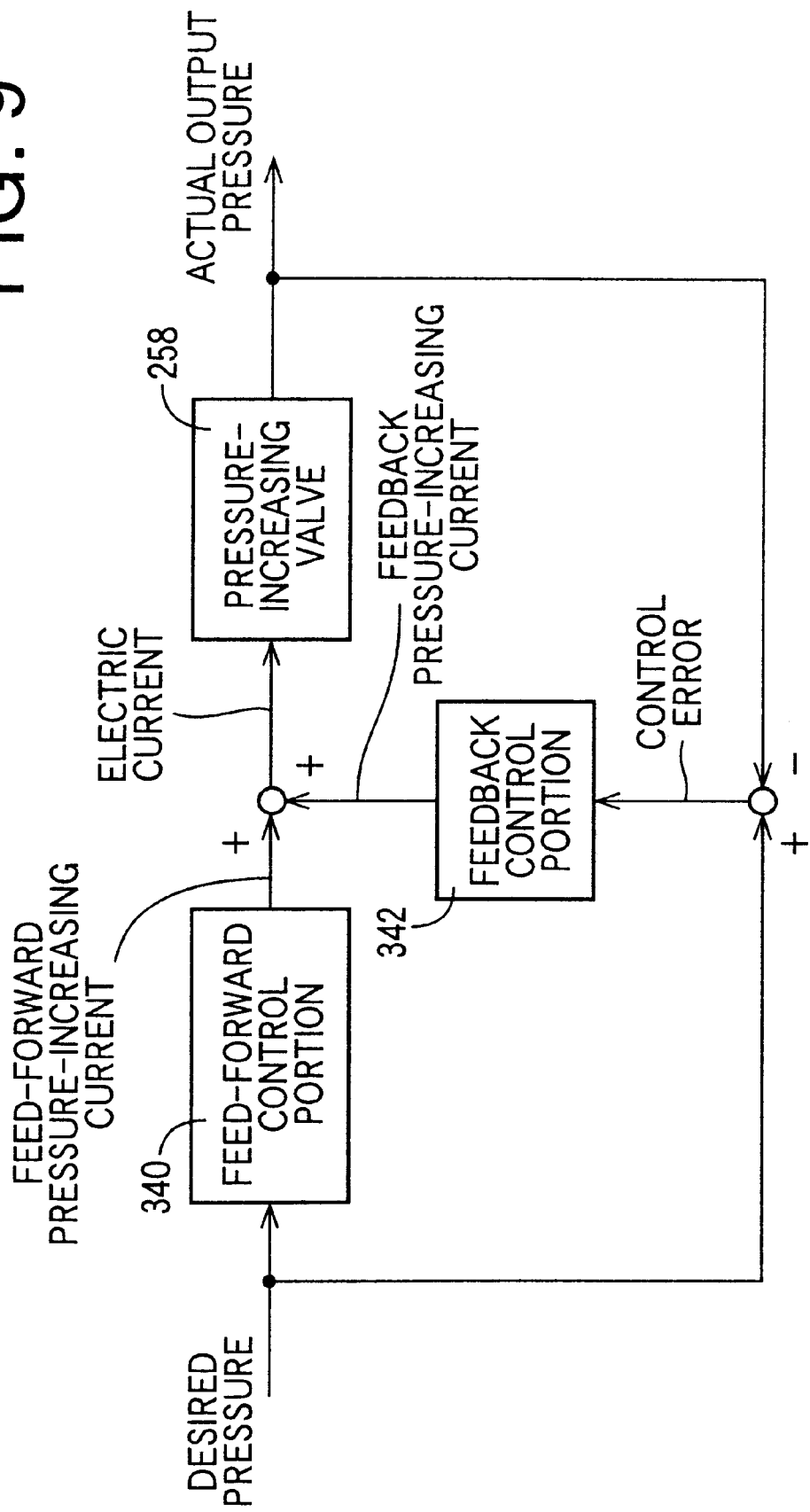
FIG. 9 is a block diagram for explaining a control of an electric current to be applied to the solenoid-operated pressure-increasing valve of the second flow control device.

The operation to control the pressure-increasing valve 258 will be described. To increase the fluid pressure in the first pressurizing chamber 88 of the master cylinder 64, the amount of opening of the normally closed pressure-increasing valve 258 is first determined on the basis of the desired value of the master cylinder pressure which corresponds to the detected operating stroke of the brake pedal 60. On the basis of the determined desired master cylinder pressure, the feed-forward control portion 340 determines an amount of feed-forward pressure increasing current, as a desired amount of electric current to be applied to the coil 222 for establishing the desired master cylinder pressure, as indicated in FIG. 9. In the present embodiment, the ROM 306 of the computer 302 stores a data table or map representative of a predetermined relationship between the desired master cylinder pressure and the desired amount of feed-forward pressure-increasing current. The feed-forward control portion 340 determines the desired amount of feed-forward pressure-increasing current on the basis of the determined desired master cylinder pressure and according to the stored relationship. This relationship may be represented by a stored equation. In the meantime, a control error which is a difference between the determined desired master cylinder pressure and the actual master cylinder pressure detected by the master cylinder pressure sensor 318 is calculated, and the feedback control portion 342 calculates a desired amount of feedback pressure-increasing current for zeroing the calculated control error, as also indicated in FIG. 9. The calculated desired amount of feedback pressure-increasing current is added to the desired amount of the desired amount of feed-forward pressure-increasing current, so that a sum of the desired amounts of feed-forward pressure-increasing current and feedback pressure-increasing current is applied to the coil 22 of the pressure-increasing valve 258. As a result, the pressure-increasing valve 258 is rapidly opened by an appropriate amount so that the actual master cylinder pressure coincides with the desired value. This feedback control of the electric current to be applied to the coil 222 is repeated so that the actual master cylinder pressure is made equal to the desired value.

Like the pressure-increasing valve 258, the pressure-reducing valve 260 is also a normally closed valve, and is controlled by a feed-forward control portion and a feedback control portion, as described above with respect to the pressure-increasing valve 258 by reference to FIG. 9.

Figure 7:
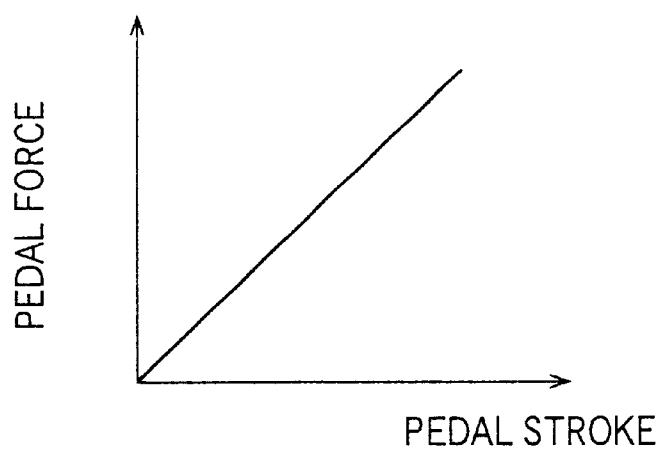
FIG. 7 is a graph indicating a relationship between the brake pedal stroke and a brake pedal force, which is obtained by the first flow control device.

Then, the control of the operating stroke of the brake pedal 60 will be described. This control of the brake pedal stroke is effected by the first flow control device 194, which is adapted to control the fluid flows to between the hydraulic pressure source 188 and the assisting chamber 90. When the pressurized fluid is supplied to the assisting chamber 90 through the first flow control device 194, the first pressurizing piston 88 receives a force based on the pressure of the pressurized fluid supplied to the assisting chamber 90, as well as a force based on the operating force of the brake pedal 60. As a result, the operating force of the brake pedal 60 is boosted based on the fluid pressure in the assisting chamber 90, which is referred to as "assisting pressure" where appropriate. This assisting pressure is controlled by the fluid flows into and from the assisting chamber 90, by controlling the amounts of electric current to be applied to the coils 222, 236 of the solenoid-operated pressure-increasing valve 196 and pressure-reducing valve 198. As a result, the operating force of the brake pedal 60 corresponding to the operating stroke can be controlled. Namely, the ROM 304 of the computer 302 stores a equation or data table representative of a predetermined relationship between the operating stroke and force of the brake pedal 60, which is illustrated in the graph of FIG. 7. On the basis of the brake pedal operating stroke detected by the pedal stroke sensor 314 and the predetermined relationship, a desired value of the brake pedal operating force is determined, and the assisting pressure in the assisting chamber 90 is controlled so as to obtain the determined desired value of the brake pedal force.

When the brake pedal 60 is not operated, the coils 222 and 236 of the pressure-increasing and pressure-reducing valves 196, 198 of the first flow control device 194 are in de-energized states, so that the pressure-increasing valve 196 is placed in the closed state, while the pressure-reducing valve 198 is placed in the open state. To generate and increase the assisting pressure in the assisting chamber 90 upon depression of the brake pedal 60, a controlled amount of electric current is applied to the coil 222 of the pressure-increasing valve 196, while the pressure-reducing valve 198 is closed, so that the pressurized fluid is delivered from the hydraulic pressure source 199 into the assisting chamber 90 through the first flow control device 194. To reduce the assisting pressure in the assisting chamber 90, the pressure-increasing valve 196 is closed, and the pressure-reducing valve 198 is opened with a controlled amount of electric current being applied to its coil 236, so that the pressurized fluid is discharged from the assisting chamber 90 to the reservoir 120.

The computer 302 includes a feed-forward control portion and a feedback control portion for controlling the electric current to be applied to the coil 222 of the pressure-increasing valve 196, in both feed-forward and feedback manners, as described above with respect to the pressure-increasing valve 258 of the second flow control device 256. The desired value of the operating force of the brake pedal 60 is determined by the operating stroke, and a control error between the desired value and the actual brake pedal operating force detected by the pedal force sensor 312 is obtained. A feed-forward pressure-increasing current is determined by the feed-forward control portion on the basis of the determined desired brake pedal operating force and according to the predetermined relationship between the desired brake pedal operating force and the detected brake pedal operating stroke. A feedback pressure-increasing current for zeroing the above-indicated control error is determined by the feedback control portion, and is added to the feed-forward pressure-increasing current, and a sum of these current values is applied to the coil 222, for controlling the amount of opening of the pressure-increasing valve 196.

Figure 10:
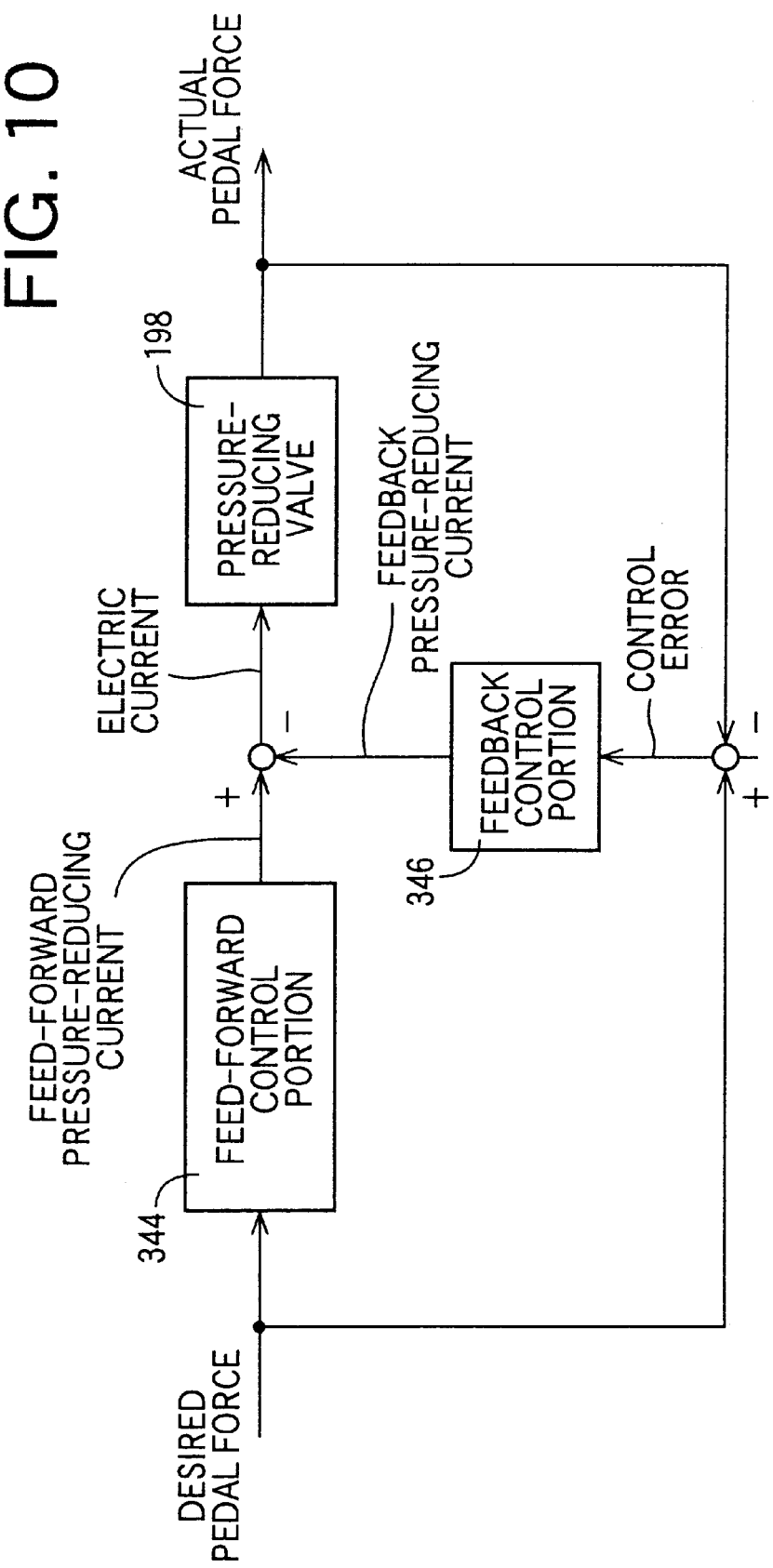
FIG. 10 is a block diagram for explaining a control of an electric current to be applied to the solenoid-operated pressure-reducing valve of the first flow control device.

The pressure-reducing valve 198, which is normally open, is closed by application of an electric current to the coil 236. To reduce the assisting pressure in the assisting chamber 90 by discharging the pressurized fluid from the assisting chamber 90, the amount of electric current to be applied to the coil 236 should be reduced. To this end, the computer 302 includes a feed-forward control portion 344 and a feedback control portion 346 for the pressure-reducing valve 198, as indicated in the functional block diagraph of FIG. 10. Like the feed-forward portion 340, the feed-forward control portion 344 determines a desired amount of pressure-reducing current to be applied to the coil 236, on the basis of the desired brake pedal operating force corresponding to the brake pedal operating stroke detected by the pedal stroke sensor 314, and according to a predetermined relationship between the desired brake pedal operating force and the desired feed-forward pressure-reducing current. This relationship is also represented by a stored data table. In the meantime, the feedback control portion 346 calculates a desired amount of feedback pressure-reducing current required to zero the control error. The amount of electric current to be applied to the coil 236 is obtained by subtracting the feedback pressure-reducing current from the feed-forward pressure-reducing current, as indicated in FIG. 10.

Figure 8:
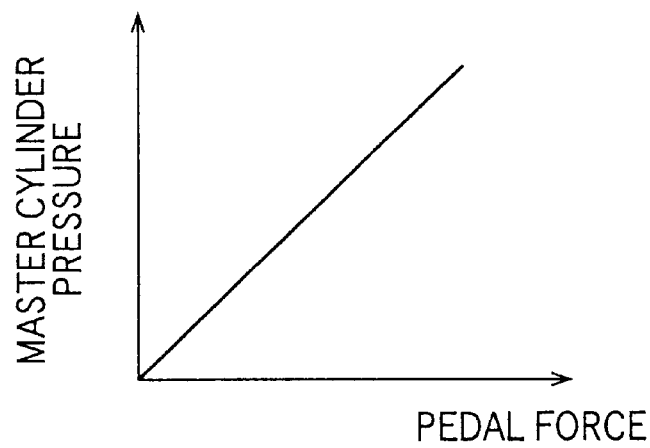
FIG. 8 is a graph indicating a relationship between the brake pedal force and the master cylinder pressure, which is obtained by the first and second flow control devices.

Thus, the master cylinder pressure and the brake pedal operating force are controlled as a function of the brake pedal operating stroke, as indicated in FIGS. 6 and 7, so that the master cylinder pressure and the brake pedal operating force have a predetermined relationship as indicated in FIG. 8, which relationship is determined by the relationships of FIGS. 6 and 7 according to which the master cylinder pressure and the brake pedal operating force are controlled on the basis of the brake pedal operating stroke.

It is noted that since the assisting chamber 90 is connected to the reservoir 120 through the by-pass passage 244 provided with the check valve 246, the fluid is supplied to the assisting chamber 90 through not only the pressure-increasing valve 196 but also the by-pass passage 244 when the volume of the assisting chamber 90 is rapidly increased as a result of a rapid operation of the brake pedal 60. This arrangement prevents the assisting chamber 90 from be evacuated upon rapid operation of the brake pedal 60, even if the opening action of the pressure-increasing valve 196 is delayed.

When the brake pedal 60 is operated toward its non-operated position, that is, when the operating stroke of the brake pedal is reduced, the fluid pressures in the assisting chamber 90 and first pressurizing chamber 88 are reduced by controlling the first and second flow control devices 194, 256 in the directions opposite to those described above with respect to the depressing operation of the brake pedal 60. That is, the pressure-reducing valve 198 is opened, so that the pressurized fluid is discharged from the assisting chamber 90 toward the reservoir 120, while the fluid is supplied from the reservoir 120 to the annular chamber 96 through the fluid passages 276, 280. Further, the pressurized fluid is supplied from the first pressurizing chamber 88 into the annular chamber 96. Accordingly, the first pressurizing piston 80 is permitted to be moved to its fully retracted position. In this respect, it is noted that the sealing member which is provided to provide fluid tightness between the first pressurizing piston 80 and the first small-diameter portion 74 and which is located on one side of the reservoir port 116 nearer to the assisting chamber 90 is arranged to inhibit a flow of the fluid from the annular chamber 96 into the first pressurizing chamber 88, but permit a flow of the fluid from the first pressurizing chamber 88 into the annular chamber 96 through the port 112 formed through the first pressurizing piston 80 and a clearance between the above-indicated sealing member and the first pressurizing piston 80. When the brake pedal 60 is released, that is, returned to its non-operated position, the fluid pressure in the first pressurizing chamber 88 is zeroed, and the solenoid-operated shut-off valve 264 and the pressure-reducing valve 260 are closed. Since the fluid is supplied from the first pressurizing chamber 88 into the annular chamber 96 as described above, the fluid passage 280 and check valve 282 may be eliminated.

When any one of the first and second flow control devices 194, 256 and the hydraulic pressure source 188 is defective while the electric system is normal, the master cylinder pressure is not controlled in relation to the operating stroke of the brake pedal 60, and the operating force of the brake pedal 60 is not boosted by the fluid pressure in the assisting chamber 60, but the wheel brakes 128, 130, 148, 150 can be activated by operation of the brake pedal 60. Where the fluid pressure in the assisting chamber 90 cannot be increased due to a defect of the hydraulic pressure source 188 or the pressure-increasing valve 196 of the first flow control device 194, for instance, the fluid is supplied from the reservoir 120 to the assisting chamber 90 through the fluid passage 244 and check valve 246, so that the first pressurizing piston 80 can be advanced by operation of the brake pedal 60, and the fluid in the first,and second pressurizing chambers 88, 98 can be pressurized to activate the wheel brakes 128, 130, 148, 150. Further, the fluid can be discharged from the assisting chamber 90 to the reservoir 120 through the normally open pressure-reducing valve 198, so that the brake pedal 60 can be returned to its non-operated position with a retracting movement of the first pressurizing piston 80.

When one of the pressure-increasing and pressure-reducing valves 258, 260 of the second flow control device 256 is defective, the shut-off valve 264 is closed. If the normally closed pressure-increasing valve 258 is kept open due to a foreign matter caught between the valve member 212 and the valve seat 210 of the seat valve 214, for example, the pressurized fluid is kept supplied from the accumulator 182 to the first, pressurizing chamber 88. If the seat valve 214 of the normally closed pressure-reducing valve 260 is kept open, the pressurized fluid is kept discharged to the reservoir 120. Such defects of the pressure-increasing and pressure-reducing valves 258, 260 can be found on the basis of the detected master cylinder pressure. That is, one of the valves 258, 260 is found detective if the detected master cylinder pressure considerably deviates from the desired value determined by the operating force of the brake pedal 60, for instance, the detected master cylinder pressure corresponding to the brake pedal operating force is excessively high or low. Upon detection of a defect of the pressure-increasing or -reducing valve 258, 260, the shut-off valve 264 is closed to disconnect the first pressurizing chamber 88 from the defective valve 258, 260, for permitting the first pressurizing piston to be advanced and retracted according to depressing and releasing actions of the brake pedal 60, so that the fluid in the first pressurizing chamber 88 can be pressurized according to the operating force of the brake pedal 60 and de-pressurized upon releasing of the brake pedal 60.

When one of the pressure-increasing and pressure-reducing valves 196, 198 of the first flow control device 194 is defective, the pressurized fluid can be discharged from the assisting chamber 90 to the reservoir 120 through the normally open pressure-reducing valve 198. If the normally open pressure-reducing valve 198 cannot be closed, the brake operating force cannot be boosted, but can be transmitted to the first pressurizing piston 80. If the pressure-increasing valve 196 cannot be closed, the pressurized fluid supplied from the hydraulic pressure source 188 to the assisting chamber 90 can be discharged from the assisting chamber 90 to the reservoir 120 through the normally open pressure-reducing valve 198, so that the master cylinder pressure can be raised by operation of the brake pedal 60, even though the brake operating force is not boosted by the pressurized fluid in the assisting chamber 90. In view of this, a solenoid-operated shut-off valve corresponding to the shut-off valve 264 is not provided for the first flow control device 194.

As described above, the controls of the master cylinder pressure and the brake pedal operating force in relation to the brake pedal operating stroke are not effected when at least one of the first and second flow control devices 194, 256 is defective, but the wheel brakes 128, 130, 148, 150 are activated with the fluid pressure generated in the first and second pressurizing chambers 88, 98, so that the wheels 6, 8, 10, 12 can be braked.

When the electrically operated devices such as the solenoid-operated pressure-increasing valve 258 cannot be controlled due to a failure or defect of the electric system (electric power source) of the vehicle, the wheel brakes 128, 130, 148, 150 can be activated by an operation of the brake pedal 60, as in the case where at least one of the first and second flow control devices 194, 256 and the hydraulic pressure source 188 is defective. In the event of a failure of the electric system, too, the pressure-increasing valve 196 and the pressure-reducing valve 198 of the first flow control device 194 are closed and opened, respectively, while the normally closed shut-off valve 264 of the second flow control device 256 is held closed, so that the fluid flows to and from the first pressurizing chamber 88 through the second flow control device 256 are inhibited. Since the shut-off valve 264 is placed in the closed state inhibiting the fluid flow from the first pressurizing chamber 88 through the outflow-inflow port 250 is prevented, the wheel brakes can be activated by an operation of the brake pedal 60, irrespective of the operating states of the pressure-increasing and pressure-reducing valves 258, 260 when the electric system becomes defective.

It is noted that the small-diameter portion 84 of the first pressurizing piston 80 which partially defines the first pressurizing chamber 88, and the second pressurizing piston 82 which partially defines the second pressurizing chamber 98, have a comparatively small diameter. This arrangement permits a comparatively high fluid pressure to be generated in the first and second pressurizing chambers 88, 98 with a comparatively small operating force of the brake pedal 60, when at least one of the first and second flow control devices 194, 256 does not normally operate due to a defect of the electric system. The comparatively small diameter of the small-diameter portion 84 and the second pressurizing piston 82 requires an accordingly large operating stroke of the brake pedal 60, when at least one of the devices 194, 256 is defective, but does not require a large operating stroke of the brake pedal 60 when the devices 194, 256 are normal, since the pressurized fluid is supplied form the hydraulic power source 188 to the first pressurizing chamber 88 while the devices 294, 256 are normal. Thus, the comparatively small diameter of the small-diameter portion 84 and the second pressurizing piston 82 is effective to reduce the amount of reduction of the total braking effect in the event of a failure of the electric system, while preventing an increase in the required operating stroke of the brake pedal 60 while the electric system is normal. The mount of reduction of the braking effect in the event of a failure of the electric system can be further reduced by increasing the pedal ratio of the brake pedal 60, that is, a ratio of the distance between the pivot axis and the pedal pad of the brake pedal 60 to the distance between the pivot axis to the point of connection of the brake pedal 60 to the operating rod 62.

There will next be described an operation of the braking system. in relation to the arrangement wherein the annular chamber 96 and the first pressurizing chamber 88 are connected to each other by the connecting passage 270.

Upon operation of the brake pedal 60, the fluid is discharged from the annular chamber 96 to permit the first pressurizing piston 80 to be advanced. The rate of flow of the fluid from the annular chamber 96 is relatively high when the operating speed of the brake pedal 60 is relatively low. In this case, the fluid discharged from the annular chamber 96 is returned to the reservoir 120 through the orifice 278, and is not introduced into the first pressurizing chamber 88.

Figure 11:
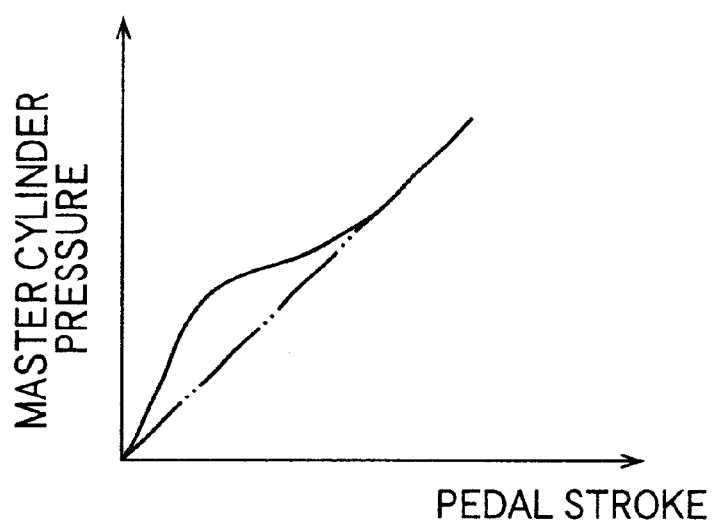
FIG. 11 is a graph indicating an effect produced by supplying a pressurized fluid from an annular chamber of the master cylinder to its first pressurizing chamber when the brake pedal is abruptly depressed.

When the brake pedal 60 is operated at a relatively high speed, the fluid is discharged from the annular chamber 96 at a relatively high rate, and the amount of the fluid that is returned to the reservoir 120 is reduced by the flow restricting function of the orifice 278, so that a portion of the fluid discharged from the annular chamber 96 is returned to the reservoir 120 while the remaining portion is forced into the first pressurizing chamber 88 through the connecting passage 270 and the check valve 272. As a result, the fluid pressure in the first pressurizing chamber 88 (master cylinder pressure is increased at a rate (indicated by solid line in FIG. 11) higher than a rate (indicated by two-dot chain line) which is determined by the distance of the advancing movement of the first pressurizing piston 88 and the supply of the pressurized fluid from the accumulator 182 to the first pressurizing chamber 88 through the pressure-increasing valve 258 of the second flow control device 256. Accordingly, the supply of the fluid from the annular chamber 96 into the first pressurizing chamber 88 through the connecting passage 270 prevents a delay in the increase in the master cylinder pressure due to a delayed supply of the pressurized fluid from the accumulator 182 to the first pressurizing chamber 88, which delayed supply arises from a delayed opening action of the pressure-increasing valve 258. Thus, the supply of the fluid from the annular chamber 96 into the first pressurizing chamber 88 is effective to prevent the delayed brake application to the wheels. After the delayed supply of the pressurized fluid to the first pressurizing chamber 88 through the pressure-increasing valve 258 is terminated, the master cylinder pressure is increased according to the predetermined nominal relationship with the brake pedal operating stroke, as indicated by the two-dot chain line, that is, increased at the predetermined rate indicated by the two-dot chain line.

Then, there will be described an operation of the braking system when the regenerative braking apparatus is activated.

Figure 12:
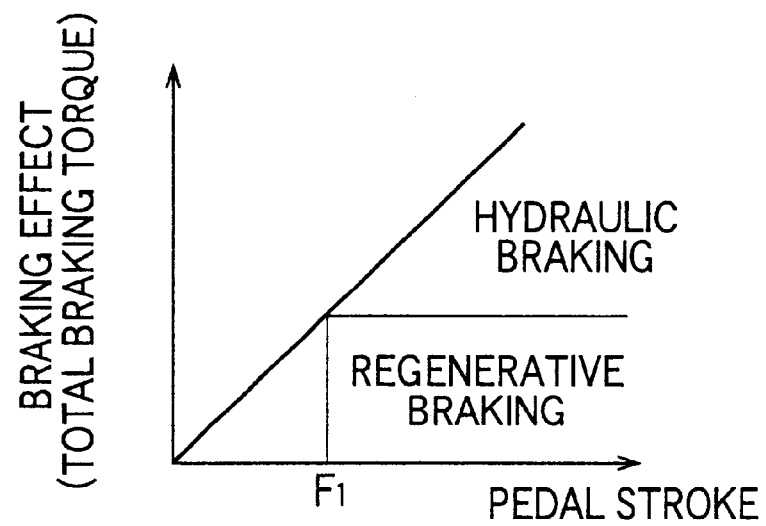
FIG. 12 is a graph for explaining proportions of a regenerative braking effect and a hydraulic braking effect.

When the brake pedal 60 is operated during running of the vehicle, the vehicle is braked with a total braking force corresponding to the operating stroke of the brake pedal 60 (and therefore corresponding to the operating force of the brake pedal 60). As indicated in the graph of FIG. 12, only a regenerative braking force is applied to the vehicle while the brake pedal operating stroke is smaller than a predetermined threshold F1, above which the desired braking force corresponding to the brake pedal operating stroke cannot be obtained by the regenerative braking force alone. After the brake pedal operating stroke exceeds the threshold F1, a hydraulic braking force as well as the maximum regenerative braking force is applied to the vehicle.

First, the regenerative braking will be described. When the accelerator pedal is operated, the hybrid controller 40 provides the motor controller 36 or the engine controller 38 with a signal indicative of a driving torque determined on the basis of the operating amount of the accelerator pedal, so that the vehicle is driven with the motor/generator 20 operated as the electric motor, or the engine 16. When the brake pedal 60 is operated while the vehicle is driven, the brake controller 30 determines the desired braking toque on the basis of the master cylinder pressure detected by the master cylinder pressure sensor 318. It is noted that the detected master cylinder pressure represents the operating force acting on the brake pedal 60, which in turn represents the vehicle braking force desired by the vehicle operator. The brake controller 300 provides the hybrid controller 40 with a signal indicative of the determined desired braking torque, and the hybrid controller 30 provides the motor controller 36 with a signal indicative of the desired braking torque, according to which the inverter 22 controls the motor/generator 20 functioning as the electric generator. The motor controller 36 provides the hybrid controller 40 with a signal indicative of the regenerative braking torque actually generated by the motor/generator 20. The generated regenerative braking torque can be obtained on the basis of the operating state of the motor/generator 20 operating as the electric generator. When the hybrid controller 40 receives a signal indicating that the maximum regenerative braking torque of the motor/generator 20 has been reached, the hybrid controller 40 provides the brake controller 300 with a signal indicating that the maximum regenerative braking torque has been reached.

Until the regenerative braking torque generated by the motor/generator 20 has been increased to the maximum value, the brake controller 300 uses the master cylinder 64 as a brake pedal simulator, namely, uses the detected master cylinder pressure as the operating force of the brake pedal 60. Upon depression of the brake pedal 60, the pressure-increasing valves 162 provided for all of the four brakes 128, 130, 148, 150 are simultaneously closed, and the brake cylinders 132, 134, 152, 154 are disconnected from the first and second pressurizing chambers 88, 98 of the master cylinder. On the other hand, the first flow control device 194 is kept in the original state, and the second flow control device 256 is controlled to control the fluid pressure in the first pressurizing chamber 88 so that there exists the same relationship between the brake pedal operating force and stroke as in the case where the motor/generator 20 is not operated as the electric generator to generate a regenerative braking torque. Since the pressure-increasing valves 162 are all placed in the closed state, however, the pressurized fluid is not supplied from the first and second pressurizing chambers 88, 98 to the wheel brake cylinders 132, 134, and the pressurized fluid is discharged from the first and second pressurizing chambers 88, 98 to the reservoir 120 with an increase in the brake pedal operating stroke. The second flow control device 256 is controlled to control the fluid pressure in the first pressurizing chamber 88 such that a reaction force corresponding to the brake pedal operating force (which in turn corresponds to the brake pedal operating stroke) acts on the first pressurizing piston 80 while the pressurized fluid is discharged from the first pressurizing chamber 88 to the reservoir 120.

Since the first flow control device 194 is kept in the original state, as described above, the fluid having the atmospheric pressure is introduced into the assisting chamber 90 through the check valve 246 or the normally open pressure-reducing valve 98, so that the master cylinder pressure when a regenerative brake is applied to the vehicle is lower than when a regenerative brake is not applied to the vehicle. However, the fluid pressure in the first pressurizing chamber 88 is controlled to be a value corresponding to the brake pedal operating force, so that the vehicle operator feels the same brake pedal operating force as in the case where the vehicle is braked with a hydraulic braking force alone by the hydraulically operated brakes 128, 130, 148, 150, without a regenerative brake application to the vehicle. During application of a regenerative brake to the vehicle, each wheel brake cylinder 132, 134, 152, 154 is not in operation with its fluid pressure being zero with the pressure-increasing valves 162 held in the closed state. However, the fluid pressure in the first pressurizing chamber 88 is controlled by the second flow control device 256 so that the brake pedal operating force changes in the same relationship with the brake pedal operating stroke, as in the case where the regenerative braking apparatus is not in operation, that is, where only the hydraulic braking apparatus is operation by activation of the wheel brake cylinders 132, 134, 152, 154. The master cylinder pressure thus controlled may be considered to represent the fluid pressure in the wheel brake cylinders as if the hydraulic braking apparatus including these wheel brake cylinders were activated in place of the regenerative braking apparatus including the motor/generator 20.

When the hybrid controller 40 has provided the brake controller 300 with the signal indicating that the maximum regenerative braking torque of the motor/generator 20 has been reached, the brake controller 300 stops using the master cylinder 72 as the brake pedal simulator, and opens the pressure-increasing valves 162 to initiate operations of the wheel brakes 128, 130, 148, 150, that is, to initiate a cooperative braking operation in which both the maximum regenerative braking torque and a controlled hydraulic braking torque are applied to he vehicle. The controlled hydraulic braking torque to be generated by the wheel brakes 128, 130, 148, 150 is equal to the desired vehicle braking torque (total braking torque or effect) determined by the brake pedal operating stroke, minus the maximum regenerative braking torque, as is apparent from the graph of FIG. 12. That is, the fluid pressure in the first pressurizing chamber 88 (the fluid pressure in the second pressurizing chamber 98, as well) during the cooperative braking operation is controlled to be a value which is a difference between the desired master cylinder pressure corresponding to the brake pedal operating stroke and the master cylinder pressure corresponding to the maximum regenerative braking torque. Immediately after the maximum regenerative braking torque has been reached, namely, when the cooperative braking operation is initiated, the fluid pressure in the first pressurizing chamber 88 (master cylinder pressure) is equal to the atmospheric pressure.

Figure 14:
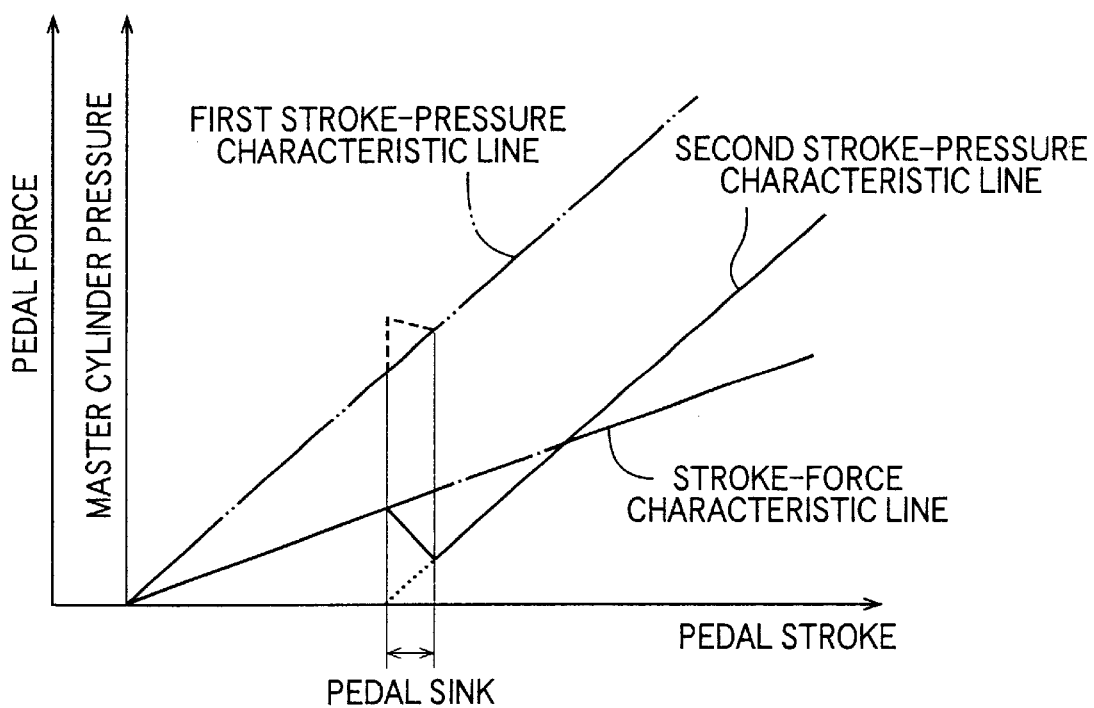
FIG. 14 is a graph for explaining one form of control of the braking system upon transition from a regenerative braking mode in which only the regenerative brake is applied, to a cooperative braking mode in which both of the regenerative and hydraulic brakes are applied.

The master cylinder pressure upon initiation of the cooperative braking operation is necessarily made equal to the atmospheric pressure since the pressure-increasing valves 162 are all simultaneously opened to permit activation of the wheel brake cylinders 132, 134, 152, 154. On the other hand, however, the vehicle operator feels changes in the brake pedal operating stroke and force when the master cylinder pressure is suddenly lowered to the atmospheric level from the level at the end of the brake pedal simulation, that is, from the level corresponding to the maximum regenerative braking torque. Referring to the graphs of FIG. 14, the master cylinder pressure and the brake pedal operating force are taken along respective vertical axes which are calibrated such that the same coordinate values along these two axes represent the brake pedal operating force and the desired master cylinder pressure determined by the brake pedal operating force. As shown in FIG. 14, the master cylinder pressure is controlled so that the brake pedal operating force given by the master cylinder pressure increases with the brake pedal operating stroke, until the maximum regenerative braking torque has been reached, that is, until the regenerative braking using the master cylinder as the brake pedal simulator has been terminated. As soon as the maximum regenerative braking torque has been reached, namely, as soon as the cooperative braking operation has been initiated, the master cylinder pressure is lowered to the atmospheric level, and the reaction force applied from the master cylinder 64 to the brake pedal 60 is zeroed, so that the operating stroke of the brake pedal 60 is rapidly increased. The brake controller 300 is adapted to control the second flow control device 256 so as to rapidly supply the pressurized fluid to the first pressurizing chamber 88 of the master cylinder 64, for eliminating a brake clearance of each wheel brake 128, 130, 148, 150 and for preventing a reduction of the volume of the fluid in the first pressurizing chamber 88. After the master cylinder pressure (fluid pressure in the chamber 88) has been once lowered to the atmospheric level, the master cylinder pressure must be increased with an increase in the brake pedal operating stroke, in order that the total vehicle braking effect provided by the regenerative braking torque and the hydraulic braking torque increases in the predetermined relationship with the brake pedal operating stroke. Unless the vehicle operator endeavors to keep the brake pedal operating stroke constant irrespective of the zeroing of the brake pedal operating force, the brake pedal operating stroke is rapidly increased due to a loss of equilibrium of the brake pedal operating force and the reaction force, which arises from the zeroing of the brake pedal operating force. Thus, the vehicle operator feels uneasy with a "pedal sink", that is, an increase of the brake pedal operating stroke with a rapid reduction of the brake pedal operating force.

Generally, however, the pedal sink is comparatively small, because the master cylinder pressure during the cooperative braking operation is controlled according to a second or modified stroke-pressure characteristic line (indicated by solid line in FIG. 14) representative of a relationship between the master cylinder pressure and the brake pedal operating stroke. The master cylinder pressure controlled according to this second stroke-pressure characteristic line is lower than a first or normal stroke-pressure characteristic line (indicated by two-dot chain line) by an amount corresponding to the maximum regenerative braking torque. When the operating stroke of the brake pedal 60 is increased upon initiation of the cooperative braking operation, that is, when the "pedal sink" is encountered, the master cylinder pressure is accordingly increased, and the reaction force applied from the master cylinder 64 to the brake pedal 60 is rapidly increased to a value equal to the brake pedal operating force, thereby preventing a further pedal sink. Thus, the degree of the pedal sink is minimized.

It is noted that the brake operating force and the master cylinder pressure are actually slowly reduced and increased when the operating stroke of the brake pedal 60 is increased with the pedal sink.

The foregoing description regarding the initiation of the cooperative braking operation is based on an assumption that the fluid pressure in the first pressurizing chamber 88 is rapidly lowered to the atmospheric level by simultaneous opening of the pressure-increasing valves 162. Actually, however, the fluid pressure in the first pressurizing chamber 88 (master cylinder pressure) is not instantaneously lowered to the atmospheric level, and the master cylinder pressure is higher than the atmospheric level immediately after the pressure-increasing valves 162 have been opened, but the wheel brake cylinders 128, 130, 148, 150 are not instantaneously activated to provide a braking effect. In other words, the pressure of the pressurized fluid delivered from the master cylinder 64 is lowered at a given rate. It is also noted that since the switching or transition from the regenerative braking mode to the cooperative braking mode usually takes place while the brake pedal 60 is being depressed, and the desired total vehicle braking effect is continuously increased. Accordingly, the vehicle operator does not feel uneasy with a change in the vehicle braking effect, even if the increase of the fluid pressure in the wheel brake cylinders 132, 134, 152, 154 is initiated while the master cylinder pressure is being lowered. Even if the pressure-increasing valves 162 are rapidly opened upon transition from the regenerative braking mode to the cooperative braking mode, the master cylinder pressure is not actually lowered down to the atmospheric level, and the brake pedal operating force is not actually zeroed. Thus, the pedal sink of the brake pedal 60 takes place to a comparatively small extent. Although the brake pedal operating stroke and force may more or less change upon transition to the cooperative braking mode, the vehicle operator is less likely to fee uneasy with such a change occurring while the brake pedal 60 is being depressed, than while the brake pedal 60 is placed at the non-operated position.

It is also noted that the fluid pressure in the wheel brake cylinders 132, 134, 152, 154 is required to be raised from zero, without a delay, upon transition from the regenerative braking mode wherein the master cylinder is used as the brake pedal simulator, to the cooperative braking mode in which the regenerative and hydraulic brakes are applied to the vehicle. To this end, the fluid pressure in the wheel brake cylinders 132, 134, 152, 154 may be slightly increased in the regenerative braking mode, to such an extent necessary to eliminate the brake clearance, but without producing an actual braking effect.

The total vehicle braking effect consisting of the regenerative braking effect and the hydraulic braking effect may become temporarily larger than a value corresponding to the brake pedal operating stroke upon transition from the regenerative braking mode to the cooperative braking mode, as indicated by broken lines in FIG. 14. The amount of change of the brake pedal operating force can be reduced to a very small value or zeroed, by controlling the second flow control device 256 upon transition from the regenerative braking mode to the cooperative braking mode, so as to prevent a substantially reduction of the master cylinder pressure or so as to cause an increase of the master cylinder pressure at the same rate as in the regenerative braking mode. Even if the vehicle braking effect is temporarily made larger than the value corresponding to the brake pedal operating stroke, as indicated by the broken lines in FIG. 14, the vehicle deceleration value will not be increased with a high response to an increase in the braking effect provided by the wheel brakes 130, 132, 148, 150, so that the vehicle operator only slightly feels an increase in the vehicle deceleration value upon transition to the cooperative braking mode. Actually, the increase and decrease in the braking effect indicated by the broken lines in FIG. 14 actually take place slowly and smoothly.

It is also noted that the pressure-increasing valves 162 which are rapidly opened in the embodiment described above may be slowly opened by controlling their duty ratio, to slowly reduce the master cylinder pressure, upon transition to the cooperative braking mode. This arrangement is effective to easily prevent the sink of the brake pedal 60, by supplying the pressurized fluid to the first pressurizing chamber 88.

Figure 15:
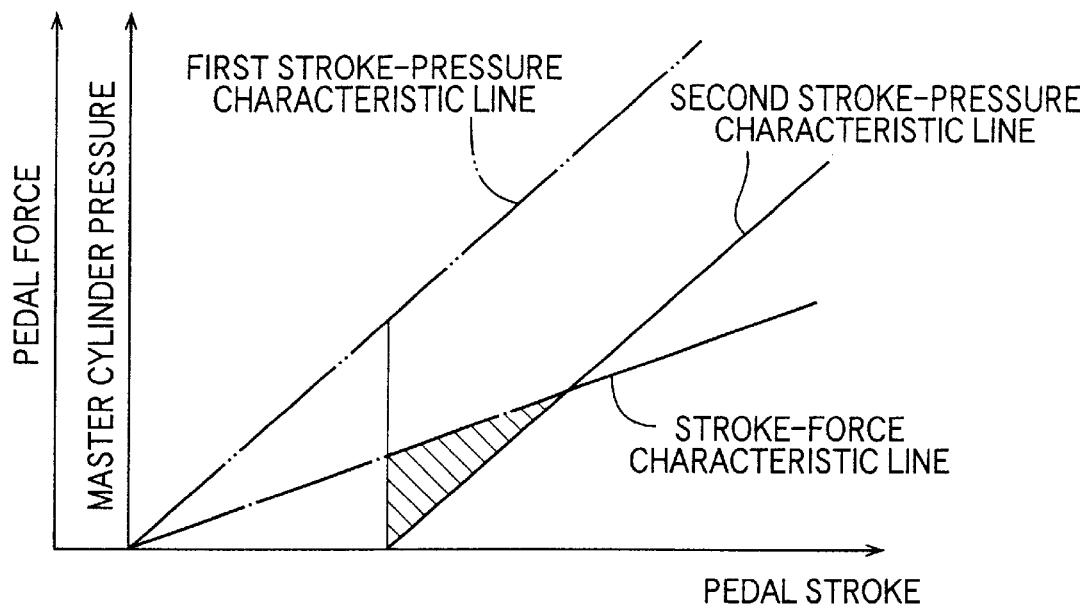
FIG. 15 is a graph for explaining another form of control of the braking system upon transition from the regenerative braking mode to the cooperative braking mode.

It is also possible to control the pressure-increasing valves 162 so that the fluid pressure in the wheel brake cylinders 132, 134, 152, 154 is held lower than the master cylinder pressure by an amount indicated by a hatched area indicated in FIG. 15, until the master cylinder pressure determined according to the second stroke-pressure characteristic line has been increased to a value determined by the brake pedal operating stroke in the regenerative braking mode. In this case, the second flow control device 256 is controlled to increase the master cylinder pressure according to the second stroke-pressure characteristic line, after the master cylinder pressure has been increased to the above indicated value. This arrangement permits smooth transition from the regenerative braking mode to the cooperative braking mode, and makes it possible to maintain the fluid pressure in the wheel brake cylinders 132, 134, 152, 154 lower than the master cylinder pressure even if the brake pedal 60 is returned to its non-operated position during the transition.

The pressure-increasing valves 162 which are controlled to control the fluid pressure in the wheel brake cylinders 132, 134, 152, 154 in the present embodiment may be replaced by linear valves, which permits increased ease of control of the fluid pressure in the wheel brake cylinders 132, 134, 152, 154 when the regenerative braking mode is switched to the cooperative braking mode.

Figure 13:
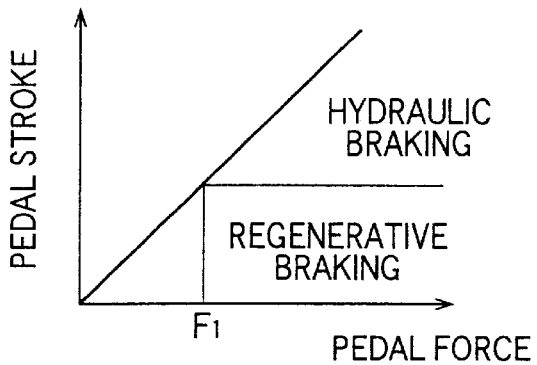
FIG. 13 is a graph indicating a relationship between the brake pedal force and stroke when a regenerative brake and a hydraulic brake are applied to the vehicle.

After the transition from the regenerative braking mode using the master cylinder 64 as the brake pedal simulator to the cooperative braking mode has been effected as described above, the first and second flow control devices 194, 256 are controlled to increase the master cylinder pressure according to the second stroke-pressure characteristic line described above, so that the controlled master cylinder pressure corresponds to a difference between the desired total braking torque as represented by the brake pedal operating stroke and the maximum regenerative braking torque. The first flow control device 194 is controlled to control the fluid pressure in the assisting chamber 90 so that the actual brake pedal operating force coincides with the desired value corresponding to the brake pedal operating stroke according to the second stroke-pressure characteristic line. Thus, the fluid pressure in the assisting chamber 90 is controlled to be lower in the cooperative braking mode than in the hydraulic braking mode in which the vehicle is braked with the hydraulic braking apparatus alone, without an operation of the regenerative braking apparatus. If the regenerative braking torque of the motor/generator 20 which has been held at the maximum value changes in the cooperative braking mode, the second stroke-pressure characteristic line is updated or modified by an amount corresponding to the amount of change of the regenerative braking torque, and the first and second flow control devices 194, 256 are controlled according to the updated second stroke-pressure characteristic line, so that the master cylinder pressure (consisting of a component corresponding to the regenerative braking torque and a component corresponding to the hydraulic braking torque), and the brake pedal operating force and stroke maintain the predetermined relationship, irrespective of the change in the regenerative braking torque. As a result, the braking effect (total braking torque) is controlled in the predetermined relationship with the brake pedal operating stroke, as indicated in the graph of FIG. 12, while the brake pedal operating force is controlled in the predetermined relationship with the brake pedal operating stroke, as indicated in the graph of FIG. 13.

When the brake pedal 60 is released in the cooperative braking mode, the first and second flow control devices 194, 256 are controlled to control the master cylinder pressure according to the second stroke-pressure characteristic line so that the controlled master cylinder pressure corresponds to the desired total braking torque minus the regenerative braking torque. When the master cylinder pressure has been lowered to a value that can be established by the operating force of the brake pedal 60, that is, when the actual total vehicle braking torque becomes equal to a sum of the hydraulic braking torque corresponding to the master cylinder pressure based on the brake pedal operating force and the regenerative braking torque, the fluid pressure in the assisting chamber 90 is lowered to the atmospheric level. Thereafter, the brake controller 300 estimates the brake pedal operating force at which the master cylinder pressure and the brake pedal operating stroke satisfy the predetermined relationship, and then obtains a desired value of the brake pedal operating force by multiplying the estimated value by a predetermined coefficient (for instance, 0.5) not larger than "1". Then, the second flow control device 256 is controlled to control the master cylinder pressure so that the actual brake pedal operating force coincides with the obtained desired value. After the brake pedal operating stroke has been reduced to a value at which the desired vehicle braking effect can be provided by a generative braking torque alone, while satisfying the predetermined relationship between the brake pedal operating stroke and the master cylinder pressure, the second flow control device 256 is controlled to reduce the master cylinder pressure down to the atmospheric level while controlling the master cylinder pressure, so that the actual brake pedal operating force coincides with a desired value which is obtained by multiplying, by the predetermined coefficient (not larger than "1"), the brake pedal operating force determined according to the predetermined stroke-force relationship and the predetermined stroke-pressure relationship.

Figure 16:
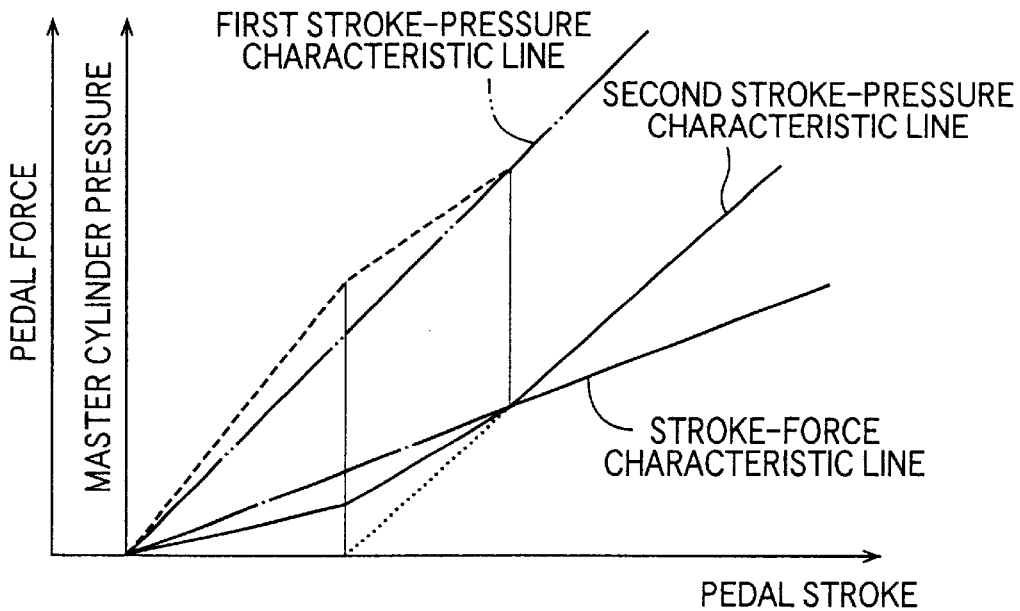
FIG. 16 is a graph for explaining a control of the braking system when the operating amount of the brake pedal is reduced while the braking system is operated in the cooperative braking mode.

As described above, the master cylinder pressure which should be reduced according to the second stroke-pressure characteristic line, as indicated by dotted line in FIG. 16, is actually reduced as indicated by solid line, so that the actual vehicle braking effect is made slightly larger than that determined according to the predetermined stroke-pressure characteristic line. However, the amount of this additional braking effect is not so large as to enable the vehicle operator to feel it strange. Further, the brake pedal operating force which should be reduced according to the predetermined stroke-force characteristic line as indicated by one-dot chain line in FIG. 16, is actually reduced as indicated by solid line, that is, the actual brake pedal operating force indicated by the solid line is smaller than the desired value indicated by the one-dot chain line. However, the amount of this reduction of the brake pedal operating force is comparatively small, and is not likely to be felt strange by the vehicle operator.

In the arrangement wherein the wheel brake cylinder pressure is made lower than the master cylinder pressure by controlling the pressure-increasing valves 162 or linear valves as described above, it is possible to prevent the actual braking effect to be larger than the desired value determined by the predetermined stroke-pressure characteristic line, and prevent the actual brake pedal operating force to be smaller than the desired value determined by the predetermined stroke-force characteristic line.

The present braking system is capable of effecting the anti-lock braking pressure control, the traction control and the vehicle running stability control. The anti-lock braking pressure control is initiated when the amount of slipping or locking of any wheel 6, 8, 10, 12 under braking has become excessively large due to a braking force which is excessively large with respect to the particular friction coefficient of the road surface. In the anti-lock braking control, the fluid pressure in the wheel brake cylinder 132, 134, 152, 154 for the excessively slipping wheel is suitably increased, held and reduced by controlling the pressure-increasing valve and the pressure-reducing valve 164 of the solenoid-operated valve device 160 provided for the wheel in question, so that the amount of slipping of the wheel is held in an optimum range. The first and second flow control devices 194, 256 are controlled such that the master cylinder pressure and the brake pedal operating force are held at desired values determined by the operating stroke of the brake pedal 60, irrespective of whether the anti-lock braking pressure control is effected or not.

When the amount of slipping of at least one of the drive wheels 10, 12 is excessively large due to a drive force which is excessively large with respect to the friction coefficient of the road surface, the traction control is initiated. In the traction control wherein the brake pedal 60 is not operated, the drive force of the drive wheel 10, 12 (rear left or right wheel) in question is reduced by applying a brake thereto with the corresponding wheel brake cylinder 148, 150. In the traction control, the non-drive front left and right wheels 6, 8 are not braked. Accordingly, the pressure-increasing valves 162 provided for the brakes 128, 130 for the non-drive front wheels 6, 8 are held closed, and the corresponding wheel brake cylinders 132, 134 are held in the non-operated state. If the traction control is effected for only one of the two rear drive wheels 10, 12, the pressure-increasing valve 160 for the other rear wheel 10, 12 for which the traction control is not effected is held in the closed state.

In the traction control, the pressure-increasing valve 196 is opened and the pressure-reducing valve 198 is closed, to supply the pressurized fluid from the accumulator 182 to the assisting chamber 90 so that the first pressurizing piston 80 is advanced by a predetermined distance to a predetermined position. At this position, the port 112 formed in the first pressurizing piston 80 is spaced apart from the reservoir port 116 in the direction toward the second pressurizing piston 82, and a flow of the fluid from the first pressurizing chamber 88 to the reservoir 120 is inhibited. The fluid pressure in the assisting chamber 90 is controlled to advance the first pressurizing piston 80 by the predetermined distance to the above-indicated predetermined position. When the piston 80 has been advanced to the predetermined position, the pressure-increasing valve 196 is closed while the pressure-reducing valve 198 is held closed, so that flows of the fluid to and from the assisting chamber 90 are inhibited, to hold the first pressurizing piston 80 at the above-indicated predetermined position. The piston 80 is advanced to the predetermined position by maintaining the supply of the pressurized fluid to the assisting chamber 90 for a predetermined length of time. For instance, the computer 302 incorporates a time counter for measuring a time duration for which the pressurized fluid is kept supplied to the assisting chamber 90 with the pressure-increasing valve 196 held open. Upon expiration of a predetermined time, the pressure-increasing valve 196 is closed. To advance the first pressurizing piston 80 by the predetermined distance, the pressure-increasing valve 196 is fully opened, for example, so that the pressurized fluid from the accumulator 182 is supplied to the assisting chamber 90 through the fully open pressure-increasing valve 196, without controlling the pressure of the pressurized fluid as received from the accumulator 182. Alternatively, a position sensor is provided for detecting an advancing movement of the first pressurizing piston 80 to the predetermined position, so that the supply of the pressurized fluid to the assisting chamber 90 is terminated on the basis of the output signal of the position sensor.

Further, the second flow control device 256 is controlled to supply the pressurized fluid to the first pressurizing chamber 88, so that the second pressurizing piston 82 is advanced to pressurize the fluid in the second pressurizing chamber 98. Thus, the fluid pressure in the first and second pressurizing chambers 88, 98 is raised to a value high enough for the valve device 160 to use the master cylinder pressure as the hydraulic pressure source for activating the wheel brake cylinder 152, 154 of the brake 148, 150 for braking the appropriate rear drive wheel 10, 12, to thereby reduce the amount of slipping of the drive wheel 10, 12 in question. In the control arrangement described above, the valve device 160 is controlled to control the pressure of the pressurized fluid received from the first and second pressurizing chambers 88, 98 to activate the wheel brake cylinder 152, 154. However, only the second flow control device 256 may be controlled to control the fluid pressure in the first pressurizing chamber 88 (and the fluid pressure in the second pressurizing chamber 98) so that the fluid pressure in one or both of the first and second pressurizing chambers 88, 98 is applied to one or both of the wheel brake cylinders 152, 154, without controlling the valve device or devices 160. This control arrangement is available only where the traction control is effected for only one of the two drive wheels 10, 12, or where the same fluid pressure is applied to the two wheel brake cylinders 152, 154.

Figure 17:
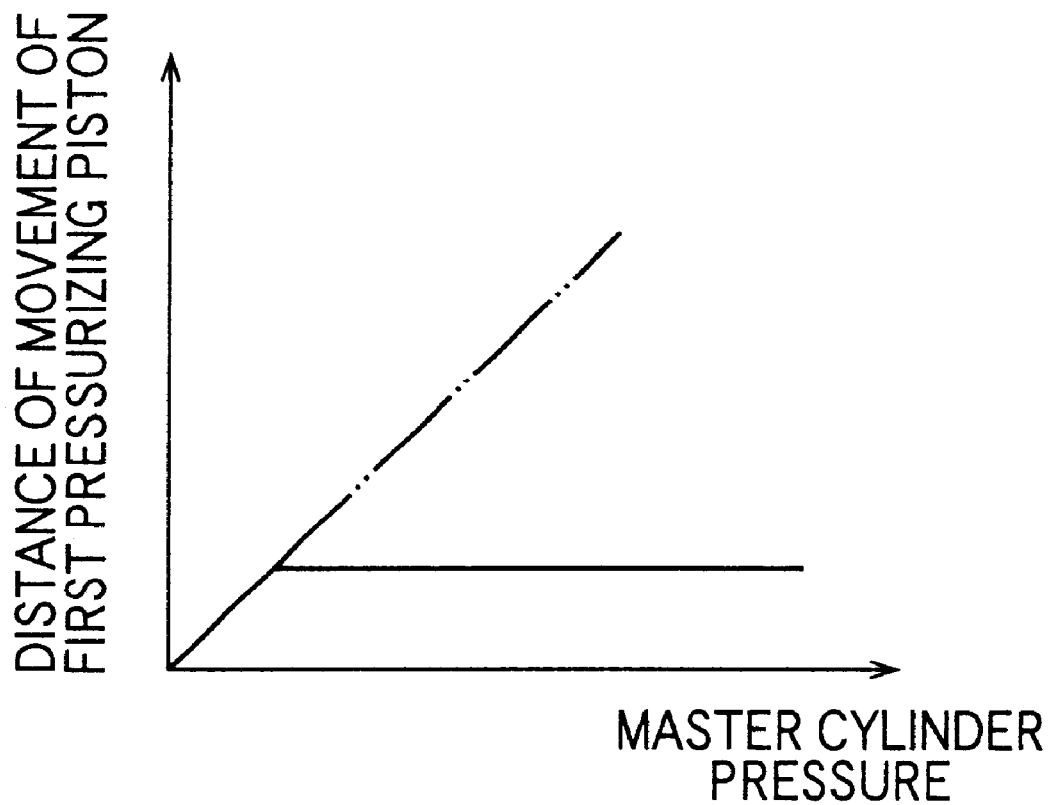
FIG. 17 is a graph indicating a relationship between the master cylinder pressure and a distance of movement of the first pressurizing piston of the master cylinder when the braking system is operated in a traction control mode or vehicle running stability control mode.

In the traction control described above, the pressurized fluid is supplied to the assisting chamber 90 to advance the first pressurizing piston 80 by the predetermined distance to the predetermined position at which the discharge flow of the fluid from the first pressurizing chamber 88 to the reservoir 120 is inhibited or prevented. In a normal braking operation, the advancing distance of the first pressurizing piston 80 increases with an increase in the master cylinder pressure, as indicated by two-dot chain line in the graph of FIG. 17. In the traction control, the first pressurizing piston 80 is held at the predetermined position, while the master cylinder pressure is continuously increased. Accordingly, the vehicle operator is less likely to feel uneasy with an excessively large play of the brake pedal 60 when the brake pedal 60 is operated during the traction control. Described in detail, the present braking system is arranged such that the operating rod 62 is axially slidably fitted in the hollow piston rod 106 formed integrally with the first pressurizing piston 80. In this arrangement, the first pressurizing piston 80 is advanced relative to the operating rod 62 by the predetermined distance when the pressurized fluid is supplied to the assisting chamber 90 during the traction control. Since this distance of advancing movement of the piston 80 is comparatively small, the distance of advancing movement of the operating rod 62 necessary for abutting contact with the piston 80 to transmit the operating force of the brake pedal 60 is comparatively small. This means an accordingly small amount of axial play of the brake pedal 60 upon operation thereof after the piston 80 has been advanced to the predetermined position in the traction control. Therefore, the vehicle operator is less like to feel this play of the brake pedal 60. The traction control is terminated by opening the pressure-reducing valve 198 to permit the pressurized fluid to be discharged from the assisting chamber 90 to the reservoir 120, for thereby permitting the retracting movement of the first pressurizing piston 80 to the fully retracted or original position.

The vehicle running stability control is effected to improve the running stability of the vehicle, in particular, during turning of the vehicle, by braking at least one of the four wheels 6, 8, 10, 12, on the basis of the output signal of the yaw rate sensor, and the output signals of other sensors or detectors as needed. This vehicle running stability control is effected as needed, while the brake pedal 60 is operated, while the accelerator pedal is operated, or while the brake pedal 60 and the accelerator pedal are not operated. Where the vehicle running stability control is effected while the accelerator pedal is operated or while the accelerator pedal and the brake pedal 60 are both placed in the non-operated position, the pressure-increasing valve 162 for each of the wheels which are not braked by the vehicle running stability control is closed to inhibit brake application to that or those wheels. As in the traction control, the pressurized fluid is supplied to the assisting chamber 90 to advance the first pressurizing piston 80 to the predetermined position, for inhibiting the discharge flow of the fluid from the first pressurizing chamber 88 to the reservoir 120. Then, the pressurized fluid is supplied to the first pressurizing chamber 88, and is supplied through the solenoid-operated valve device 160 to the wheel brake cylinder corresponding to each wheel that is braked for the vehicle running stability control. The fluid pressure in the appropriate wheel brake cylinder is controlled by the valve device 160. In this vehicle running stability control wherein the brake pedal 60 is not operated, the first pressurizing piston 80 is advanced by the predetermined small distance, and the vehicle operator is less likely to feel an excessive amount of play of the brake pedal 60 when the brake pedal 60 is operated during the vehicle running stability control.

Where the vehicle running stability control is effected while the brake pedal 60 is in operation, the valve device 160 corresponding to the wheel in question is controlled to control the fluid pressure in the corresponding wheel brake cylinder, as in the anti-lock braking pressure control. The braking system may be adapted to effect an automatic braking control when the distance between the vehicle in question and the vehicle running just in front of the vehicle in question becomes smaller than a predetermined threshold. In the automatic braking control, the first pressurizing piston 80 is advanced to the predetermined position to inhibit the discharge flow of the fluid from the first pressurizing chamber 88 to the reservoir 120, and then the second flow control device 256 is controlled to supply the pressurized fluid to the first pressurizing chamber 88, as in the traction control, for activating the wheel brake cylinders 132 to brake the vehicle.

It will be understood from the foregoing description of the present first embodiment of this invention that the pressure-increasing valves 196 and 258 cooperate to function as a supply-flow control device, while the pressure-reducing valves 198 and 260 cooperate to function as a discharge-flow control device. It will also be understood that the brake controller 300 functions as a main control device, and that a brake characteristic control portion is constituted by a portion of the brake controller 300 assigned to control the first and second flow control devices 194, 256 for controlling the brake pedal operating force and master cylinder according to predetermined relationships among the brake pedal operating stroke, brake pedal operating force and master cylinder pressure. It will further be understood that the motor/generator 20 and the inverter 22 cooperate to constitute an energy converting device while the electric energy storage 24 serves as an energy storing device, and that the motor/generator 20, inverter 22 and electric energy storage 24 cooperate to constitute a regenerative braking apparatus. It will also be understood that a cooperative braking control portion is constituted by a portion of the brake controller 300 assigned to control the first flow control device 194 for controlling the fluid pressure in the assisting chamber 90 in the cooperative braking mode (wherein regenerative brake and hydraulic braking are both effected) such that the fluid pressure in the assisting chamber 90 is lower than that controlled in the hydraulic braking mode in which the regenerative braking is not effected. It will further be understood that the pressure-increasing valves 162 function as shutting-off valves and that a stroke simulation control portion is constituted by a portion of the brake controller 300 assigned to close the pressure-increasing valves 162 and control the first and second flow control devices 194, 256 during operation of the regenerative braking apparatus, such that the brake pedal operating force is controlled in the same relationship with the brake pedal operating stroke as when the regenerative braking apparatus is not in operation. It will also be understood that the ports 112, 116 formed through the first pressurizing piston 80 and cylinder housing 70 function as a communication control device and that an unintended braking control portion is constituted by a portion of the brake controller 300 assigned to advance the first pressurizing piston 80 by a predetermined distance to a predetermined position and control the second flow control device 256 for increasing the fluid pressure in the first pressurizing chamber 88. It will further be understood that the solenoid-operated valve devices 160 constitute a wheel brake cylinder pressure control device.

Figure 18:
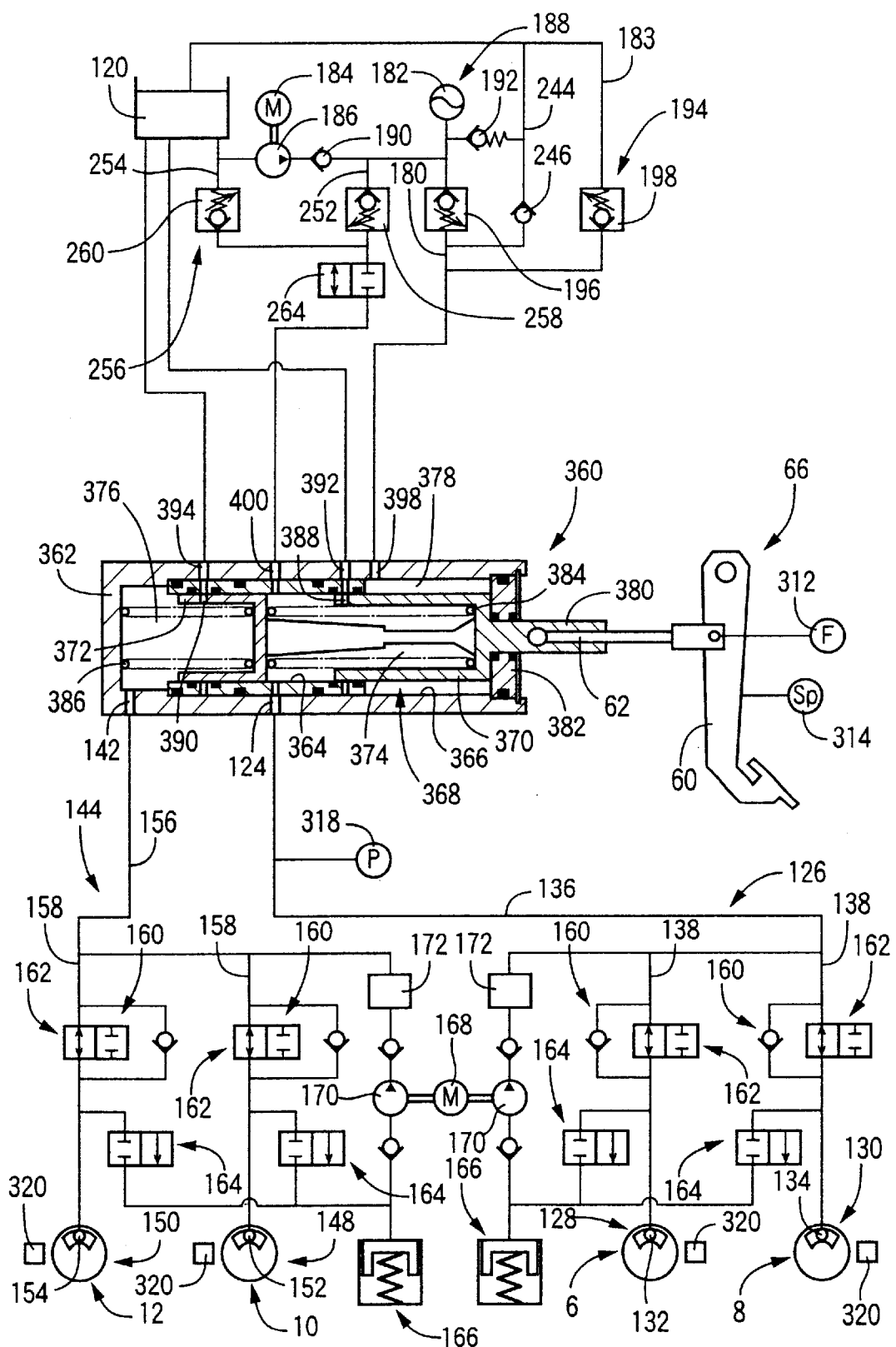
FIG. 18 is a view showing a hydraulic braking apparatus of a vehicle braking system constructed according to another embodiment of the invention.

In the first embodiment, the master cylinder 64 has the annular chamber 96 which is connected to the first pressurizing chamber 88 through the connecting passage 270. However, the annular chamber 96 and the connecting passage 270 are not essential. Referring to FIG. 18, there will be described a braking system according to a second embodiment of the present invention, which does not have the annular chamber 96 and the connecting passage 270. The braking system according to the second embodiment is identical with the braking system according to the first embodiment, except that the former braking system does not have the annular chamber 96 and the connecting passage 270, and therefore the fluid passage 276 and 280, the orifice 278 and the check valve 282. The same reference signs as used in the first embodiment will be used in the second embodiment to identify the corresponding elements, and the description of these elements is dispensed with.

The braking system according to the second embodiment includes a master cylinder 360 having a cylinder housing 362 that is a cylindrical member which is closed at one of its opposite ends and is open at the other end. The cylinder housing 362 has a cylinder bore 368 having a small-diameter portion 364 and a large-diameter portion 368. A first pressurizing piston 370 and a second pressurizing piston 372 are fluid-tightly and slidably fitted in the small-diameter portion 364. These first and second pressurizing pistons 370, 372 cooperate with the cylinder housing 362 to define a first pressurizing chamber 374 in front of the first pressurizing piston 370, and a second pressurizing chamber 376 in front of the second pressurizing piston 372. Further, the cylinder housing 362 cooperates with the rear surface and the outer cylindrical surface of the first pressurizing piston 370, to define an assisting chamber 378. A piston rod 380 is formed integrally with the first pressurizing piston 370 such that the piston rod 380 extends rearwards from the piston 370. The open end of the cylinder housing 362 is closed by a closure member 382, and the piston rod 380 fluid-tightly and slidably extends through this closure member 382 such that the rear end of the piston rod 380 is located outside the cylinder housing 362. The operating rod 62 connected to the brake pedal 60 engages the piston rod 380 such that the operating rod 62 and the piston rod 380 are moved together.

Each of the first and second pressurizing pistons 370, 372 is a cylindrical member which is closed at one of its opposite ends and open at the other end. The two pressurizing pistons 370, 372 are normally held at their fully retracted position under the biasing action of respective compression coil springs 384, 386 disposed in the respective first and second pressurizing chambers 374, 376. When the first and second pressurizing pistons 370, 372 are placed at the fully retracted position, the first and second pressurizing chambers 374, 376 are held in communication with the reservoir 120 through ports 388, 390 formed through the pistons 370, 372, and through reservoir ports 392, 294 formed through the cylinder housing 362. When the first and second pressurizing piston s370, 372 have been advanced by a predetermined distance from the fully retracted position, the ports 388, 390 are disconnected from the reservoir ports 392, 394, to prevent discharge flows of the working fluid from the first and second pressurizing chambers 374, 376 to the reservoir 120, so that the fluid pressure in the first and second pressurizing chambers 374, 376 can be increased.

The assisting chamber 378 is connected to the first flow control device 194 through an outflow-inflow port 398 formed through the cylinder housing 362, and the first pressurizing chamber 364 is connected to the second flow control device 256 through an outflow-inflow port 400 formed through the cylinder housing 362.

In the present second embodiment, too, the first and second flow control devices 194, 256 are controlled by a brake controller (not show) on the basis of the detected operating stroke and force of the brake pedal 60 and the detected fluid pressure in the first pressurizing chamber 374 (master cylinder pressure), for controlling the supply flow and discharge flow of the pressurized fluid to and from the assisting chamber 378 and the first pressurizing chamber 374, so that the brake pedal operating force and the master cylinder are controlled according to the predetermined relationships among the brake pedal operating stroke and force and the master cylinder pressure. The present braking system has substantially the same operational and functional advantages as described above with respect to the first embodiment.

In the present braking system, the operating rod 62 is fitted in the piston rod 380 such that the operating rod 62 is not axially movable relative to the piston rod 380. In this arrangement, the operating rod 62 is advanced with the first pressurizing piston 370 when the piston 370 is advanced to the predetermined position so as to close the ports 388, 390, upon initiation of the traction control, for instance. Accordingly, the brake pedal 60 is pivoted from the non-operated position (defined by a suitable stop) in the operating direction. Since, the amount of this pivotal movement of the brake pedal 60 is small, the vehicle operator is less likely to feel this pivotal motion from the non-operated position, even when the vehicle operator operates the brake pedal 60 during the traction control, for instance.

The first flow control device may include a pilot-operated pressure regulator, so that the assisting chamber is selectively communicated with the solenoid-operated pressure-increasing and -reducing valves, and the pilot-operated pressure regulator. An example of the braking system incorporating this modified arrangement will be described by reference to FIGS. 19 and 20. This modified braking system according to a third embodiment of the present invention is identical with the braking system according to the second embodiment of FIG. 18, except that the first flow control device provided in the braking system of the third embodiment includes the pilot-operated pressure regulator and a solenoid-operated shut-off valve which will be described. The same reference signs as used in the second embodiment will be used in the third embodiment to identify the corresponding elements, and description of these elements is dispensed with.

Figure 19:
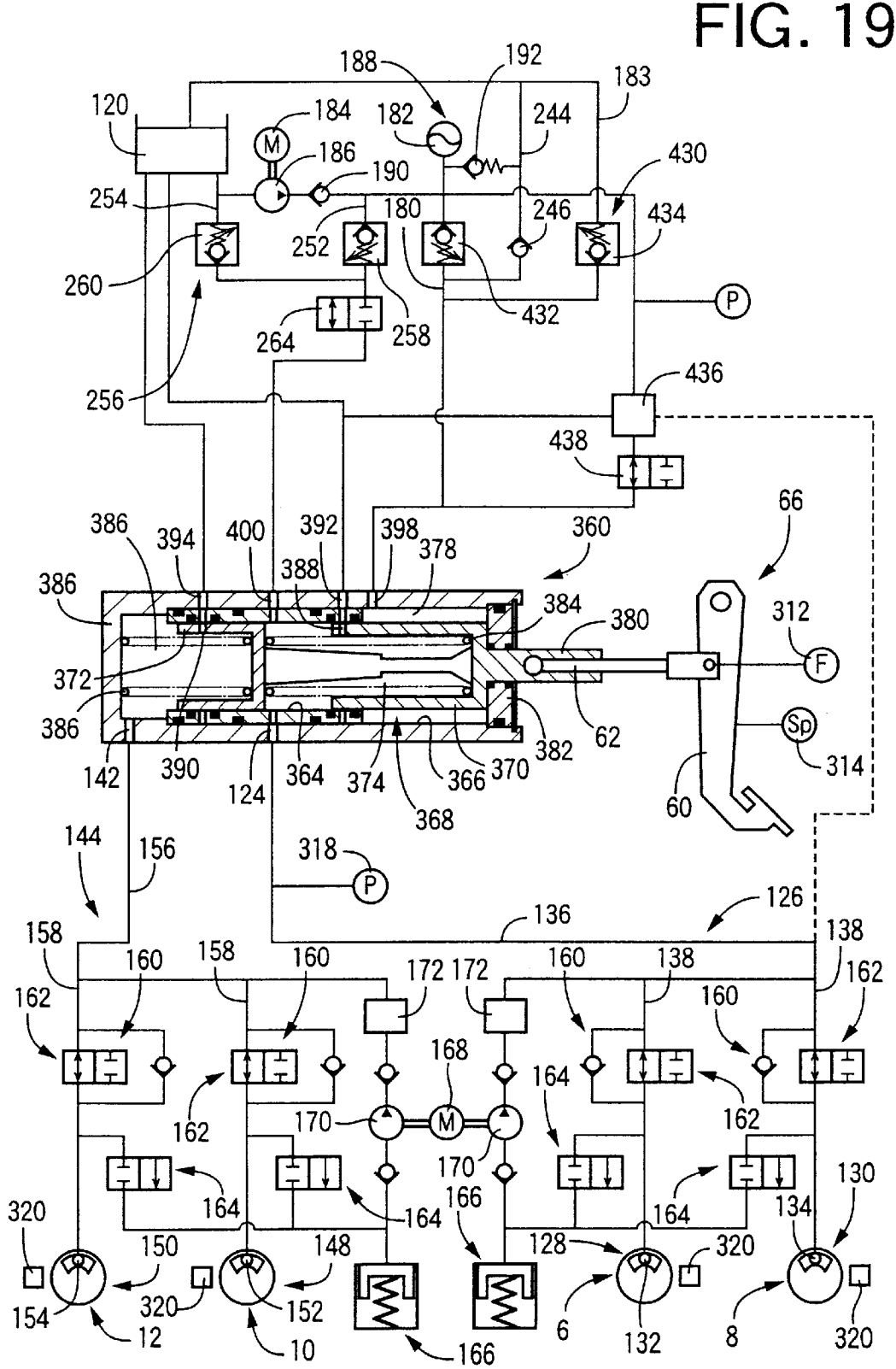
FIG. 19 is a view showing a hydraulic braking apparatus of a vehicle braking system constructed according to a further embodiment of the invention.
Figure 20:
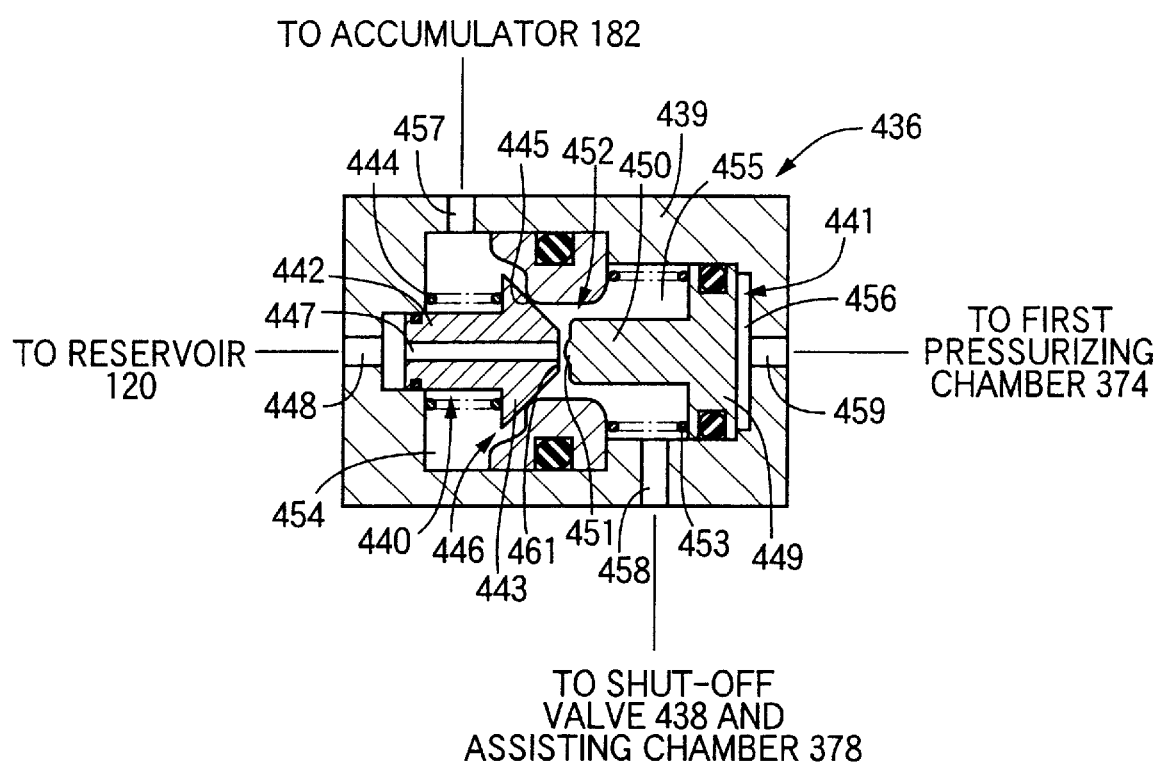
FIG. 20 is a view showing a pressure regulator of a first flow control device provided in the hydraulic braking apparatus of FIG. 19.

Namely, the braking system according to the third embodiment of FIGS. 19 and 20 includes a first flow control device 430 which includes an electrically operated hydraulic pressure control device consisting of a solenoid-operated pressure-increasing valve 432 and a solenoid-operated pressure-reducing valve 434, which are identical in construction with the pressure-increasing and pressure-reducing valves 196, 198 of the first flow control device 194 provided in the first and second embodiments. The first flow control device 430 further includes a pilot-operated pressure regulator 436 and a shutting-off device serving as a selecting device in the form of a solenoid-operated shut-off valve 438. The pressure-increasing valve 432 is a normally closed valve, which is identical in construction with the pressure-increasing valve 196. The pressure-reducing valve 434 is a normally open valve, which is identical with the pressure-reducing valve 198.

The pilot-operated pressure regulator 436 will be described by reference to FIG. 20. The pressure regulator 436 has a housing 439, and a valve member 440 and a control piston 441 which are axially movably received in the housing 439. The valve member 440 includes a shaft portion 442 in the form of a cylinder having a constant diameter, and tapered head portion 443 formed at one axial end of the shaft portion 442. The head portion 443 has a tapered outer circumferential surface and the largest diameter at one end thereof on the side of the above-indicated one end of the shaft portion 442 and the smallest diameter at the other end. The diameter of the tapered head portion 443 continuously decreases in a direction from the largest end to the smallest end which is remote from the shaft portion 442. The valve member 440 is biased by biasing means in the form of a spring 444, in a direction that causes the head portion 443 to be seated on a valve seat 445 provided in the housing 439. The head portion 443 and the valve seat 445 are arranged such that the head portion 443 is seated on the valve seat 445, at an axially intermediate part of the head portion 443 at which the diameter is larger than that of the shaft portion 442. The valve seat 445 and the head portion 443 to be seated on the valve seat 445 cooperate with each other to constitute a first valve portion 446. The valve member 440 has a through-hole 447 formed through a radially central portion thereof. The through-hole 447 is connected to the reservoir 120 through a low-pressure port 448 formed through the housing 439.

The control piston 441 is a stepped cylindrical member including a large-diameter portion 449 which is fluid-tightly and slidably fitted in the housing 349 such that the control piston 441 is coaxial with the valve member 440. The control piston 441 further includes a small-diameter portion 450 disposed on the side of the valve member 440. The small-diameter portion 450 has a part-spherical protrusion 451 formed on its end face which faces the valve member 440. The protrusion 451 can be seated on the open end of the through-hole 447 which is open at the smallest-diameter end of the head portion 443 of the valve member 440. Thus, the protrusion 451 can close the through-hole 447 at the above-indicated open end, which serves as a valve seat 461. The valve seat 461 and the protrusion 451 cooperate with each other to constitute a second valve portion 452. The control piston 441 is biased by biasing means in the form of a spring 453, in a direction that causes the protrusion 451 to move away from the valve seat 461. The housing 439 cooperates with the valve member 440 and control piston 441 accommodated in the housing 439, to define a high-pressure chamber 454, a control-pressure chamber 455 and a pilot-pressure chamber 456. The high-pressure chamber 454 is connected to the accumulator 182 through a high-pressure port 457 formed through the housing 439. The control-pressure chamber 455 is connected to the assisting chamber 478 through a control-pressure port 458 also formed through the housing 439, while the pilot-pressure chamber 456 is connected to the first pressurizing chamber 374 through a pilot-pressure port 459 also formed through the housing 439. The solenoid-operated shut-off valve 438 is a normally open valve provided in a fluid passage which connects the control-pressure port 458 and the assisting chamber 378.

Like the braking systems according to the first and second embodiments, the braking system according to the present third embodiment is adapted such that the first and second flow control devices 430, 256 control the fluid pressures in the assisting chamber 378 and the first pressurizing chamber 374, respectively, so as to establish the predetermined relationships between the brake pedal operating force and stroke and the master cylinder pressure. When the flow control devices 430, 256 are controlled as described above, the solenoid-operated shut-off valve 438 is closed to disconnect the assisting chamber 378 from the pressure regulator 436, for permitting the first flow control device 430 to control fluid flows between the assisting chamber 378 and the accumulator 182 and reservoir 120, provided the pump 186, pump drive motor 184, solenoid-operated pressure-increasing and pressure-reducing valves 432, 434, and electric system are all normal.

In the meantime, the pressure regulator 436 regulates the pressure of the pressurized fluid received from the accumulator 182, to a value corresponding to the master cylinder pressure. When the brake pedal 60 is not in operation, the first valve portion 446 is closed to disconnect the control-pressure port 458 and the high-pressure port 457 from each other, as shown in FIG. 20, while the second valve portion 452 is opened for fluid communication between the control-pressure port 458 and the high-pressure port 448. When the first pressurizing piston 370 is advanced to pressurize the fluid in the first pressurizing chamber 374 as a result of an operation of the brake pedal 60, the pressure of the pressurized fluid in the first pressurizing chamber 374 is applied as a pilot pressure to the pilot-pressure chamber 456. The operation or depression of the brake pedal 60 is permitted by a flow of the pressurized fluid from the accumulator 182 into the assisting chamber 378 through the pressure-increasing valve 432 and a flow of the fluid into the assisting chamber 478 from the reservoir 120 through the check valve 246.

By application of the pilot pressure (pressure in the first pressurizing chamber 374) to the pilot-pressure chamber 456, the control piston 441 is advanced against a biasing force of the spring 453, and the protrusion 451 is seated on the valve seat 461 to close the second valve portion 452, for disconnecting the control-pressure port 458 and the low-pressure port 448. When the pilot pressure (master cylinder pressure) is further increased in the above condition, the control piston 441 is further advanced, causing the valve member 440 to be retracted against a biasing force of the spring 444, so that the heat portion 443 of the valve member 440 is moved apart from the valve seat 445, so that the first valve portion 446 is opened for fluid communication between the control-pressure port 458 and the high-pressure port 457. As a result, the pressure of the pressurized fluid of the accumulator 182 is applied to the control-pressure chamber 455, so that the fluid pressure in the control-pressure chamber 455 is increased.

When the operating stroke of the brake pedal 60 is reduced, the master cylinder pressure, that is, the pilot pressure is lowered, and the control piston 44 is retracted under the biasing action of the spring 453. If the first valve portion 446 is placed in the closed state with the valve member 440 seated on the valve seat 445 at this time, the protrusion 451 is moved apart from the valve seat 461, and the second valve portion 452 is opened. If the valve member 440 is not seated on the valve seat 445 when the control piston 44 is retracted, the valve member 440 is advanced under the biasing action of the spring 444, as the control piston 441 is retracted, so that the first valve portion 446 is closed with the valve member 440 being seated on the valve seat 445. When the control piston 441 is further retracted, the protrusion 451 is moved apart from the valve seat 461, and the second valve portion 452 is opened, so that the control-pressure port 458 is disconnected from the high-pressure port 457 and is connected to the low-pressure port 448, whereby the control-pressure chamber 455 is communicated with the reservoir 120, with a result of a decrease in the fluid pressure in the control-pressure chamber 455.

When the fluid pressure in the control-pressure chamber 455 (control pressure) is changed in response to a change of the master cylinder pressure even if the amount of change of the master cylinder pressure is small, the following equations (1) and (2) are satisfied with respect to the valve member 440 and the control piston 441:

$$PM \cdot S3 = PP(S3-S4) + PR \cdot S4 \qquad (1)$$

$$PP(S2-S4) = PA(S2-S1) + PR(S1-S4) \qquad (2)$$

wherein,

PM: master cylinder pressure,

PP: fluid pressure in control-pressure chamber 455 of pressure regulator 436,

PR: fluid pressure in reservoir 120,

PA: fluid pressure in accumulator 182,

S1: cross sectional area of shaft portion 442 of valve member 440,

S2: cross sectional area of head portion 443 of valve member 440 at a point of seating on valve seat 445, S3: cross sectional area of large-diameter portion 449 of control piston 441, and S4: cross sectional area of protrusion 451 of second valve portion 452 at a point of seating on valve seat 461.

The fluid pressure PR in the reservoir 120 is equal to the atmospheric pressure, and the solenoid-operated shut-off valve 438 is closed while the electric system is normal, so that the fluid pressure PP in the control-pressure chamber 455 of the pressure regulator 436 and the master cylinder pressure PM satisfy a relationship represented by the following equation (3), which is derived from the above equations (1) and (2):

$$PP=\{S3/(S3-S2)\}PM-\{(S2-S1)/(S3-S2)\}PA \quad (3)$$

Since the cross sectional area S3 is larger than the cross sectional area S2, the value S3/(S3−S2) is a positive value, and the fluid pressure PP in the control-pressure chamber 455 changes with a change in the master cylinder pressure PM. The pressure regulator 436 controls the pressure PA of the pressurized fluid received from the accumulator 182, to a value corresponding to the master cylinder pressure.

When at least one of the pump 186 and the pump drive motor 184 is defective, or when the electric system is defective, the solenoid-operated pressure-increasing valve 432 is not operable to supply a pressurized fluid to the assisting chamber 378, with the pressure-increasing and pressure-reducing valves 432, 434 being closed, and the solenoid-operated shut-off valve 438 is open so that the pressurized fluid whose pressure is regulated by the pressure regulator 436 is supplied to the assisting chamber 378, whereby the brake operating force is boosted by the fluid pressure in the assisting chamber 378. The boosting of the brake operating force is continued as long as the pressurized fluid whose pressure is regulated by the pressure regulator 436 is supplied to the assisting chamber 378, while the fluid pressure in the accumulator 182 is sufficiently high. In this condition, the fluid pressure PP in the control-pressure chamber 455 of the pressure regulator 436 is equal to the fluid pressure in the assisting chamber 378, since there two chambers 455, 378 are held in communication with each other. Accordingly, the fluid pressure PP, the master cylinder pressure PM and the operating force F of the brake pedal 60 satisfy a relationship represented by the following equation (4):

$$F+P(S5-S6)=PM \cdot S5 \quad (4)$$

wherein,

S5: cross sectional area of first pressurizing piston 370, and

S6: cross sectional area of piston rod 380.

The following equation (5) is derived from the above equations (3) and (4):

$$PM=\{(S3-S2)/(S3 \cdot S6-S2 \cdot S5)\}F-\{(S2-S1)(S5-S6)/(S3 \cdot S6-S2 \cdot S5)\}PA \quad (5)$$

wherein the value (S3·S6−S2·S5) is a positive. The cross sectional areas S3, S6, S2, S5 are determined so that the value (S3−S2) and the value (S3·S6−S2·S5) are positive values. It will be understood from the above equation (5) that the master cylinder pressure PM is controlled depending upon the operating force F of the brake pedal 60.

In the case where the first flow control device 430 is defective, for instance, when the pressure-reducing valve 434 cannot be closed or the pressure-increasing valve 432 cannot be opened, the shut-off valve 436 is open permitting fluid communication between the pressure regulator 436 and the assisting chamber 378, so that the pressurized fluid whose pressure is regulated by the pressure regulator 436 is supplied to the assisting chamber 378, as in the case where the electric system or the pump 186 is defective.

If the pressure controlled by the first flow control device 430 is not sufficiently high to a delayed rise of the pressure of the pressurized fluid delivered from the pump 186, the shut-off valve 438 may be opened for supplying the pressurized fluid from the pressure regulator 436 to the assisting chamber 378. For instance, the shut-off valve 438 is held in the open state for a predetermined suitable length of time after the initiation of an operation of the brake pedal 60, so that the fluid pressure regulated by the pressure regulator 436 is applied to the assisting chamber 378.

As described above, the normally open solenoid-operated shut-off valve 438 is adapted to permit and inhibit the fluid communication between the pressure regulator 436 and the assisting chamber 378. When the coil of the shut-off valve 438 is in the de-energized state, the shut-off valve 438 is open for fluid communication between the pressure regulator 436 and the assisting chamber 378. Since the normally open shut-off valve 438 functioning as a shutting-off device is open while the electric system is defective, the pressure regulator 436 can be communicated with the assisting chamber 378 even when the electric system is defective.

In the third embodiment, the solenoid-operated shut-off valve is used as a selecting device for selecting one of the first flow control device 430 and the pressure regulator 436 which is communicated with the assisting chamber 378. However, a change valve may be used as the selecting device, in place of the shut-off valve. An example of this modified arrangement will be described by reference to FIGS. 21 and 22, which show a braking system according to a fourth embodiment of this invention. The third embodiment is substantially identical in construction with the third embodiment of FIGS. 19 and 20, except that a change valve is used in the fourth embodiment, as the selecting device for selective communication of the first flow control device 430 or the pressure regulator 436 with the assisting chamber 378. The same reference signs as used in the third embodiment will be used in the fourth embodiment to identify the corresponding elements, the description of which is dispensed with.

The vehicle braking system according to the fourth embodiment includes a hydraulic pressure source 460, which includes a pump 462, and a pump drive motor 464 for driving the pump 462. The braking system further includes a first flow control device 466, which includes a normally closed solenoid-operated shut-off valve 468, a solenoid-operated pressure-reducing valve 470, a pilot-operated pressure regulator 472, and a selecting device in the form of a change valve 374. The pressure-reducing valve 470 is a normally open shut-off valve, which is similar in construction with the pressure-reducing valve 198 described above. While the shut-off valve 468 is open, the pressure of the pressurized fluid delivered from the pump 462 is regulated by the pressure-reducing valve 470, and the thus regulated fluid pressure is applied to the assisting chamber 378 of the master cylinder 360. The pump 462 pressurizes the fluid received from the reservoir 120, and the pressurized fluid delivered from the pump 462 is stored in an accumulator 478. The shut-off valve 468 is connected to a fluid passage connecting the pump 462 and the accumulator 478. Two check valves 480 and 482 are provided in respective two portions of the above-indicated fluid passage on the opposite sides of the point of connection of the shut-off valve 468 to the fluid passage. The check valve 480 permits a flow of the fluid in a direction from the pump 462 toward the shut-off valve 468 and the accumulator 478, but inhibits a flow of the fluid in the reverse direction. The check valve 482 permits a flow of the fluid in a direction from the pump 462 toward the accumulator 462 and the shut-off valve 468, but inhibits a flow of the fluid in the reverse direction. Reference sign 483 denotes a pressure relief valve.

The pressure regulator 472 is similar in construction with the pressure regulator 436 described above, and is connected to the accumulator 478, the reservoir 476, the first pressurizing chamber 374 and the assisting chamber 378. The pressure regulator 472 is arranged to regulated the pressure of the pressurized fluid received from the accumulator 478, to a value depending upon the fluid pressure in the first pressurizing chamber 374 (master cylinder pressure), such that the fluid pressure regulated by the pressure regulator 472 is lower than the fluid pressure regulated by the first flow control valve device 466, for a given value of the master cylinder pressure. Conversely, the first flow control device 466 may be arranged to regulate the pressure of the fluid received from the accumulator 478 such that the fluid pressure regulated by the first flow control device 466 is higher than the fluid pressure regulated by the pressure regulator 472, for a given value of the master cylinder pressure.

Figure 22:
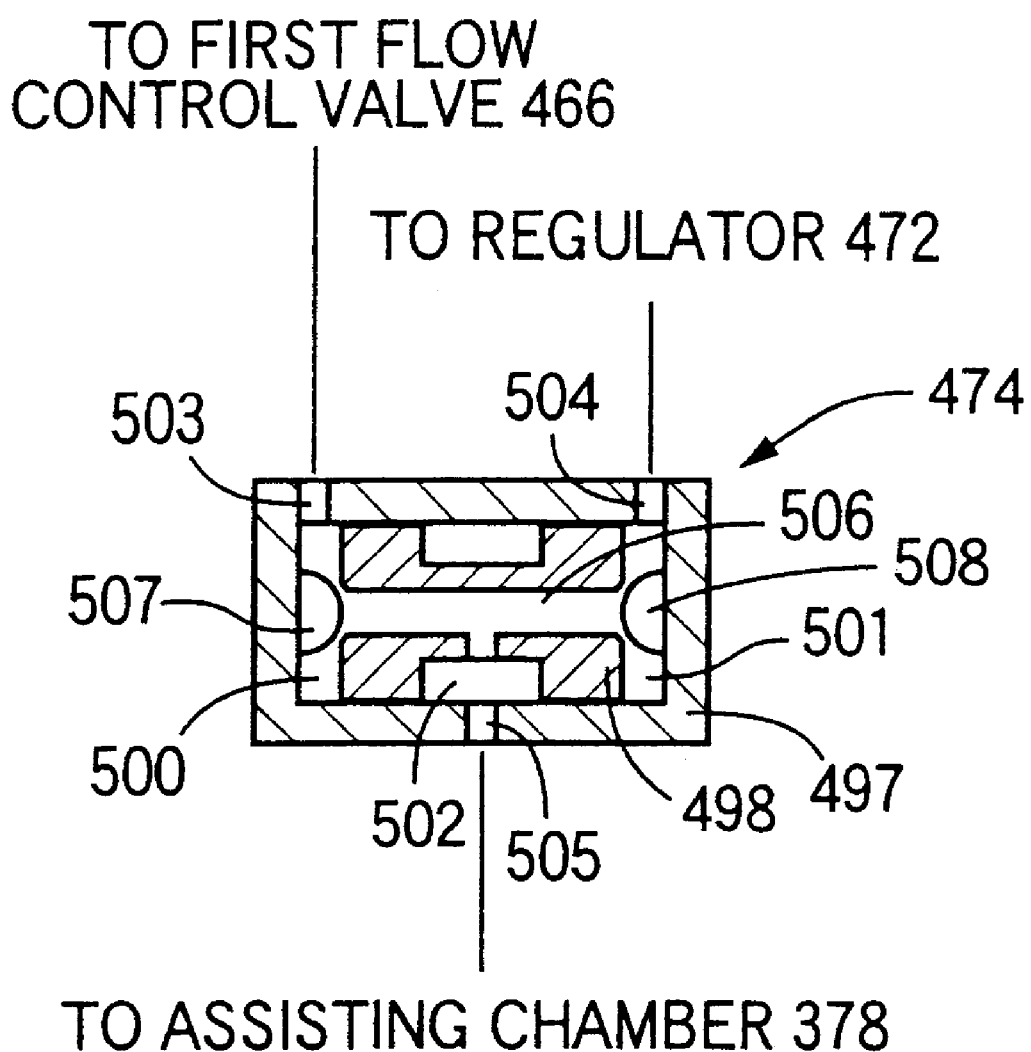
FIG. 22 is a view showing a check valve of a first flow control device provided in the hydraulic braking apparatus of FIG. 21.

As shown in FIG. 22, the change valve 474 has a housing 497, and a valve seat member 498 axially movably received in the housing 497. The valve seat member 498 includes an axially intermediate portion having a smaller diameter than that of opposite axial end portions. The end faces of the opposite axial end portions of the valve seat member 498 cooperate with the housing 497 to define respective pressure chambers 500, 501, while the axially intermediate portion cooperates with the housing 497 to define an annular pressure chamber 502. The pressure chamber 500 is connected to the first flow control device 466 through a port 503, and the pressure chamber 501 is connected to the pressure regulator 472 through a port 504, while the pressure chamber 502 is connected to the assisting chamber 378 through a port 505.

The valve seat member 498 has a fluid passage 506 communicating with the pressure chambers 500, 501, 502. In the pressure chambers 500 501 within the housing 497, there are disposed respective two valve members 507, 508 such that these valve members 507, 508 are opposed to the opposite open ends of the fluid passage 506, which open ends serve as valve seats. The opposite open ends of the fluid passage 506 are selectively closed by the respective valve members 507, 508 when the valve seat member 498 is axially moved in one of opposite directions due to a difference between the fluid pressures in the two pressure chambers 500, 501. Thus, the pressure chambers 500, 501 are selectively brought into communication with the pressure chamber 502 through the fluid passage 506. When the pressure of the pressurized fluid received from the first flow control device 466 is higher than the fluid pressure (control pressure) regulated by the pressure regulator 462, the valve seat member 498 is moved apart from the valve member 507 and is seated on the valve member 508, so that the first flow control device 466 is communicated with the assisting chamber 378, while the pressure regulator 472 is disconnected from the assisting chamber 378. When the control pressure regulated by the pressure regulator 472 is higher than the pressure of the pressurized fluid received from the first flow control device 466, the valve seat member 498 is moved apart from the valve member 508 and is seated on the valve member 507, so that the first flow control device 466 is disconnected from the assisting chamber 378, while the pressure regulator is communicated with the assisting chamber 378.

The assisting chamber 378 is connected to the reservoir 476 through a fluid passage 484 provided with a check valve 486, which permits a flow of the fluid in a direction from the reservoir 476 toward the assisting chamber 378, but inhibits a flow of the fluid in the reverse direction. Further, an accumulator pressure sensor 488 is provided to detect the pressure of the fluid in the accumulator 478.

Figure 21:
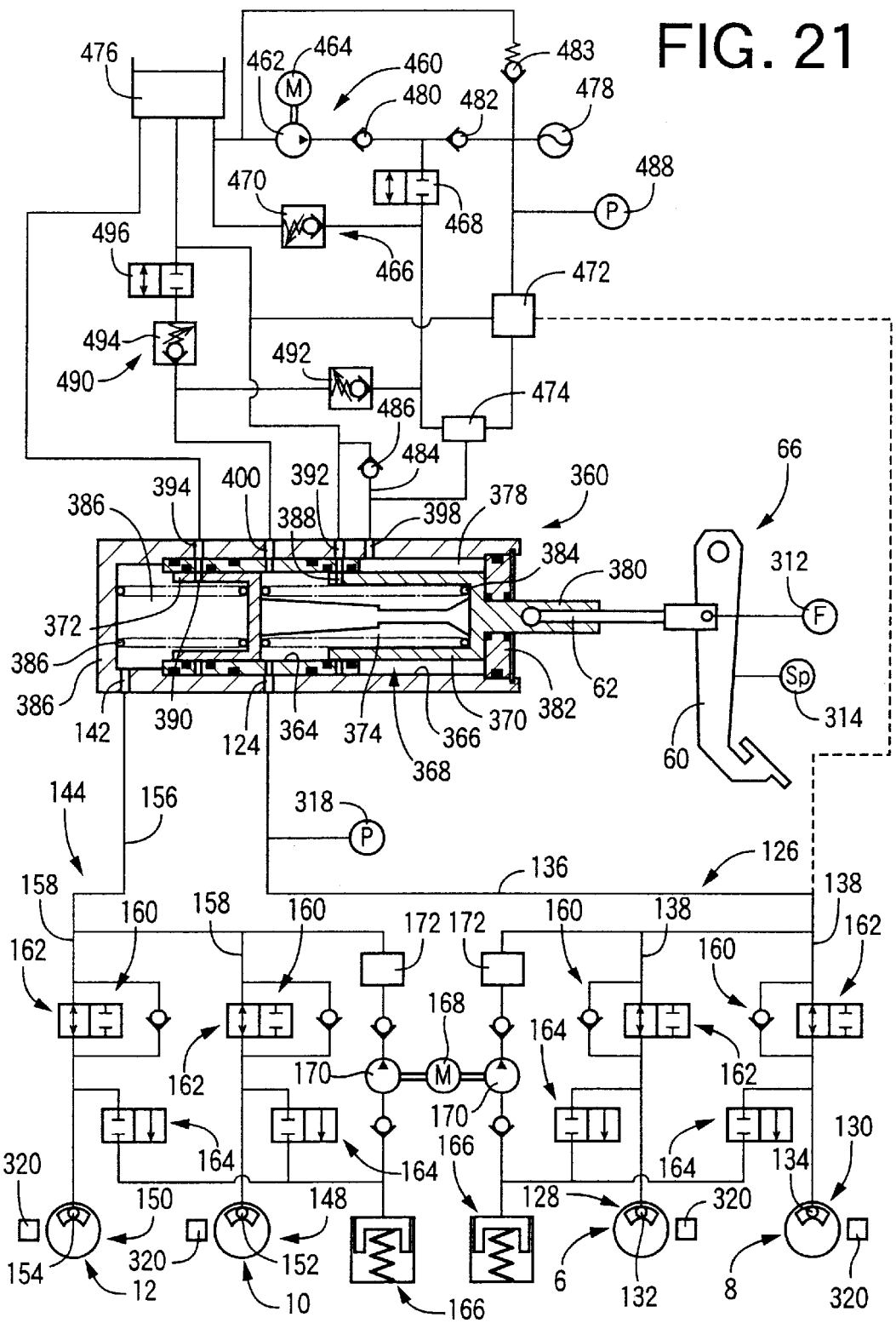
FIG. 21 is a view showing a hydraulic braking apparatus of a vehicle braking system according to a still further embodiment of the invention.

The braking system of FIG. 21 further includes a second flow control device 490. Like the second flow control device 256 in the preceding embodiments, the second flow control device 490 includes a normally closed solenoid-operated pressure-increasing valve 492 and a normally closed solenoid-operated pressure-reducing valve 494 which are similar in construction with the pressure-increasing and pressure-reducing valves 258, 260, and further includes a normally closed solenoid-operated shut-off valve 496 similar in construction with the shut-off valve 264. However, the second flow control valve 490 is provided to control the pressure of the pressurized fluid controlled by the first flow control device 466, and apply the thus regulated fluid pressure to the first pressurizing chamber 374. The shut-off valve 496 is provided between the pressure-reducing valve 494 and the reservoir 476.

In the present braking system, too, the first and second flow control devices 466, 490 are arranged to control the fluid pressures in the assisting chamber 378 and the first pressurizing chamber 374, so as to satisfy the predetermined relationship among the brake pedal operating force and stroke and the master cylinder pressure. When the brake pedal 60 is depressed, the solenoid-operated shut-off valves 468, 496 are opened, and the pump 462 is activated. The pressure of the pressurized fluid delivered from the pump 462 is controlled by the pressure-reducing valve 470, and the thus controlled fluid pressure is applied to the assisting chamber 378, so that the brake operating force is controlled to a value corresponding to the brake operating stroke. At the same time, the pressure of the pressurized fluid stored in the accumulator 478 is controlled by the pressure regulator 472. When the pressure of the pressurized fluid controlled by the first flow control device 462 is lower than the pressure of the pressurized fluid regulated by the pressure regulator 472, due to a delayed rise of the delivery pressure of the pump 462, the pressure regulator 472 is communicated with the assisting chamber 378 through the change valve 474. As a result, the pressurized fluid whose pressure has been regulated by the pressure regulator 472 is supplied to the assisting chamber 378, so that the brake operating force is boosted without a delay. After the delivery pressure of the pump 462 has been raised to a nominal value, the pressurized fluid is supplied to the assisting chamber 378 through the first flow control device 466, without a delay with respect to the operation of the brake pedal 60. In this condition, the pressure of the fluid controlled by the first flow control device 466 is higher than the pressure of the fluid controlled by the pressure regulator 472, so that the first flow control device 466 is communicated with the assisting chamber 378 through the change valve 474, and the brake operating force is boosted by the fluid pressure in the assisting chamber 378. Further, the fluid flows to and from the first pressurizing chamber 374 are controlled by the second flow control device 256, so that the master cylinder pressure is controlled to a value corresponding to the brake pedal operating stroke.

When the operating stroke of the brake pedal 60 is reduced or zeroed, the solenoid-operated shut-off valve 468 is closed, and the pressurized fluid is charged from the assisting chamber 378 to the reservoir 476 through the change valve 474 and the normally open pressure-reducing valve 470, so that the brake pedal 60 is permitted to be pivoted toward the non-operated position. At this time, the pressure-reducing valve 470 reduces the fluid pressure in the assisting chamber 378 while maintaining the predetermined relationship between the operating force and stroke of the brake pedal 60. Similarly, the pressure-reducing valve 494 reduces the fluid pressure in the first pressurizing chamber 374, with a decrease in the operating stroke of the brake pedal 60. After the master cylinder pressure is lowered to the atmospheric level, the pressure-reducing valve 470 is opened, and the shut-off valve 496 is closed.

While the fluid pressures in the assisting chamber 378 and the first pressurizing chamber 374 are controlled as described above, the pressurized fluid delivered from the pump 462 while the shut-off valve 468 is open is stored in the accumulator 478. After the brake pedal 60 has been released, the pump 462 is turned off when the pressure in the accumulator 478 detected by the accumulator pressure sensor 488 has been increased to a level high enough to boost the operating force of the brake pedal 60, for subsequent two or more operations of the brake pedal 60.

When the pump 472 is turned off due to a defect of the electric system of the braking system, the normally closed shut-off valves 468, 496 are held closed, and the normally open pressure-reducing valve 470 is held open. In this state in which the first flow control device 466 is not normally operable, the pressure of the fluid which is regulated by the pressure regulator 472 and applied to the change valve 474 becomes higher than the pressure of the fluid applied from the first flow control device 466 to the change valve 474, so that the pressure regulator 472 is communicated with the assisting chamber 378 through the change valve 474, whereby the pressure of the fluid regulated by the pressure regulator 472 is applied to the assisting chamber 378, for boosting the brake operating force. This boosting of the brake operating force by the fluid pressure in the assisting chamber 378 is continued as long as the fluid pressure in the accumulator 478 is high enough for the boosting.

Where the electric system is defective, the change valve 474 is brought to an operating state for fluid communication of the assisting chamber 378 with the pressure regulator 472. When the operating stroke of the brake pedal 60 is reduced in this state, the pressurized fluid in the assisting chamber 378 is discharged to the reservoir 476 through the change valve 474 and the pressure regulator 472. It is noted that even if the change valve 474 is placed in an operating state for fluid communication of the assisting chamber 378 with the first flow control device 466, the pressurized fluid is discharged from the assisting chamber 378 to the reservoir 476 through the normally open pressure-reducing valve 470. The operation of the braking system when at least one of the first and second flow control devices 466, 490 and the hydraulic power source 460 is defective is the same as when the electric system is defective. When one of the first and second flow control devices 466, 490 is defective, the other flow control device is not operated, and therefore the first flow control device 466 does not operate to control the fluid flows to and from the assisting chamber 378. In this case, the pressurized fluid is supplied to the assisting chamber 378 through the pressure regulator 472, and is discharged from the assisting chamber 378 to the reservoir 476 through the pressure regulator 472.

As described above, when at least one of the first and second flow control devices 466, 490 and the hydraulic pressure source is defective, the pressurized fluid is supplied from the pressure regulator 472 to the assisting chamber 378, to boost the operating force of the brake pedal 60. Further, the fluid is supplied from the reservoir 476 to the assisting chamber 378 through the fluid passage 484 and check valve 386, so that the depression of the brake pedal 60 is permitted. When the operating stroke of the brake pedal 60 is reduced, the pressurized fluid is discharged from the assisting chamber 378 to the reservoir 476 through the change valve 474 and pressure regulator 472, or through the change valve 472 and pressure-reducing valve 470, so that the reduction of the brake pedal operating stroke is permitted.

The solenoid-operated shut-off valve 496 is closed when the second flow control device 490 is defective, for instance, while the electric system is normal. For example, the shut-off valve 496 is closed when the pressure-reducing valve 494 cannot be closed due to a foreign matter caught therein. Thus, the shut-off valve 496 prevents a discharge flow of the pressurized fluid from the first pressurizing chamber 374 to the reservoir 476, which would cause a failure of the braking system to provide a braking effect.

In the embodiments described above, the first flow control device 194, 430, 466 and the second flow control device 256, 490 are arranged to control the fluid flows to and from the assisting chamber 90, 378 and the first pressurizing chamber 88, 374, for thereby controlling the fluid pressures in those chambers 90, 378, 88, 374 as needed. However, the master cylinder pressure may be controlled to a value which is a mechanically determined percentage of the fluid pressure in the assisting chamber. An example of this modification will be described by reference to FIG. 23, which shows a braking system according to a fifth embodiment of this invention.

The vehicle braking system according to the fifth embodiment has a master cylinder 510 consisting of a first master cylinder 512 having the first pressurizing piston 80 and the first pressurizing chamber 88, and a second master cylinder 514 having a second pressurizing piston 534 and a second pressurizing chamber 534. The first and second master cylinders 512, 514 are mutually separate units. The first master cylinder 512 is identical with the master cylinder 64 provided in the first embodiment of FIGS. 1–17, except that the first master cylinder 512 does not have the second pressurizing piston 82 and the second pressurizing chamber 98, but have only the first pressurizing piston 80, first pressurizing chamber 88, assisting chamber 90, annular chamber 96 and connecting passage 270. The same reference signs as used for the master cylinder 64 of FIG. 2 are used in FIG. 23 to identify the corresponding elements, the description of which is dispensed with. In the present embodiment, the annular chamber 96 and the first pressurizing chamber 88 are connected to each other through a port 516 and a fluid passage 518, as well as the port 268 and the connecting passage 270 provided in the first embodiment. The port 516 is formed through an axial portion of he cylindrical wall of the cylinder housing 70, which axial portion is located on one side of the port 268 nearer to the assisting chamber 90. Described more specifically, the port 516 is located such that the port 156 communicates with the annular chamber 96 when the first pressurizing piston 80 is located at its fully retracted position, and communicates with the assisting chamber 90 when the piston 80 is located at its fully advanced position at which a retainer 520 provided to retain the spring 100 and engaging the piston 80 is in abutting contact with the inner surface of the bottom wall of the cylinder bore 72, and at which the large-diameter portion 86 is located between the ports 268, 516. The fluid passage 518 is connected to a portion of the connecting passage 270 between the check valve 272 and the annular chamber 90.

The second master cylinder 514 has a cylinder housing 522 having a cylinder bore 530 including a small-diameter portion 524, an intermediate-diameter portion 526 and a large-diameter portion 528. The intermediate-diameter portion 526 is provided in a front end portion of the cylinder bore 530. A second pressurizing piston 534 is fluid-tightly and slidably fitted in the intermediate-diameter portion 526, and cooperates with the second pressurizing piston 534 to define a second pressurizing chamber 536 in front of the piston 534. The second pressurizing piston 534 is biased by a biasing device in the form of a compression coil spring 538 disposed in the second pressurizing chamber 536, so that the second pressurizing piston 534 is normally placed at its fully retracted position. When the second pressurizing piston 534 is placed at its fully retracted position, the second pressurizing chamber 536 is held is communication with a reservoir 543 through a port 540 formed through the piston 534, a reservoir port 541 formed through the cylinder housing 522, and a fluid passage 542.

The small-diameter portion 524 and the large-diameter portion 528 of the cylinder bore 530 are formed adjacent to each other such that the small-diameter portion 524 is located between the intermediate-diameter and large-diameter portions 526, 528. A stepped piston 544 including a small-diameter portion 546 and a large-diameter portion 548 is fitted in the small-diameter and large-diameter portions 524, 528 such that the small-diameter portion 546 engages the small-diameter portion 524 while the large-diameter portion 548 engages the large-diameter portion 528. The stepped piston 544 cooperates with the cylinder housing 522 to define a pressure-receiving chamber 550 in the rear end portion of the cylinder bore 530, a first pressure chamber 552 in front of the large-diameter portion 548, and a second pressure chamber 554 in front of the small-diameter portion 546. The stepped piston 544 is biased by a biasing device in the form of a compression coil spring 556 disposed between the stepped piston 544 and the second pressurizing piston 534, so that the stepped piston 544 is normally held at its fully retracted position.

The pressure-receiving chamber 550 is connected to a hydraulic pressure source 562 through a port 558 and a fluid passage 560. The hydraulic pressure source 562 includes a pump 564, and an electric motor 566 for driving the pump 564. The delivery pressure of the pump 564 is controlled by a solenoid-operated pressure-reducing valve 568, and the controlled fluid pressure is applied to the pressure-receiving chamber 550. The pressure-reducing valve 568 is a normally open valve, which is identical in construction with the pressure-reducing valve 198 described above. A control pressure sensor 576 is connected to a portion of the fluid passage 560 between the pressure-reducing valve 568 and the pressure-receiving chamber 550, for detecting the pressure of the fluid as controlled by the pressure-reducing valve 568. Like the braking systems of the preceding embodiments, the present braking system further includes the pedal force sensor 312 for detecting the operating force of the brake pedal 60, and the master cylinder pressure sensor 318 for detecting the fluid pressure in the first pressurizing chamber 88.

The first pressure chamber 552 is connected to the assisting chamber 90 through a port 580, a fluid passage 582 and the port 178, and to the reservoir 543 through ports 584, 585 and fluid passages 586, 587. A cup-shaped sealing member is provided to maintain fluid tightness between the large-diameter portion 548 of the stepped piston 544 and the cylinder housing 522, This sealing member is arranged to permit a flow of the fluid in a direction from the reservoir 543 toward the first pressure chamber 552 through the ports 584, 585, but inhibit a flow of the fluid in the reverse direction. When the stepped piston 544 is placed at its fully retracted position, the port 584 is open to the first pressure chamber 552, permitting the fluid flow from the first pressure chamber 552. The second pressure chamber 554 is connected to the first pressurizing chamber 88 through a port 588 and a fluid passage 590. The second pressurizing chamber 536 is connected through a main fluid passage 592 to the wheel brake cylinders 152, 154 of the wheel brakes 148, 150 for the rear left and right wheels 10, 12.

When the brake pedal 60 is operated, the first pressurizing piston 80 is advanced to pressurize the fluid in the first pressurizing chamber 88. At the same time, the pump 564 is turned on, and the pressure of the pressurized fluid which is delivered from the pump 564 and which is controlled by the pressure-reducing valve 568. is applied to the pressure-receiving chamber 550. As a result, the stepped piston 544 is advanced by the pressurized fluid supplied to the assisting chamber 550, to pressurize the fluid in the first pressure chamber 552, so that the pressurized fluid is supplied from the first pressure chamber 552 to the assisting chamber 90 through the port 580, fluid passage 582 and port 178, whereby the operating force of the brake pedal 60 is boosted by the pressurized fluid in the assisting chamber 90. The solenoid-operated pressure-reducing valve 568 is controlled to control the delivery pressure of the pump 564 for controlling the fluid pressure in the assisting chamber 90, such that the brake pedal operating force and the master cylinder pressure (pressure in the first pressurizing chamber 88) maintain the predetermined relationship. In the present embodiment, the pressure-reducing valve 568 is controlled to control the delivery pressure of the pump 564 on the basis of the output signal of the master cylinder pressure sensor 318, so as to satisfy the predetermined relationship between the brake pedal operating force and the master cylinder pressure. However, the pressure-reducing valve 568 may be controlled to control the delivery pressure of the pump 564 on the basis of the brake pedal operating force as detected by the pedal force sensor 312. The control pressure sensor 576 may be used for feedback-controlling the amount of electric current to be applied to the pressure-reducing valve 568, and/or diagnosing the pressure-reducing valve 568, pup 564 and pump drive motor 566 for any abnormality or defect. If the fluid pressure in the pressure-receiving chamber 550 detected by the control pressure sensor 576 is lower than the nominal value by more than a predetermined amount, at least one of the pressure-reducing valve 568, pump 564 and pump drive motor 566 is considered to be defective.

The advancing movement of the stepping piston 544 also causes the fluid pressure in the second pressure chamber 554 to be pressurized, and the thus pressurized fluid is supplied to the first pressurizing chamber 88. The fluid pressures in the first and second pressure chambers 552, 554 are determined by equilibrium between a force acting on the stepped piston 544 in the advancing direction based on the fluid pressure in the pressure-receiving chamber 550 and a force acting on the stepped piston 544 in the retracting direction based on the fluid pressures in the first and second pressure chambers 552, 554. The fluid pressure in the second pressure chamber 554 is determined by the fluid pressure in the pressure-receiving chamber 550, the fluid pressure in the first pressure chamber 552, the fluid pressure in the second pressure chamber 554, the surface area of the rear end face of the large-diameter portion 548 (pressure-receiving surface area partially defining the chamber 550), the surface area of the annular front end face of the large-diameter portion 548 (annular pressure-receiving surface area partially defining the first pressure chamber 552), and the surface area of the front end face of the small-diameter portion 546 (pressure-receiving surface area partially defining the second pressure chamber 554). The thus determined fluid pressure in the second pressure chamber 554 is applied to the first pressurizing chamber 88. The fluid pressure in the first pressurizing chamber 88 which is applied to the wheel brake cylinders 132, 134 to activate the brakes 128, 130 consists of a first component generated by the advancing movement of the first pressurizing piston 80 by operation of the brake pedal 60, and a second component received from the second pressure chamber 554. The second component which is applied from the second pressure chamber 554 to the first pressurizing chamber 88 on the basis of the fluid pressure in the pressure-receiving chamber 550 is a fluid pressure which is mechanically controlled by the stepped piston 544. Since the operating stroke of the brake pedal 60 and the master cylinder pressure (fluid pressure in the first pressurizing chamber 88) have the mechanically determined relationship, the operating stroke of the brake pedal 60 is smaller when the fluid pressure (the above-indicated second component) controlled by the stepped piston 544 is applied to the first pressurizing chamber 88, than when that fluid pressure is not applied, for a given value of the master cylinder pressure. An advancing movement of the second pressurizing piston 534 due to the advancing movement of the stepped piston 544 causes the fluid pressure in the second pressurizing chamber 536 to be pressurized, and the pressurized fluid is supplied to the wheel brake cylinders 152, 154. The pressure-receiving surface of the second pressurizing piston 534 which partially defines the second pressurizing chamber 536 is equal to its pressure-receiving surface which partially defines the second pressure chamber 554, so that the fluid pressure pressurized in the second pressurizing chamber 536 by the advancing movement of the second pressurizing piston 534 is equal to the fluid pressure in the first pressurizing chamber 88, so that the fluid pressure applied to the wheel brake cylinders 152, 154 is equal to the fluid pressure applied to the wheel brake cylinders 132, 134.

When the operating stroke of the brake pedal 60 is reduced, the pressurized fluid is discharged from the pressure-receiving chamber 550 to the reservoir 543 through the pressure-reducing valve 568 while the pressure of the fluid is controlled by the pressure-reducing valve 568. At the same time, the pressurized fluid is discharged from the assisting chamber 90 to the first pressure chamber 552, permitting the stepped piston 544 to be retracted toward its fully retracted position, so that the retracting movements of the first and second pressurizing pistons 80, 534 are permitted.

When the traction control, vehicle running stability control or other automatic braking control is effected without an operation of the brake pedal 60, the pressurized fluid is supplied from the hydraulic pressure source 562 to the pressure-receiving chamber 550, to pressurize the fluid in the first and second pressurizing chambers 88, 536.

When the electric system is defective, the pump 564 is inoperable, and the operating force of the brake pedal 60 and the master cylinder pressure are not controlled in relation to the operating force of the brake pedal 60. However, the fluid in the first pressurizing chamber 88 is pressurized by the advancing movement of the first pressurizing piston 80, and the fluid pressure in the first pressurizing chamber 88 is applied to the second pressure chamber 554 through the fluid passage 590, so that the second pressurizing piston 546 is advanced to pressurize the fluid in the second pressurizing chamber 536. As a result, the wheel brake cylinders 132, 134, 142, 154 are activated to provide a braking effect. In this event, the stepped piston 544 is held at its fully retracted position, and the depressing action of the brake pedal 60 is permitted by the fluid flow from the reservoir 543 to the assisting chamber 90 through the ports 584, 585, first pressure chamber 552, port 580, fluid passage 582 and port 178. Conversely, the releasing action of the brake pedal 60 is permitted by the fluid flow from the assisting chamber 90 to the reservoir 543 through the port 178, fluid passage 582, port 580, first pressure chamber 552, port 584 and fluid passage 586. When the hydraulic pressure source 562 is defective, too, the braking system is operated in the manner described above.

When the brake-application sub-system for the front wheels 6, 8 is defective while the electric system is normal, the fluid in the first pressurizing chamber 88 of the first master cylinder 512 cannot be pressurized, and an operation of the brake pedal 60 causes the first pressurizing piston 80 to be advanced to the fully advanced position at which the spring retainer 520 is in abutting contact with the bottom wall of the cylinder bore 72. The pump drive motor 566 is turned on upon operation of the brake pedal 60, and the operation of the pump 564 is initiated. However, since the fluid in the first pressurizing chamber 88 cannot be pressurized, the normally open solenoid-operated pressure-reducing valve 568 is not operated, and remains in the fully open state. As a result, the pressurized fluid delivered from the pump 564 is fed to the reservoir 543, and is not supplied to the pressure-receiving chamber 550 of the second master cylinder 514. When the operating force acting on the brake pedal 60 is further increased after the first pressurizing piston 80 has reached the fully advanced position, the operating force is detected by the pedal force sensor 312, and the pressure-reducing valve 568 is operated in response to the output signal of the pedal force sensor 312 indicative of an increase in the brake pedal operating force. The pressurized fluid delivered from the pump 564 is now supplied to the pressure-receiving chamber 550, while the pressure of the fluid is controlled by the pressure-reducing valve 568. As a result, the stepped piston 544 is advanced. When the first pressurizing piston 80 is placed at its fully advanced position at which the spring retainer 520 is in abutting contact with the bottom wall of the cylinder bore 72, the port 156 is open to the assisting chamber 90, so that the fluid in the first pressure chamber 552 is fed into the first pressurizing chamber 88 through the port 580, fluid passage 582, port 178, assisting chamber 90, port 516, fluid passage 518, connecting passage 270 and port 118, and is further returned to the reservoir 543 through the fluid passage 276. Accordingly, the stepped piston 544 is permitted to be advanced. When the front sub-system of the braking system is defective, the fluid is discharged from the first pressurizing chamber 88 with the first pressurizing piston 80 being brought to its fully advanced position, permitting the fluid flow from the first pressure chamber 552 to the first pressurizing chamber 88 through the assisting chamber 90 and the port 16 open to the assisting chamber 90.

After the stepped piston 544 has come into abutting contact with the second pressurizing piston 534 as a result of the advancing movement of the stepped piston 544, the second pressurizing piston 534 is advanced with the stepped piston 544, to pressurized the fluid in the second pressurizing chamber 536. While the front sub-system is defective, the fluid pressure in the first pressurizing chamber 88 and the second pressure chamber 554 is equal to the atmospheric pressure, and the fluid pressure in the first pressure chamber 552 communicating with the first pressurizing chamber 88 and reservoir 543 through the assisting chamber 90 is also equal to the atmospheric pressure. In this condition, the fluid pressure in the second pressurizing chamber 536 is pressurized to a value which is equal to a product of the fluid pressure in the pressure-receiving chamber 550 and a ratio of the cross sectional area of the large-diameter portion 548 of the stepped piston 544 to the cross sectional area (pressure-receiving surface area) of the second pressurizing piston 534. Accordingly, the wheel brake cylinders 152, 154 are activated to brake the rear wheels 10, 12 with a larger total braking force when the front sub-system is defective, than when the front sub-system is normal. The maximum operating stroke of the stepped piston 544 is determined to be large enough to permit the rear wheel brake cylinders 152, 154 to produce a sufficiently large total rear braking force when the brake-application sub-system for the front wheels 6, 8 is defective. The maximum operating stroke of the stepped piston 544 is equal to a sum of he distance between the stepped piston 544 and the second pressurizing piston 534 at their fully retracted position, and a distance between the second pressurizing piston 534 and the bottom wall of the cylinder bore 530 (intermediate-diameter portion 526).

Figure 23:
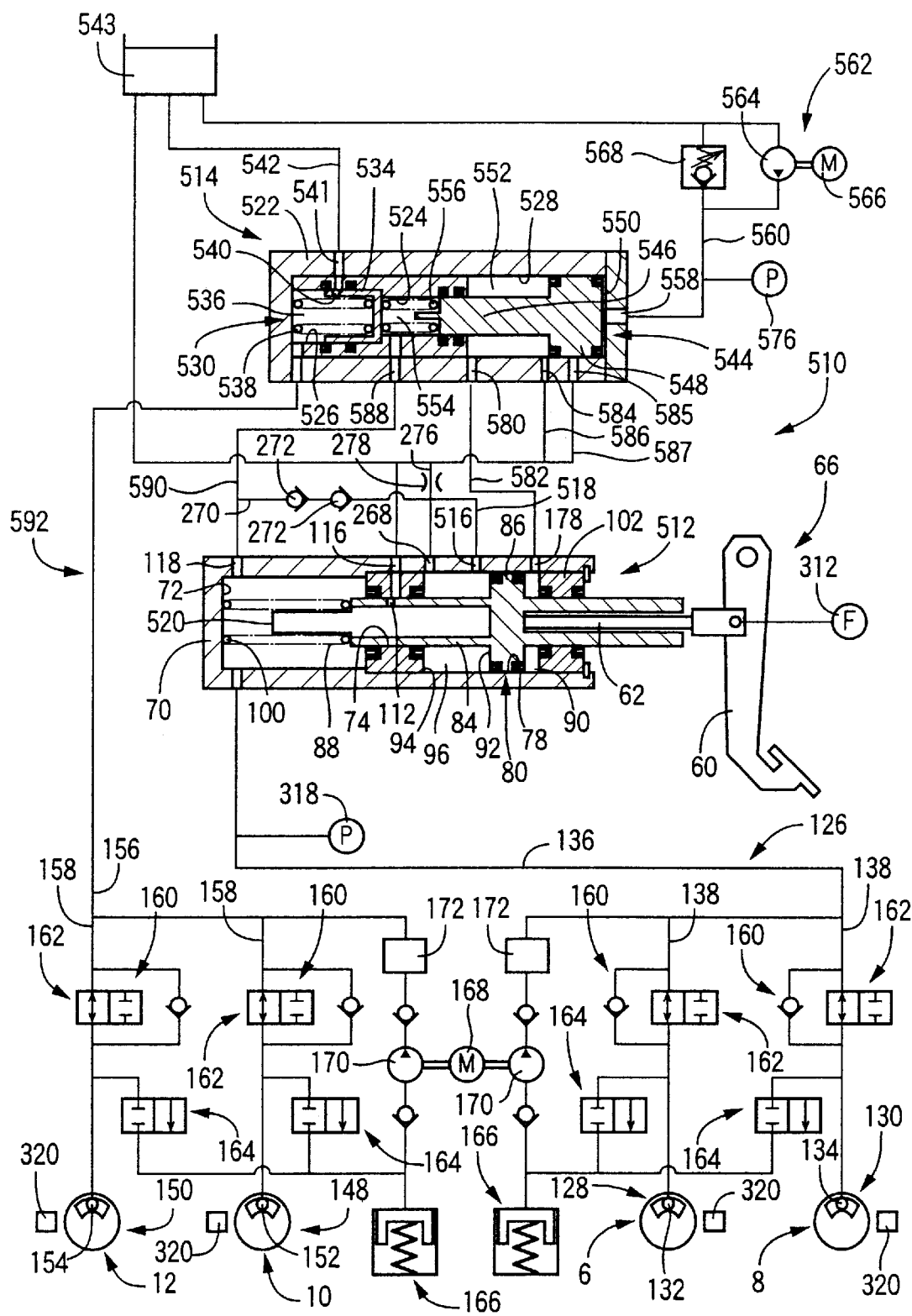
FIG. 23 is a view showing a hydraulic braking apparatus of a vehicle braking system according to a yet further embodiment of the invention.

In the present embodiment of FIG. 23, the solenoid-operated pressure-reducing valve 568 functions as a first flow control device, while the stepped piston 544 functions as a second flow control device.

A sixth embodiment of this invention will be described by reference to FIG. 24. The braking system according to this embodiment uses a first flow control device 600, which includes a solenoid-operated pressure-increasing device 602, a solenoid-operated pressure-reducing device 604 and a pilot-operated pressure regulator 606. The pressure regulator 606 is identical with the pressure regulator 36 used in the embodiment shown in FIGS. 19 and 20, and the description of the pressure regulator 606 is dispensed with. The pressure-reducing valve 604 is provided in a fluid passage 610 connecting the low-pressure port 448 and the reservoir 120. The pressure-reducing valve 604 is a normally open seat valve, which is identical in construction with the pressure-reducing valve 434 of the first flow control device 430 described above. The pressure-increasing valve 602 is a normally closed seat valve, which is identical in construction with the pressure-increasing valve 432 of the first flow control device .430. Like the pressure-increasing valve 432, the pressure-increasing valve 602 is provided in the fluid passage 180 connecting the assisting chamber 378 and the accumulator 182. In the other aspects, the present braking system is identical with the braking system of FIGS. 19 and 20. The same reference signs as used in the embodiment of FIGS. 19 and 20 are used in the present embodiment t identify the corresponding elements, the description of which is dispensed with.

Figure 24:
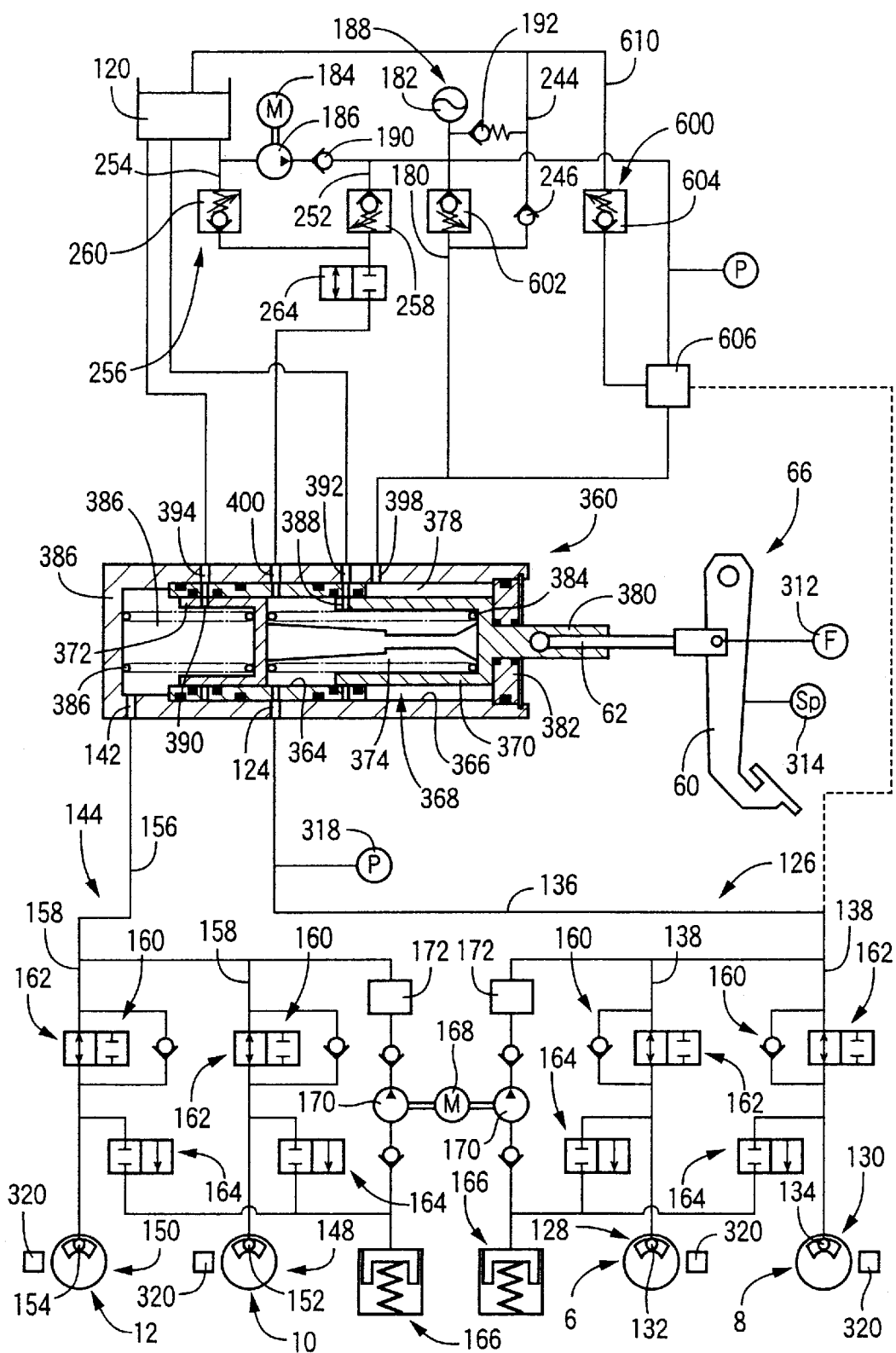
FIG. 24 is a view showing a hydraulic braking apparatus of a vehicle braking system according to still another embodiment of the invention.

In the present embodiment of FIG. 24, the first and second flow control devices 600, 256 are controlled to control the fluid pressures in the assisting chamber 378 and the first pressurizing chamber 374 (master cylinder pressure), so as to maintain the predetermined relationships among the operating force and stroke of the brake pedal 60 and the master cylinder, when the operating stroke of the brake pedal 60 is increased, reduced or zeroed. When the brake pedal 60 is operated, the pressure-increasing valve 602 is controlled to control the fluid pressure in the assisting chamber 378 (the fluid pressure in the control-pressure port 458) such that the fluid pressure in the control-pressure port 458 is higher than the pressure in the pilot-pressure port 459). When the operating stroke of the brake pedal 60 is reduced, the pressure-reducing valve 604 is controlled to control the fluid pressure in the low-pressure port 448 such that the fluid pressure in the low-pressure port 448 is higher than the fluid pressure in the pilot-pressure port 459. There will be described the operation of the first flow control device 600, but the description of the second flow control device 256 is dispensed with.

When the brake pedal 60 is operated, the pressure of the pressurized fluid received from the accumulator 182 is controlled by the pressure-increasing valve 602 of the first flow control valve 600, and the thus controlled fluid pressure is applied to the assisting chamber 378. At the same time, the pressure-reducing valve 604 is closed, to disconnect the pressure regulator 606 (control-pressure chamber 455) from the reservoir 120. Since the control-pressure chamber 455 of the pressure regulator 606 and the assisting chamber 378 are always held in communication with each other, the fluid pressure in the control-pressure chamber 455 is equal to that in the assisting chamber 378. Accordingly, when the brake pedal 60 is operated to pressurize the fluid in the first pressurizing chamber 370, the fluid pressure in the assisting chamber 378 (the fluid pressure as controlled by the pressure-increasing valve 602) and the fluid pressure in the first pressurizing chamber 374 (master cylinder pressure) serving as the pilot pressure act on the control piston 441 in the opposite directions. However, the pressure-reducing valve 504 is in the closed state, and the control-pressure chamber 455 is disconnected from both of the reservoir 120 and the accumulator 182, so that the pressure of the fluid received from the accumulator 182 is not controlled by the pressure regulator 606, as if the pressure regulator 606 were not provided. Further, since the fluid pressure in the assisting chamber 378 is higher than the master cylinder pressure, the pressure regulator 606 is more stably prevented from operating to control the pressure of the accumulator 182. Described in detail, the pressure-reducing valve 604 placed in the closed state does not permit the valve member 440 to be retracted against the biasing force of the spring 444, so that the first valve portion 446 cannot be opened for fluid communication between the control-pressure chamber 455 and the high-pressure chamber 454, when the valve member 440 is forced by the control piston 441 in the direction away from the valve seat 445. Further, since the fluid pressure in the assisting chamber 378 is controlled to be higher than the master cylinder pressure, the control piston 441 is not advanced and is held at its fully retracted position, as shown in FIG. 20. When the brake pedal 60 is depressed while the pressure-increasing valve 602 is normal, the pressure-reducing valve 604 is held in the closed state, irrespective of the fluid pressure in the assisting chamber 378 (control pressure) and the fluid pressure in the first pressurizing chamber 374 (master cylinder pressure). Namely, the coil of the normally open pressure-reducing valve 604 is energized with the maximum amount of electric current, and the operation of the pressure regulator 606 is prevented, as if it were not present. In this state, the fluid pressure in the assisting chamber 378 is controlled by the pressure-increasing valve 602. Accordingly, even though the assisting chamber 378 and the control-pressure chamber 455 are always held in communication with each other, the fluid pressure in the assisting chamber 378 is not mechanically controlled by the pressure regulator 378, preventing a failure of the braking system to operate so as to maintain the predetermined relationship between the brake pedal operating stroke and force.

The master cylinder pressure PM, the brake pedal operating force F and the pressure PP in the control-pressure chamber 455 (control pressure) of the pressure regulator 606 satisfy a relationship represented by the following equation (6):

$$F+PP(S5-S6)=PM \cdot S5 \qquad (6)$$

The control pressure PP increases with an increase in the brake pedal operating force F. Suppose PP=A·F ("A" representing a positive constant), the following equation (7) representing the master cylinder pressure PM is derived from the above equation PP=A·F and the above equation (6):

$$PM=[\{1+A\cdot S5(S5-S6)\}/S5]F \quad (7)$$

In the pressure regulator 606, the low-pressure port 448 and the control-pressure chamber 455 are held in communication with each other, the following equation (8) is satisfied with respect to the valve member 440:

$$PA-PP=W(S2-S1) \quad (8)$$

In the above equation (8), "W" represents a force applied from the valve seat 445 to the valve member 440 in a direction away from the valve seat 445 when the valve member 440 is forced against the valve seat 445. While the force W decreases with an increase in the control pressure PP, the valve member 440 is held seated on the valve seat 445, since the pressure PA in the accumulator 182 is higher than the control pressure PP, and the force W cannot be a negative value.

When the operating stroke of the brake pedal 60 is reduced, this reduction of the operating stroke is detected on the basis of a reduction of the operating force as detected by the pedal force sensor 312, and the pressure-increasing valve 602 is closed while the pressure-reducing valve 604 is controlled to reduce the fluid pressure in the assisting chamber 378. The fluid pressure in the low-pressure port 444 is reduced with a decrease in the amount of electric current to be applied to the coil of the normally open pressure-reducing valve 604. The amount of electric current to be applied to the pressure-reducing valve 604 to reduce the fluid pressure in the assisting chamber 378 is determined in the same manner as when the fluid pressure in the assisting chamber 378 is increased. That is, the amount of electric current is determined so as to maintain the predetermined relationships among the brake pedal operating stroke and force and the master cylinder pressures, and such that the fluid pressure in the low-pressure port 448 is higher than the fluid pressure in the pilot-pressure port 459, that is, than the master cylinder pressure. Accordingly, the control pressure PP or the fluid pressure in the assisting chamber 378 is made higher than the master cylinder pressure, and the control piston 441 is held at its fully retracted position, so that the valve member 440 is held seated on the valve seat 445. Thus, the operation of the pressure regulator 606 is prevented, as if the pressure regulator 606 were not provided, and the fluid is discharged from the assisting chamber 378 to the reservoir 120 through the control-pressure chamber 455, through-hole 446, low-pressure port 448 and pressure-reducing valve 604. Accordingly, the fluid pressure in the assisting chamber 378 is made equal to the fluid pressure in the low-pressure port 448, that is, lowered to a value as controlled by the pressure-reducing valve 604. The above equations (7) and (8) are applicable also when the fluid pressure in the assisting chamber 378 is reduced upon operation of the brake pedal 60 toward the non-operated position.

When the traction control or other automatic braking control is effected, the pressure-reducing valve 604 is held in the closed state, and the pressurized fluid is supplied from the pressure-increasing valve 602 to the assisting chamber 378, so that the first pressurizing piston 370 is advanced by a predetermined distance to the predetermined position. As a result, the first pressurizing chamber 374 is disconnected from the reservoir 120, and the second flow control device 256 is controlled to increase the fluid pressure in the first pressurizing chamber 374. When the traction control is terminated, the pressure-reducing valve 604 is opened, so that the pressurizing fluid is discharged from the assisting chamber 378 to the reservoir 120 through the pressure regulator 606, permitting the retracting movement of the first pressurizing piston 370. The pressure-reducing valve 604 is opened when the master cylinder pressure is lowered below a predetermined threshold, for instance, lowered down to the atmospheric level. That is, the pressure-reducing valve 604 is opened while there is not a risk of the first valve portion 446 being opened with the valve member 440 being forced by the control piston 441.

When the electric system is defective, the normally closed pressure-increasing valve 602 is held closed, and the normally open pressure-reducing valve 604 is held open, so that the low-pressure power 448 is communicated with the reservoir 120. When the brake pedal 60 is operated in this state, the pressure regulator 606 is operated in the same manner as the pressure regulator 436 described above, to regulate the pressure of the pressurized fluid received from the accumulator 182 to a value corresponding to the master cylinder pressure, and the thus regulated fluid pressure is applied to the assisting chamber 378, so that the operating force of the brake pedal 60 is boosted. When the operating stroke of the brake pedal 60 is reduced, the detected operating force is reduced, and the master cylinder pressure is accordingly lowered while the control piston 441 is retracted. As a result, the first valve portion 446 is closed, while the second valve portion 452 is opened, so that the assisting chamber 378 is communicated with the reservoir 120 through the control-pressure chamber 455 and the low-pressure port 448, and the fluid pressure in the assisting chamber 378 is lowered to a value corresponding to the master cylinder pressure (pilot pressure).

When the hydraulic pressure source 188 does not generate a pressurized fluid having the nominal pressure due to any defect such as a fluid leakage from the accumulator 182, the pressure-increasing valve 602 is held closed while the pressure-reducing valve 604 is held open. Accordingly, the pressure regulator 606 is operated in the same manner as when the electric system is defective. When the first flow control device 600 is defective, for instance, the pressure-increasing valve 602 cannot be open, the pressure-reducing valve 604 is opened, and the pressure regulator 606 is operated to regulate the pressure of the pressurized fluid received from the accumulator 182, in the same manner as when the electric system is defective, and the thus regulated pressure is applied to the assisting chamber 378.

In the present braking system of FIG. 24, the pressure regulator 606 is disabled to operate as if it were not provided, while the braking system is normal, without using the solenoid-operated shut-off valve 438 used in the embodiment of FIGS. 19 and 20 for permitting and inhibiting the fluid communication between the pressure regulator 436 and the assisting chamber 378, or the change valve 474 provided in the embodiment of FIGS. 21 and 22 for mechanically selecting the fluid pressure controlled by the first flow control device 466 or the fluid pressure regulated by the pressure regulator 472. Further, the pressure regulator 606 is enabled to operate for regulating the fluid pressure in the assisting chamber 378 when the electric system or other part of the braking system is defective. Thus, the present braking system of FIG. 24 which uses a reduced number of solenoid-operated components and which is accordingly simplified in construction is capable of boosting the brake pedal operating force with an operation of the pressure regulator 606 in the event of occurrence of a defect in the braking system is defective.

In the illustrated embodiments, the operating stroke and force of the brake pedal 60 and the master cylinder pressure are controlled to change linearly in relation to each other, as shown in the graphs of FIGS. 6–8. However, these parameters may be controlled to change along suitable curves.

In the first and second embodiments of FIGS. 1–18, the feed-forward and feedback controls are effected for each of the first and second flow control devices 194, 256. However, the feedback control may be eliminated for at least one of the first and second flow control devices 194, 256. That is, only the feed-forward control may be effected for at least one of the flow control devices 194, 256. The same applies to the embodiments of FIGS. 19–24.

Although the two check valves 272 are provided in the connecting passage 270 connecting the annular chamber 96 and the first pressurizing chamber 88 in the first embodiment of FIGS. 1–17, only one check valve 272 may be provide in the connecting passage 270.

Each of the braking systems of the illustrated embodiments has the front brake-application sub-system in which one of the two pressurizing chambers of the tandem type master cylinder is connected to the wheel brake cylinders 132, 134 for braking the front left and right wheels 6, 8, and the rear brake-application sub-system in which the other pressurizing chamber is connected to the wheel brake cylinders 152, 154 for braking the rear left and right wheels 10, 12. However, the principle of the present invention is equally applicable to a diagonal type or X-piping type braking system having a first brake-application sub-system in which one of the two pressurizing chambers of the tandem type master cylinder is connected to the wheel brake cylinders 132, 154 for braking the front left wheel 6 and the rear right wheel 12, respectively, and a second brake-application sub-system in which the other pressurizing chamber is connected to the wheel brake cylinders 134, 152 for braking the front right wheel 8 and the rear left wheel 10, respectively.

It is to be understood that the present invention may be embodied with various other changes, modifications and improvements, such as those described in the SUMMARY OF THE INVENTION, which may occur to those skilled in the art, without departing from the spirit and scope of the invention defined in the following claims:

What is claimed is:

1. A braking system for a vehicle having a wheel, comprising:
   a master cylinder including a cylinder housing, and a pressurizing piston which is fluid-tightly and slidably received in said cylinder housing and which cooperates with said cylinder housing to define a pressurizing chamber and an assisting chamber on respective front and rear sides of said pressurizing piston;
   a brake operating device including a brake operating member manually operable with a brake operating force to apply a pressurizing force based on said brake operating force to said pressurizing piston;
   a brake for braking said wheel;
   a wheel brake cylinder which is connected to said pressurizing piston of said master cylinder for activating said brake;
   a hydraulic pressure source operable to pressurize a working fluid;
   a reservoir;
   a first flow control device connected to said assisting chamber, said hydraulic pressure source and said reservoir, and operable to control flows of the fluid between said assisting chamber, said hydraulic pressure source and said reservoir; and
   a second flow control device connected to said pressurizing chamber, said hydraulic pressure source and said reservoir, and operable to control flows of the fluid between said pressurizing chamber, said hydraulic pressure source and said reservoir.

2. A braking system according to claim 1, wherein at least one of said hydraulic pressure source and said reservoir consists of a first portion and a second portion which are connected to said first and, second flow control devices, and said first and second flow control devices are operable independently of each other.

3. A braking system according to claim 1, wherein at least one of said first and second flow control devices includes a linear control valve capable of continuously changing at least one of a rate of flow and a pressure of the fluid.

4. A braking system according to claim 1, wherein at least one of said first and second flow control devices includes a supply-flow control valve device for controlling a flow of the fluid to a corresponding one of said assisting and pressurizing chambers, and a discharge-flow control valve device for controlling a flow of the fluid from said corresponding one of said assisting and pressurizing chambers.

5. A braking system according to claim 1, further comprising a main control device for controlling said first flow control device and said second flow control device, and wherein said main control device includes a brake characteristic control portion for controlling said first and second flow control devices, so as to maintain predetermined relationships among said brake operating force and an operating stroke of said brake operating member and an operating state of said wheel brake cylinder.

6. A braking system according to claim 1, further comprising:
   a regenerative braking apparatus including an energy converting device operable to convert a kinetic energy of the vehicle during running of the vehicle into another form of energy, and an energy storing device for storing said another form of energy; and
   a main control device for controlling said first and second flow control devices, said main control device including a cooperative braking control portion operable to control said first flow control device such that a pressure of the fluid in said assisting chamber is lower when said regenerative braking apparatus is in operation than when said regenerative braking apparatus is not in operation.

7. A braking system according to claim 6, further comprising:
   a shutting-off valve having a closed state for disconnecting said pressurizing chamber and said wheel brake cylinder; and
   a main controller for controlling said first and second flow control devices, said main controller including a stroke simulation control portion operable, when said regenerative braking apparatus is capable of generating a regenerative braking effect corresponding to an operating amount of said brake operating member, for placing said shut-off valve in said closed state, and controlling said first and second flow control devices such that said brake operating force and an operating stroke of said brake operating member while said regenerative braking apparatus is in operation are controlled to have a same relationship with each other as while said regenerative braking apparatus is not in operation.

8. A braking system according to claim 7, wherein said main controller controls said first flow control device to control the fluid pressure in said assisting chamber to an atmospheric level and controls said second flow control device to permit the pressurized fluid to be discharged from said pressurizing chamber, when the operating amount of said brake operating member is increased while said regenerative braking apparatus is operated to generate the regenerative braking effect corresponding to the operating amount of said brake operating member.

9. A braking system according to claim 7, wherein said main controller controls said first flow control device to control the fluid pressure in said assisting chamber to an atmospheric level and controls said second flow control device to permit the pressurized fluid to be supplied to said pressurizing chamber, when the operating amount of said brake operating member is reduced while said regenerative braking apparatus is operated to generate the regenerative braking effect corresponding to the operating amount of said brake operating member.

10. A braking system according to claim 1, wherein said cylinder housing has a cylinder bore having a small-diameter portion and a large-diameter portion having a larger diameter than said small-diameter portion, and said pressurizing piston includes a small-diameter portion engaging said small-diameter portion of said cylinder bore, and a large-diameter portion engaging said large-diameter portion of said cylinder bore, said small-diameter portion of said pressurizing piston cooperating with said cylinder housing to define said pressurizing chamber on a front side of said small-diameter portion of said pressurizing piston, while said large-diameter portion of said pressurizing piston cooperating with said cylinder housing to define said assisting chamber on a rear side of said large-diameter portion of said pressurizing piston, said small-diameter and large-diameter portions of said pressurizing piston defining a first shoulder surface, while said small-diameter and large-diameter portions of said cylinder bore defining a second shoulder surface, said cylinder housing and said pressurizing piston cooperating to define an annular chamber between said first and second shoulder surfaces, said braking system further comprising:

means for defining a connecting passage connecting said annular chamber and said pressurizing chamber; and a check valve provided in said connecting passage, said check valve permitting a flow of the fluid in a first direction from said annular chamber toward said pressurizing chamber and inhibiting a flow of the fluid in a second direction opposite to said first direction.

11. A braking system according to claim 1, wherein said master cylinder includes a communication control device for effecting fluid communication between said pressurizing chamber and said reservoir when said pressurizing piston is placed at a fully retracted position, and inhibiting at least a flow of the fluid from said pressurizing chamber toward said reservoir when said pressurizing piston has been advanced by more than a predetermined distance, said braking system further comprising:

a main controller for controlling said first and second flow control devices, said main controller including an unintended braking control portion operable when said brake operating member is not in operation, to control said first flow control device to control the fluid pressure in said assisting chamber for advancing said pressurizing piston to be advanced by more than said predetermined distance, and control said second flow control device to increase the fluid pressure in said pressurizing chamber.

12. A braking system according to claim 11, further comprising a wheel-brake-cylinder-pressure control device disposed between said pressurizing chamber, and said wheel brake cylinder and a reservoir device, said wheel-brake-cylinder-pressure control device being operable to control a pressure of the fluid in said wheel brake cylinder, and wherein said unintended braking control portion controls said second flow control device to increase a pressure of the fluid in said pressurizing chamber to a level high enough to permit the pressurized fluid in the pressurizing chamber to be used as a hydraulic pressure source for said wheel-brake-cylinder-pressure control device.

13. A braking system according to claim 1, wherein said first flow control device includes a pilot-operated pressure regulator operable to control the pressure of the pressurized fluid received from said hydraulic pressure source to a value corresponding the pressure of the fluid in said pressurizing chamber received as a pilot pressure.

14. A braking system according to claim 13, wherein said first flow control device comprises:

an electrically operated hydraulic pressure control device disposed in parallel connection with said pilot-operated pressure regulator and electrically controlled to control the pressure of the fluid in said assisting chamber; and a selecting device connected to said pilot-operated pressure regulator, said electrically operated hydraulic pressure control device and said assisting chamber, and operable to selectively apply to said assisting chamber the fluid pressure controlled by said pilot-operated pressure regulator or said electrically operated hydraulic pressure control device.

15. A braking system according to claim 14, wherein said selecting device includes a change valve operable to apply to said assisting chamber a higher one of the fluid pressures controlled by said pilot-operated pressure regulator and said electrically operated hydraulic pressure control device.

16. A braking system according to claim 14, wherein said selecting device includes a shutting-off device connected between said pilot-operated pressure regulator and said assisting chamber and operable to disconnect said pilot-operated pressure regulator and said assisting chamber from each other.

17. A braking system according to claim 13, wherein said pilot-operated pressure regulator has a high-pressure port connected to said hydraulic pressure source, a control-pressure port connected to said assisting chamber, a low-pressure port connected to said reservoir, and a pilot-pressure port connected to said pressurizing chamber, said pressure regulator being operable to effect fluid communication of said control-pressure port with said high-pressure port or said low-pressure port, for increasing or reducing the fluid pressure in said control-pressure port, depending upon the fluid pressure applied to said pilot-pressure port.

18. A braking system according to claim 17, wherein said first flow control device includes a normally open solenoid-operated control valve connected between said low-pressure-port of said pressure regulator and said first reservoir.

19. A braking system according to claim 18, wherein said normally open solenoid-operated control valve is a linear control valve capable of continuously controlling at least one of a flow rate and a pressure of the fluid.

20. A braking system according to claim 19, further comprising a valve control device for controlling said linear control valve such that the fluid pressure in said low-pressure port is higher than the fluid pressure in said pilot-pressure port.

21. A braking system according to claim 17, wherein said first flow control device includes a normally closed solenoid-operated control valve connected between said hydraulic pressure source and said assisting chamber, in parallel connection with said pilot-operated pressure regulator.

22. A braking system according to claim 21, wherein said normally closed solenoid-operated control valve is a linear control valve capable of continuously controlling at least one of a flow rate and a pressure of the fluid.

23. A braking system according to claim 21, further comprising a valve control device operable while said normally closed solenoid-operated control valve is normally functioning, for holding said normally closed solenoid-operated control valve in a closed state, irrespective of the fluid pressures in said pilot-pressure port and said control-pressure port.

24. A braking system according to claim 17, wherein said pilot-operated pressure regulator comprises:

a control piston which receives the fluid pressure applied to said pilot-pressure port in an advancing direction thereof:

a first valve portion operable depending upon a movement of said control piston in said advancing direction or a retracting direction opposite to said advancing direction, for selectively permitting and inhibiting fluid communication between said control-pressure port and said high-pressure port; and a second valve portion operable according to said movement of said control piston in said advancing direction or retracting direction, for selectively permitting and inhibiting fluid communication between said control-pressure port and said low-pressure port.

25. A braking system according to claim 1, wherein said first flow control device comprises:

an electrically operated hydraulic pressure control device disposed between said hydraulic pressure source and said reservoir, and said assisting chamber, and electrically controlled to control the fluid pressure ins aid assisting chamber;

a by-pass passage which by-passes said electrically operated hydraulic pressure control device; and a check valve device disposed in said by-pass passage, said check valve device permitting a flow of the fluid in a first direction from said first reservoir toward said assisting chamber and inhibiting a flow of the fluid in a second direction opposite to said first direction.

26. A braking system according to claim 1, wherein said second flow control device comprises:

an electrically operated hydraulic pressure control device disposed between said hydraulic pressure source and said reservoir, and said pressurizing chamber, and electrically controlled to control the fluid pressure in said pressurizing chamber; and a shutting-off device disposed between said electrically operated hydraulic pressure control device and said pressurizing chamber, for inhibiting fluid communication between said electrically operated hydraulic pressure control device and said pressurizing chamber.

27. A braking system for a vehicle having a wheel, comprising:

a master cylinder including a cylinder housing, and a pressurizing piston which is fluid-tightly and slidably received in said cylinder housing and which cooperates with said cylinder housing to define a pressurizing chamber in front of said pressurizing piston, a working fluid in said pressurizing chamber being pressurized by an advancing movement of said pressurizing piston;

a brake for braking said wheel;

a wheel brake cylinder connected to said pressurizing chamber of said master cylinder, and operable with the pressurized fluid supplied from said pressurizing chamber, for activating said brake;

a brake operating device including a brake operating member manually operable with a brake operating force to apply a first pressurizing force based on said brake operating force to said pressurizing piston;

an electrically operated hydraulic pressure source operable to pressurize the working fluid and control a pressure of the pressurized fluid;

an assisting device operable to apply a second pressurizing force based on the pressurized fluid supplied from said electrically operated hydraulic pressure source, to said pressurizing piston; and a pressurized-fluid supplying device for supplying the fluid pressurized by said electrically operated hydraulic pressure source to at least one of said pressurizing chamber and said wheel brake cylinder.

28. A braking system according to claim 27, wherein said pressurized-fluid supplying device includes a device capable of controlling an amount of the pressurized fluid to be supplied from said electrically operated hydraulic pressure source to at least one of said pressurizing chamber and said wheel brake cylinder.

* * * * *